(12) United States Patent
Saha et al.

(10) Patent No.: US 11,909,342 B2
(45) Date of Patent: Feb. 20, 2024

(54) ROTATING ELECTRICAL MACHINE CONTROL DEVICE

(71) Applicants: AISIN CORPORATION, Aichi (JP); NAGOYA INSTITUTE OF TECHNOLOGY, Nagoya (JP)

(72) Inventors: Subrata Saha, Kariya (JP); Hiroki Iwai, Kariya (JP); Takashi Kosaka, Nagoya (JP); Hiroaki Matsumori, Nagoya (JP); Naoto Saito, Kariya (JP); Yoshinobu Ito, Kariya (JP); Isao Fujiwara, Kariya (JP)

(73) Assignees: AISIN CORPORATION, Aichi (JP); NAGOYA INSTITUTE OF TECHNOLOGY, Nagoya (JP)

( * ) Notice: Subject to any disclaimer, the term of this patent is extended or adjusted under 35 U.S.C. 154(b) by 52 days.

(21) Appl. No.: 17/782,713

(22) PCT Filed: Sep. 29, 2020

(86) PCT No.: PCT/JP2020/036899
§ 371 (c)(1),
(2) Date: Jun. 6, 2022

(87) PCT Pub. No.: WO2021/131203
PCT Pub. Date: Jul. 1, 2021

(65) Prior Publication Data
US 2023/0028358 A1    Jan. 26, 2023

(30) Foreign Application Priority Data

Dec. 27, 2019  (JP) .................................. 2019-239166
Dec. 27, 2019  (JP) .................................. 2019-239167
Jun. 26, 2020  (JP) .................................. 2020-110950

(51) Int. Cl.
H02P 27/08     (2006.01)
H02P 6/08      (2016.01)
(Continued)

(52) U.S. Cl.
CPC .............. *H02P 27/08* (2013.01); *H02K 11/33* (2016.01); *H02M 7/5395* (2013.01); *H02P 6/08* (2013.01); *H02P 2209/00* (2013.01)

(58) Field of Classification Search
CPC ........ H02P 27/08; H02P 6/08; H02P 2209/00; H02K 11/33; H02M 7/5395
(Continued)

(56) References Cited

U.S. PATENT DOCUMENTS 8,169,179 B2 *  5/2012  Mohan .............. H02M 7/53873
                                                    318/722

FOREIGN PATENT DOCUMENTS

JP    2017-077061 A    4/2017
JP    2019-047587 A    3/2019
(Continued)

OTHER PUBLICATIONS

Rotary Electric Machine Control Device Saha Subrata: WO 2019142877 A1 Date Published Jul. 25, 2019 (Year: 2019).*
(Continued)

*Primary Examiner* — Jorge L Carrasquillo
(74) *Attorney, Agent, or Firm* — Sughrue Mion, PLLC

(57) ABSTRACT

Two inverters (10) provided at respective both ends of open-end windings (8) are appropriately controlled. As control regions (R) of a rotating electrical machine (80), a first speed region (VR1) and a second speed region (VR2) in which the rotational speed of the rotating electrical machine (80) is higher than in the first speed region (VR1) for the same torque are set, and in the second speed region (VR2), a rotating electrical machine control device (1) controls both inverters (10), a first inverter (11) and a second inverter (12), by mixed pulse width modulation control in which control is performed such that a plurality of pulses with different patterns are outputted during a first period (T1) which is a half cycle of electrical angle, and an inactive state continues during a second period (T2) which is the other half cycle.

14 Claims, 44 Drawing Sheets

(51) Int. Cl.
*H02M 7/5395* (2006.01)
*H02K 11/33* (2016.01)

(58) Field of Classification Search
USPC ....... 318/811, 599, 400.17, 400.26, 801, 748
See application file for complete search history.

(56) References Cited

FOREIGN PATENT DOCUMENTS

| JP | 2019-170109 A | 10/2019 |
|---|---|---|
| WO | 2019/142877 A1 | 7/2019 |

OTHER PUBLICATIONS

Omata (JP 2019047587 A)Control Device of Rotating Electric Machine Date Published Mar. 22, 2019 (Year: 2019).*
Takahashi (JP 2019170109 A) (Motor Drive System) Date Published Oct. 3, 2019 (Year: 2019).*
Nakama (JP 2017077061 A), (Controller and AC Motor Driver) Date Published Apr. 20, 2017 (Year: 2017).*
V. Oleschuk et al., "Dual Inverter-Fed Traction Drive with DC Sources Power Balancing Based on Synchronized PWM", IEEE, Conference Paper, Jun. 2007, pp. 260-265, 1-4244-0743-5/07.
International Search Report of PCT/JP2020/036899 dated Nov. 24, 2020 [PCT/ISA/210].

* cited by examiner

ROTATING ELECTRICAL MACHINE CONTROL DEVICE

CROSS REFERENCE TO RELATED APPLICATIONS

This application is a National Stage of International Application No. PCT/JP2020/036899, filed Sep. 29, 2020, claiming priorities to Japanese Patent Application No. 2019-239166, filed Dec. 27, 2019, Japanese Patent Application No. 2019-239167, filed Dec. 27, 2019 and Japanese Patent Application No. 2020-110950, filed Jun. 26, 2020, the entire contents of which are incorporated in their entirety.

TECHNICAL FIELD

The present disclosure relates to a rotating electrical machine control device that controls, through two inverters, drive of a rotating electrical machine having open-end windings.

BACKGROUND ART

The IEEE paper "Dual Inverter-Fed Traction Drive with DC Sources Power Balancing Based on Synchronized PWM" released in 2007 by V. Oleschuk et al. discloses a control device that controls drive of a three-phase alternating current type rotating electrical machine by performing switching control of inverters provided at respective both ends of three-phase open-end windings included in the rotating electrical machine. Meanwhile, as a well-known mode, for example, there is also a device that controls drive of a rotating electrical machine by performing switching control of one inverter that is provided on an other-end side of Y-windings having three-phase windings connected to each other on their respective one-end sides. Compared with a system using Y-windings and one inverter, in a system using open-end windings and two inverters, the alternating current line-to-line voltage of the windings can be increased for the same direct current voltage, and thus a rotating electrical machine can operate at higher output.

The Introduction of the paper by V. Oleschuk et al. describes that by using different phases of carrier signals that generate pulses for performing switching control of the two inverters, the magnitude of ripples in current flowing through the windings can be reduced. V Oleschuk et al. further mention that by generating pulses using a synchronous scheme instead of an asynchronous scheme that uses carrier signals, more suitable control can also be performed for medium/high output applications. Note, however, that in both of the asynchronous scheme and the synchronous scheme, switching control of the two inverters is always performed using the same control scheme.

CITATIONS LIST

Patent Literature

Non-Patent Literature 1: V. Oleschuk, R. Bojoi, G. Griva, F. Profumo, "Dual Inverter-Fed Traction Drive with DC Sources Power Balancing Based on Synchronized PWM", Conference Paper/June 2007, 1-4244-0743-5/07, IEEE, p. 260-265

SUMMARY OF THE DISCLOSURE

Technical Problems

It is preferable to determine a scheme for switching control based on various elements (operating conditions) such as torque, rotational speed, and voltage on a direct current side that are required for a rotating electrical machine, so that operation with higher system efficiency can be performed. Although the technique disclosed by V. Oleschuk et al. is excellent, there is still room for improvement in appropriate control of the two inverters provided at respective both ends of the open-end windings.

In view of the above-described background, it is desired to provide a technique for appropriately controlling two inverters provided at respective both ends of open-end windings.

Solutions to Problems

In a rotating electrical machine control device that considers the above description and that controls, through a first inverter and a second inverter, drive of a rotating electrical machine having open-end windings of a plurality of phases, the open-end windings being independent of each other, in one aspect, the first inverter is connected to a one-end side of the open-end windings of a plurality of phases to convert electric power between direct current and alternating currents of a plurality of phases, the second inverter is connected to an other-end side of the open-end windings of a plurality of phases to convert electric power between direct current and alternating currents of a plurality of phases, the first inverter and the second inverter can be controlled using a plurality of control schemes with different switching patterns and can be controlled using the control schemes that are independent of each other, as control regions of the rotating electrical machine, a first speed region and a second speed region in which rotational speed of the rotating electrical machine is higher than in the first speed region for same torque are set, the control schemes include pulse width modulation control in which a plurality of pulses with different patterns are outputted in one cycle of electrical angle; and mixed pulse width modulation control in which control is performed such that a plurality of pulses with different patterns are outputted during a first period and an inactive state continues during a second period, the first period being a half cycle of electrical angle and the second period being an other half cycle, and both inverters, the first inverter and the second inverter, are controlled by the mixed pulse width modulation control in the second speed region.

The mixed pulse width modulation control is a control scheme having, during one cycle of electrical angle, a combination of a period during which pulse width modulation is performed and a period with no modulation (fixed state), each period being about a half cycle. That is, since the inverters do not perform switching operation for about a half period of their driving time, switching loss decreases and system loss decreases. The second speed region in which mixed pulse width modulation control is performed is set on a higher speed side than the first speed region for the same torque, and is a control region on a relatively medium and high speed side. According to the present configuration, by reducing system loss in the control region on the relatively medium and high speed side out of all operating regions of the rotating electrical machine, the entire system loss in all operating regions can be reduced. As such, according to the present configuration, the two inverters provided at respective both ends of the open-end windings can be appropriately controlled.

In addition, in a rotating electrical machine control device that considers the above description and that controls, through a first inverter and a second inverter, drive of a rotating electrical machine having open-end windings of a plurality of phases, the open-end windings being independent of each other, in another aspect, the first inverter is connected to a one-end side of the open-end windings of a plurality of phases to convert electric power between direct current and alternating currents of a plurality of phases, the second inverter is connected to an other-end side of the open-end windings of a plurality of phases to convert electric power between direct current and alternating currents of a plurality of phases, in the first inverter and the second inverter, each arm for one alternating current phase includes a series circuit of an upper-stage-side switching element and a lower-stage-side switching element, control schemes for the first inverter and the second inverter include at least pulse width modulation control in which a plurality of pulses with different patterns are outputted in one cycle of electrical angle; and active short-circuit control in which the upper-stage-side switching elements in the arms for all of a plurality of phases are brought into on state or the lower-stage-side switching elements in the arms for all of a plurality of phases are brought into on state, and the pulse width modulation control includes, as the control schemes, continuous pulse width modulation control in which pulse width modulation is continuously performed for all of the arms for a plurality of phases; and discontinuous pulse width modulation control in which pulse width modulation is performed including a period during which switching elements in one of the arms for one of a plurality of phases are fixed to on state or off state, the first inverter and the second inverter can be controlled using the control schemes that are independent of each other, as control regions of the rotating electrical machine, a first speed region, a second speed region in which rotational speed of the rotating electrical machine is higher than in the first speed region for same torque, and a third speed region in which rotational speed of the rotating electrical machine is higher than in the second speed region for same torque are set, and target control is performed in which in the first speed region, one of inverters, the first inverter or the second inverter, is controlled by the active short-circuit control, and an other one of the inverters is controlled by the continuous pulse width modulation control, in the second speed region, one of the inverters, the first inverter or the second inverter, is controlled by the active short-circuit control, and an other one of the inverters is controlled by the discontinuous pulse width modulation control, and in the third speed region, both of the inverters, the first inverter and the second inverter, are controlled by the discontinuous pulse width modulation control.

When two inverters are provided like the present configuration, alternating current voltage with an amplitude larger than that of voltage on a direct current side of each inverter can be generated. Note, however, that the rotating electrical machine control device does not need to control the two inverters such that the amplitude of alternating current is always large, and for example, when the rotational speed of the rotating electrical machine is low, it may be sufficient to generate alternating current voltage that can be generated by one inverter. According to the present configuration, in the first speed region and the second speed region, one inverter out of the two inverters is controlled by active short-circuit control. By this, the open-end windings are short-circuited in the one inverter, resulting in the rotating electrical machine being the same as a rotating electrical machine in which stator coils have an electrical neutral point. That is, the rotating electrical machine is driven substantially by only one inverter out of the two inverters. Since the inverter controlled by active short-circuit control does not perform switching operation, the rotating electrical machine can be driven while loss in the entire system is suppressed. In addition, the maximum modulation index for discontinuous pulse width modulation control performed in the second speed region is larger than the maximum modulation index for continuous pulse width modulation control performed in the first speed region. The second speed region is a control region in which the rotational speed of the rotating electrical machine is higher than in the first speed region for the same torque, and in terms of system efficiency, it is preferable that modulation be performed at a higher modulation index in the second speed region than in the first speed region. By performing continuous pulse width modulation control in the first speed region and performing discontinuous pulse width modulation control in the second speed region, the rotating electrical machine can be appropriately driven by one inverter in a control region in which the first speed region and the second speed region are combined together. In addition, in the third speed region in which the rotational speed of the rotating electrical machine is higher than in the second speed region, both inverters are controlled by discontinuous pulse width modulation control, and thus, the rotating electrical machine can be driven such that the open-end windings generate line-to-line voltage higher than voltage that can be generated using one direct current power supply. As such, according to the present configuration, the two inverters provided at respective both ends of the open-end windings can be appropriately controlled.

Further features and advantages of the rotating electrical machine control devices will become apparent from the following description of embodiments which will be described with reference to drawings.

DESCRIPTION OF EMBODIMENTS

Figure 1:
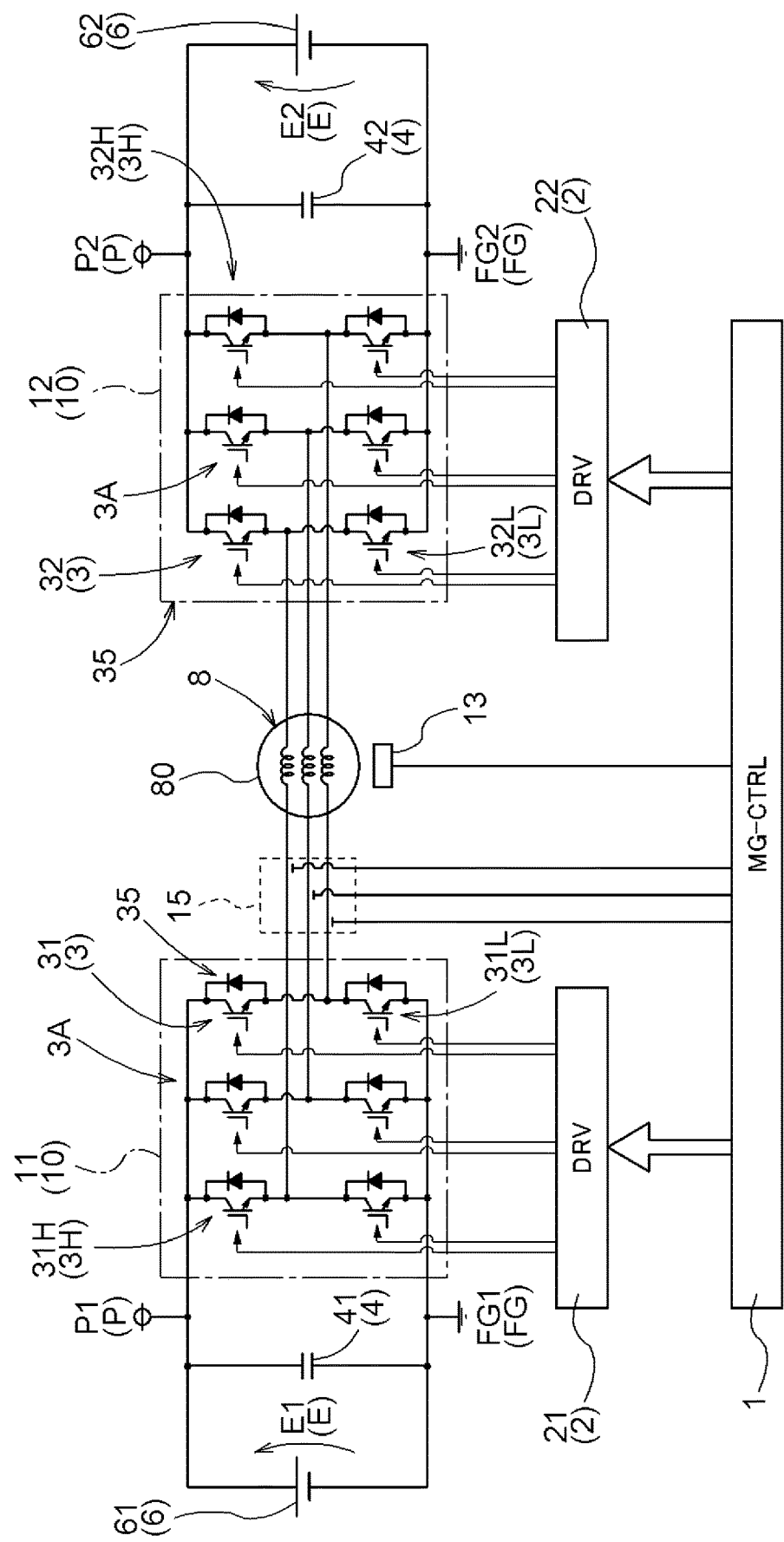
FIG. 1 is a schematic block diagram of a rotating electrical machine drive system.

Embodiments of a rotating electrical machine control device that controls, through two inverters, drive of a rotating electrical machine having open-end windings of a plurality of phases which are independent of each other will be described below based on the drawings. FIG. 1 is a schematic block diagram of a rotating electrical machine drive system including a rotating electrical machine control device 1 (MG-CTRL). A rotating electrical machine 80 serves as, for example, a drive power source for wheels of a vehicle such as an electric vehicle or a hybrid vehicle. The rotating electrical machine 80 is an open-end winding type rotating electrical machine having stator coils 8 (open-end windings) of a plurality of phases (three phases in the present embodiments) which are independent of each other. Inverters 10 that are controlled independently of each other to convert electric power between direct current and alternating currents of a plurality of phases (here, three phases) are connected to respective both ends of the stator coils 8. That is, a first inverter 11 (INV1) is connected to a one-end side of the stator coils 8, and a second inverter 12 (INV2) is connected to an other-end side of the stator coils 8. In the following description, the first inverter 11 and the second inverter 12 are simply referred to as the inverters 10 when they do not need to be distinguished from each other.

The inverters 10 each are configured to include a plurality of switching elements 3. For the switching elements 3, insulated gate bipolar transistors (IGBTs) or power metal oxide semiconductor field effect transistors (MOSFETs) are used. FIG. 1 exemplifies a mode in which IGBTs are used as the switching elements 3. In the present embodiments, the first inverter 11 and the second inverter 12 are the inverters 10 of the same circuit configuration that use the switching elements 3 of the same type. However, the first inverter 11 and the second inverter 12 may be configured using switching elements 3 of different types.

For example, as will be described later with reference to tables 1 to 6, when there is a control mode in which the two inverters 10 are controlled using different control schemes (a case of performing control in a first speed region VR1 which will be described later, etc.), it is preferred that the first inverter 11 and the second inverter 12 be formed using switching elements 3 of different types, according to the characteristics of each control scheme. For example, when there is a case in which the first inverter 11 is substantially short-circuited and thus switching control is not performed, it is preferred that second switching elements 32 included in the second inverter 12 be switching elements whose switching loss upon a transition between off state and on state is relatively small compared with first switching elements 31 included in the first inverter 11. For example, a mode can be adopted in which Si-IGBTs are used as the first switching elements 31 in the first inverter 11 and SiC-MOSFETs are used as the second switching elements 32 in the second inverter 12. The first switching elements 31 may be Si-MOSFETs in addition to Si-IGBTs. In addition, the second switching elements 32 may be SiC-static induction transistors (SiC-SITs), gallium nitride-MOSFETs (GaN-MOSFETs), etc., in addition to SiC-MOSFETs.

In the two inverters 10, each arm 3A for one alternating current phase includes a series circuit of an upper-stage-side switching element 3H and a lower-stage-side switching element 3L. Each switching element 3 has a freewheeling diode 35 provided in parallel thereto, with a direction going from a negative polarity FG to a positive polarity P (a direction going from a lower-stage side to an upper-stage side) being a forward direction. In addition, in the present embodiments, the two inverters 10 are connected to direct current power supplies 6 which are independent of each other. That is, a first floating ground FG1 which is the negative polarity FG of the first inverter 11 and a second floating ground FG2 which is the negative polarity FG of the second inverter 12 are independent of each other. In addition, a direct-current link capacitor 4 (smoothing capacitor) that smooths direct current bus voltage is provided between each inverter 10 and a corresponding direct current power supply 6.

Specifically, the first inverter 11 in which an arm 3A for one alternating current phase includes a series circuit of a first upper-stage-side switching element 31H and a first lower-stage-side switching element 31L has a first direct current link capacitor 41 (first smoothing capacitor) connected to a direct current side thereof, and is connected to a first direct current power supply 61 on the direct current side thereof and connected to a one-end side of the stator coils 8 of a plurality of phases on an alternating current side thereof, by which electric power is converted between direct current and alternating currents of a plurality of phases. The second inverter 12 in which an arm 3A for one alternating current phase includes a series circuit of a second upper-stage-side switching element 32H and a second lower-stage-side switching element 32L has a second direct current link capacitor 42 (second smoothing capacitor) connected to a direct current side thereof, and is connected to a second direct current power supply 62 on the direct current side thereof and connected to an other-end side of the stator coils 8 of a plurality of phases on an alternating current side thereof, by which electric power is converted between direct current and alternating currents of a plurality of phases.

In the present embodiments, the first direct current power supply 61 and the second direct current power supply 62 are direct current power supplies having equal ratings of voltage, etc., and the first direct current link capacitor 41 and the second direct current link capacitor are capacitors also having equal ratings of capacitance, etc. The rated voltage of the direct current power supplies 6 is about 48 volts to 400 volts. The direct current power supplies 6 are composed of, for example, secondary batteries (batteries) such as nickel-hydrogen batteries or lithium-ion batteries, or electric double-layer capacitors. The rotating electrical machine 80 can function as both an electric motor and a generator. The rotating electrical machine 80 converts electric power from the direct current power supplies 6 into mechanical power through the inverters 10 (motoring). Alternatively, the rotating electrical machine 80 converts rotary drive power transmitted from the wheels, etc., into electric power and charges the direct current power supplies 6 through the inverters 10 (regeneration).

As shown in FIG. 1, the inverters 10 are controlled by the rotating electrical machine control device 1. The rotating electrical machine control device 1 can control the first inverter 11 and the second inverter 12 using control schemes which are independent of each other (details of the control schemes will be described later). The rotating electrical machine control device 1 is constructed using a logic circuit such as a microcomputer, as a core member. For example, the rotating electrical machine control device 1 controls the rotating electrical machine 80 through the inverters 10 by performing current feedback control that uses a vector control method, based on target torque (torque instruction) of the rotating electrical machine 80 which is provided from another control device, etc., such as a vehicle control device which is not shown.

Actual current flowing through the stator coil 8 of each phase of the rotating electrical machine 80 is detected by a current sensor 15, and a magnetic pole position at each time point of a rotor of the rotating electrical machine 80 is detected by a rotation sensor 13 such as a resolver. The rotating electrical machine control device 1 performs current feedback control using detection results from the current sensor 15 and the rotation sensor 13. The rotating electrical machine control device 1 is configured to include various functional parts for current feedback control, and each functional part is implemented by cooperation of hardware such as a microcomputer and software (program).

Figure 2:
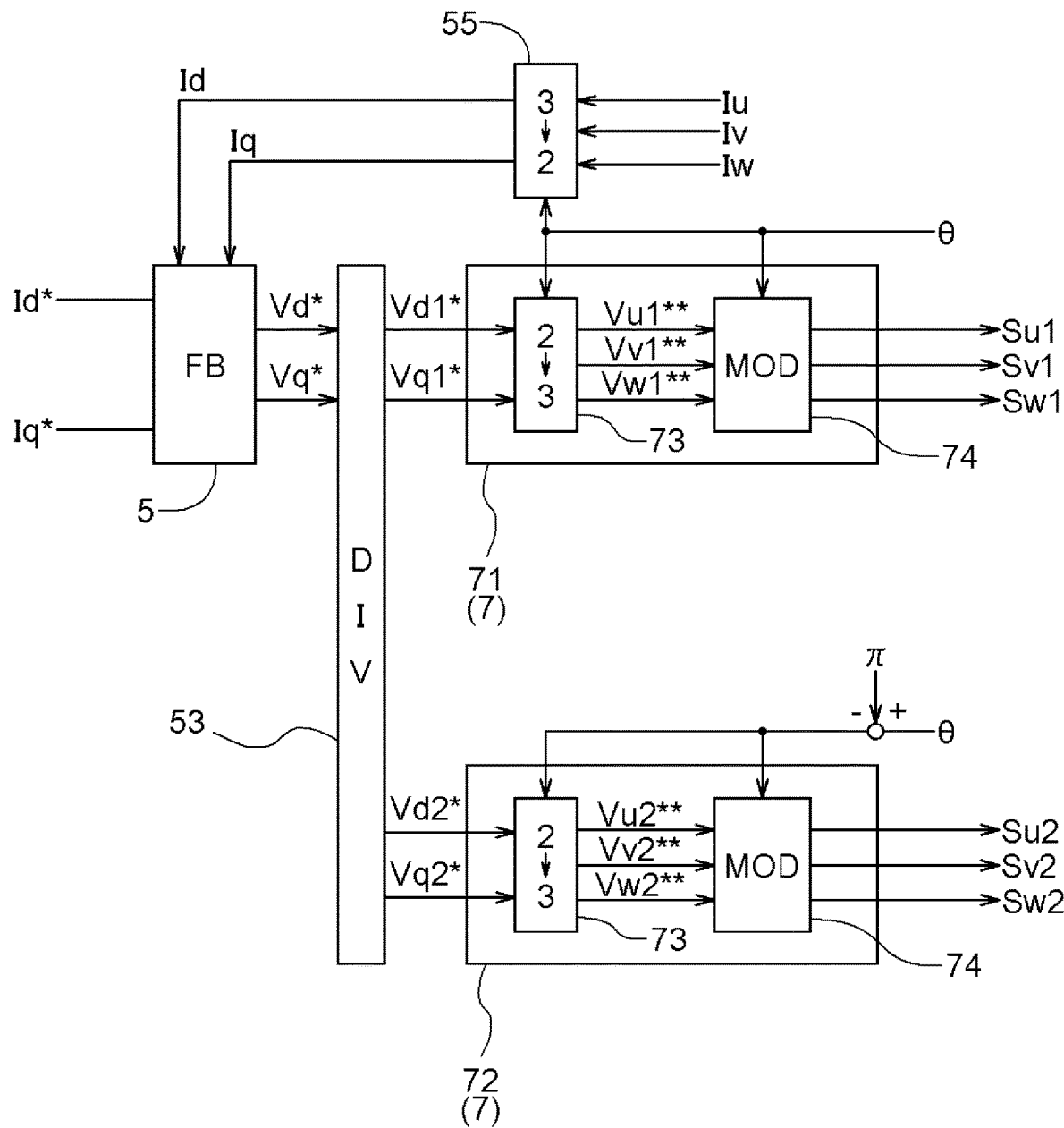
FIG. 2 is a simplified partial block diagram of a rotating electrical machine control device.

A block diagram of FIG. 2 shows some functional parts of the rotating electrical machine control device 1 in a simplified manner. In a vector control method, feedback control is performed by coordinate-transforming actual currents (a U-phase current Iu, a V-phase current Iv, and a W-phase current Iw) flowing through the rotating electrical machine 80 into vector components (a d-axis current Id and a q-axis current Iq) on a d-axis indicating a direction of a magnetic field (magnetic flux) generated by permanent magnets disposed in the rotor of the rotating electrical machine 80 and a q-axis indicating a direction orthogonal to the d-axis (a direction advanced by an electrical angle of $\pi/2$ relative to the direction of the magnetic field). In the rotating electrical machine control device 1, a three-to-two phase coordinate-transforming part 55 performs coordinate transformation based on a detection result ($\theta$: a magnetic pole position and an electrical angle) from the rotation sensor 13.

A current feedback control part 5 (FB) performs feedback control of the rotating electrical machine 80 based on deviation between current instructions (a d-axis current instruction Id* and a q-axis current instruction Iq*) issued based on a torque instruction for the rotating electrical machine 80 and the actual currents (the d-axis current Id and the q-axis current Iq) in a d-q-axis orthogonal vector coordinate system, thereby computing voltage instructions (a d-axis voltage instruction Vd* and a q-axis voltage instruction Vq*). The rotating electrical machine 80 is driven through the two inverters 10, the first inverter 11 and the second inverter 12. Hence, the d-axis voltage instruction Vd* and the q-axis voltage instruction Vq* each are divided, by a dividing part 53 (DIV), into a first d-axis voltage instruction Vd1* and a first q-axis voltage instruction Vq1* for the first inverter 11 and a second d-axis voltage instruction Vd2* and a second q-axis voltage instruction Vq2* for the second inverter 12.

As described above, the rotating electrical machine control device 1 can control the first inverter 11 and the second inverter 12 using control schemes which are independent of each other, and includes two voltage control parts 7 each including a three-phase voltage instruction computing part 73 and a modulating part 74 (MOD). Namely, the rotating electrical machine control device 1 includes a first voltage control part 71 that generates switching control signals (Su1, Sv1, and Sw1) for the respective U-phase, V-phase, and W-phase of the first inverter 11; and a second voltage control part 72 that generates switching control signals (Su2, Sv2, and Sw2) for the respective U-phase, V-phase, and W-phase of the second inverter 12. Though details will be described later with reference to FIGS. 9 and 10, etc., voltage instructions (Vu1, Vv1, and Vw1) for the first inverter 11 and voltage instructions (Vu2, Vv2, and Vw2) for the second inverter 12 differ from each other in phase by "$\pi$". Hence, a value obtained by subtracting "$\pi$" from a detection result ($\theta$) outputted from the rotation sensor 13 is inputted to the second voltage control part 72.

Note that as will be described later, modulation schemes include synchronous modulation that is synchronized with rotation of the rotating electrical machine 80; and asynchronous modulation that is independent of rotation of the rotating electrical machine 80. In general, a generation block (a generation flow in a case of software) for switching control signals by synchronous modulation differs from a generation block for switching control signals by asynchronous modulation. Although the above-described voltage control parts 7 generate switching control signals based on voltage instructions and a carrier that is not synchronized with rotation of the rotating electrical machine 80, in the present embodiments, for simplification of description, description is made assuming that switching control signals by synchronous modulation (e.g., switching control signals in a case of rectangular-wave control which will be described later) are also generated by the voltage control parts 7.

Note that as described above, each arm 3A of the inverters 10 includes a series circuit of an upper-stage-side switching element 3H and a lower-stage-side switching element 3L. A switching control signal for each phase is outputted as two types of signals, an upper-stage switching control signal and a lower-stage switching control signal, though not distinguished in FIG. 2. For example, a first U-phase switching control signal Su1 for performing switching control of the U-phase of the first inverter 11 is outputted as two signals, a first U-phase upper-stage-side switching control signal Su1+ which is added with "+" at the end and a first U-phase lower-stage-side switching control signal Su1− which is added with "−" at the end. Note that when an upper-stage-side switching element 3H and a lower-stage-side switching element 3L which are included in each arm 3A simultaneously go into on state, the arm 3A goes into short-circuited state. To prevent this short circuit, there is provided dead time during which both of an upper-stage-side switching control signal and a lower-stage-side switching control signal for each arm 3A go into inactive state. The dead time is also added by the voltage control parts 7.

As shown in FIG. 1, a control terminal (a gate terminal in a case of an IGBT or a FET) of each switching element 3 included in each inverter 10 is connected to the rotating electrical machine control device 1 through a drive circuit 2 (DRV), and switching control of the switching elements 3 is individually performed. High-voltage system circuits (systems connected to the direct current power supplies 6) for driving the rotating electrical machine 80, such as the inverters 10, and low-voltage system circuits (systems with an operating voltage of about 3.3 volts to 5 volts) such as the rotating electrical machine control device 1 that uses a microcomputer, etc., as a core significantly differ from each other in operating voltage (the power supply voltage of the circuits). The drive circuits 2 increase each of drive capabilities (e.g., capabilities to allow a circuit at a subsequent stage to operate, such as voltage amplitude and output current) of a drive signal (switching control signal) for each switching element 3, and relay the drive signal. A first drive circuit 21 relays switching control signals to the first inverter 11, and a second drive circuit 22 relays switching control signals to the second inverter 12.

As switching pattern modes (modes of voltage waveform control) of the switching elements 3 included in the first inverter 11 and the second inverter 12, the rotating electrical machine control device 1 can perform, for example, two types of control, pulse width modulation (PWM) control in which a plurality of pulses with different patterns are outputted in one cycle of electrical angle, and rectangular-wave control (single-pulse control (1-Pulse)) in which one pulse is outputted in one cycle of electrical angle. Namely, the rotating electrical machine control device 1 can perform pulse width modulation control and rectangular-wave control as control schemes for the first inverter 11 and the second inverter 12. Note that as described above, the rotating electrical machine control device 1 can control the first inverter 11 and the second inverter 12 using control schemes which are independent of each other.

In addition, pulse width modulation has schemes such as continuous pulse width modulation (CPWM: continuous PWM), e.g., sinusoidal pulse width modulation (SPWM: sinusoidal PWM) and space vector pulse width modulation (SVPWM: space vector PWM), and discontinuous pulse width modulation (DPWM: discontinuous PWM). Thus, pulse width modulation control that can be performed by the rotating electrical machine control device 1 includes, as control schemes, continuous pulse width modulation control and discontinuous pulse width modulation.

The continuous pulse width modulation is a modulation scheme in which pulse width modulation is continuously performed for all of the arms 3A for a plurality of phases, and the discontinuous pulse width modulation is a modulation scheme in which pulse width modulation is performed including a period during which switching elements in an arm 3A for one of the plurality of phases are fixed to on state or off state. Specifically, in the discontinuous pulse width modulation, for example, the signal levels of switching control signals for an inverter that correspond to one phase out of three-phase alternating current electric power are sequentially fixed, and the signal levels of switching control signals corresponding to the other two phases are changed. In the continuous pulse width modulation, all phases are modulated without thus fixing switching control signals corresponding to any of the phases. These modulation schemes are determined based on operating conditions such as rotational speed and torque that are required for the rotating electrical machine 80, and a modulation index (a ratio of the root-mean-square value of three-phase alternating current line-to-line voltage to direct current bus voltage) required to satisfy the operating conditions.

Figure 7:
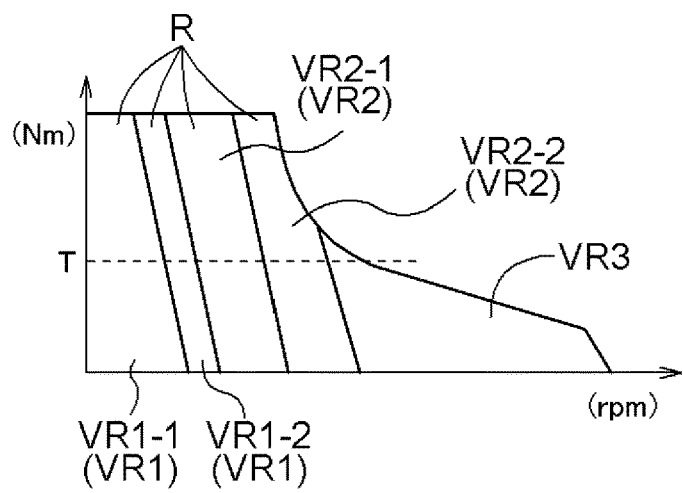
FIG. 7 is a diagram showing an example of control regions of the rotating electrical machine.

In pulse width modulation, pulses are generated based on a magnitude relationship between the amplitude of an alternating current waveform which is a voltage instruction and the amplitude of a waveform of a triangle wave (including sawtooth wave) carrier (CA) (see FIG. 7, etc.). There is also a case in which a PWM waveform is directly generated by digital computation instead of a comparison with the carrier, but in that case, too, the amplitude of an alternating current waveform which is an instruction value and the amplitude of a virtual carrier waveform have a correlation.

In pulse width modulation by digital computation, a carrier is determined according to, for example, a control cycle of the rotating electrical machine control device 1 such as a computation cycle of the microcomputer or a duty cycle of an electronic circuit. That is, even when alternating current electric power of a plurality of phases is used to drive the alternating current rotating electrical machine 80, a carrier has a cycle that is not constrained by (a cycle that is not synchronized with) the rotational speed or rotational angle (electrical angle) of the rotating electrical machine 80. Thus, both the carrier and each pulse generated based on the carrier are not synchronized with the rotation of the rotating electrical machine 80. Thus, modulation schemes such as sinusoidal pulse width modulation and space vector pulse width modulation may be referred to as asynchronous modulation. On the other hand, a modulation scheme in which pulses are generated in synchronization with the rotation of the rotating electrical machine 80 is referred to as synchronous modulation. For example, in rectangular-wave control (rectangular-wave modulation), one pulse is outputted per electrical angle cycle of the rotating electrical machine 80, and thus, the rectangular-wave modulation is synchronous modulation.

Meanwhile, as an index indicating an index for modulation from direct current bus voltage to alternating current voltage, there is a modulation index indicating a ratio of the root-mean-square value of line-to-line voltage of alternating current voltages of a plurality of phases to direct current bus voltage. In general, the maximum modulation index for sinusoidal pulse width modulation is about 0.61 ($\approx$0.612) and the maximum modulation index for space vector pulse width modulation control is about 0.71 ($\approx$0.707). A modulation scheme having a modulation index exceeding about 0.71 is considered a modulation scheme whose modulation index is higher than normal, and is referred to as "overmodulation pulse width modulation". The maximum modulation index for the "overmodulation pulse width modulation" is about 0.78. The modulation index "0.78" is a physical (mathematical) limit value for electric power conversion from direct current to alternating current. In the overmodulation pulse width modulation, when the modulation index reaches 0.78, rectangular-wave modulation (single-pulse modulation) in which one pulse is outputted in one cycle of electrical angle is performed. In the rectangular-wave modulation, the modulation index is fixed to about 0.78 which is a physical limit value.

Overmodulation pulse width modulation with a modulation index less than 0.78 can be implemented by using a principle of any of a synchronous modulation scheme and an asynchronous modulation scheme. A representative modulation scheme for the overmodulation pulse width modulation is discontinuous pulse width modulation. The discontinuous pulse width modulation can be implemented by using a principle of any of a synchronous modulation scheme and an asynchronous modulation scheme. For example, when the synchronous modulation scheme is used, in rectangular-wave modulation, one pulse is outputted in one cycle of electrical angle, whereas in discontinuous pulse width modulation, a plurality of pulses are outputted in one cycle of electrical angle. When there are a plurality of pulses in one cycle of electrical angle, a pulse active period decreases correspondingly, reducing the modulation index. Thus, not only a modulation index that is fixed to about 0.78, but also any modulation index less than 0.78 can be implemented by the synchronous modulation scheme. For example, it is also possible to perform multi-pulse modulation (Multi-Pulses) such as 9-pulse modulation (9-Pulses) in which nine pulses are outputted in one cycle of electrical angle or 5-pulse modulation (5-Pulses) in which five pulses are outputted in one cycle of electrical angle.

In addition, the rotating electrical machine control device 1 can perform shutdown control (SDN) or active short-circuit control (ASC) as fail-safe control performed when an abnormality has been detected in the inverters 10 or the rotating electrical machine 80. The shutdown control is control in which the inverters 10 are brought into off state by bringing switching control signals for all switching elements 3 included in the inverters 10 into inactive state. The active short-circuit control is control in which either one side, the upper-stage-side switching elements 3H in the arms 3A for all of the plurality of phases or the lower-stage-side switching elements 3L in the arms 3A for all of the plurality of phases, is brought into on state and the other side is brought into off state. Note that a case in which the upper-stage-side switching elements 3H in the arms 3A for all of the plurality of phases are brought into on state and the lower-stage-side switching elements 3L in the arms 3A for all of the plurality of phases are brought into off state is referred to as upper-stage-side active short-circuit control. Note also that a case in which the lower-stage-side switching elements 3L in the arms 3A for all of the plurality of phases are brought into on state and the upper-stage-side switching elements 3H in the arms 3A for all of the plurality of phases are brought into off state is referred to as lower-stage-side active short-circuit control.

As in the present embodiments, in a case in which the inverters 10 are connected to respective both ends of the stator coils 8, when one inverter 10 is short-circuited by active short-circuit control, the stator coils 8 of a plurality of phases are short-circuited in the one inverter 10. That is, the one inverter 10 serves as a neutral point and the stator coils 8 are Y-connected. Hence, the rotating electrical machine control device 1 can implement a mode in which the open-end winding type rotating electrical machine 80 is controlled through the two inverters 10 and a mode in which the Y-connected rotating electrical machine 80 is controlled through one inverter 10 (an inverter 10 that is not subjected to active short-circuit control). Hence, in the present embodiments, control modes that can be selected in normal control include not only fail-safe control but also active short-circuit control. That is, as control schemes for the first inverter 11 and the second inverter 12, the rotating electrical machine control device 1 can further perform active short-circuit control.

Meanwhile, when vector control is performed on one inverter 10, eight space vectors can be defined based on the states of the arms 3A for three phases. Specifically, eight space vectors can be defined by a combination of two types of signal levels of switching control signals for the upper-stage-side switching elements 3H for three phases ($2^3=8$). Note that the signal levels of three-phase switching control signals for the lower-stage-side switching elements 3L are complementary signal levels to the respective signal levels of the switching control signals for the upper-stage-side switching elements 3H. Hence, space vectors can be defined by the signal levels of switching control signals for either one of the upper-stage side and the lower-stage side.

When the signal levels of switching control signals for the U-phase, the V-phase, and the W-phase are represented by (UVW) with a high signal level of each switching control signal being "1" and a low signal level being "0", there are eight space vectors: (000), (001), (010), (011), (100), (101), (110), and (111). Note that of the eight space vectors, (000) and (111) are referred to as zero vectors or null vectors because line-to-line voltage is zero and thus voltage is not applied to the rotating electrical machine 80, and have the same set of coordinates in a d-q-axis vector coordinate system. On the other hand, the other six space vectors are referred to as active vectors, and have different sets of coordinates in the d-q-axis vector coordinate system.

As shown in FIG. 1, when vector control is performed on the two inverters 10, 64 space vectors can be defined by the signal levels of switching control signals for either one of the upper-stage side and the lower-stage side ($2^{(3\cdot2)}=2^6=64$). Of the space vectors, 10 space vectors are null vectors. When the signal levels for the U-phase (U1-phase), V-phase (V1-phase), and W-phase (W1-phase) of the first inverter 11 and the signal levels for the U-phase (U2-phase), V-phase (V2-phase), and W-phase (W2-phase) of the second inverter 12 are represented by (U1V1W1-U2V2W2), 10 space vectors, (000-000), (001-001), (010-010), (011-011), (100-100), (101-101), (110-110), (111-111), (000-111), and (111-000), are null vectors in which line-to-line voltage is zero. The other 54 space vectors are active vectors having effective magnitudes from the origin (the coordinates of a null vector) to 18 different sets of coordinates in the d-q-axis vector coordinate system.

Figure 3:
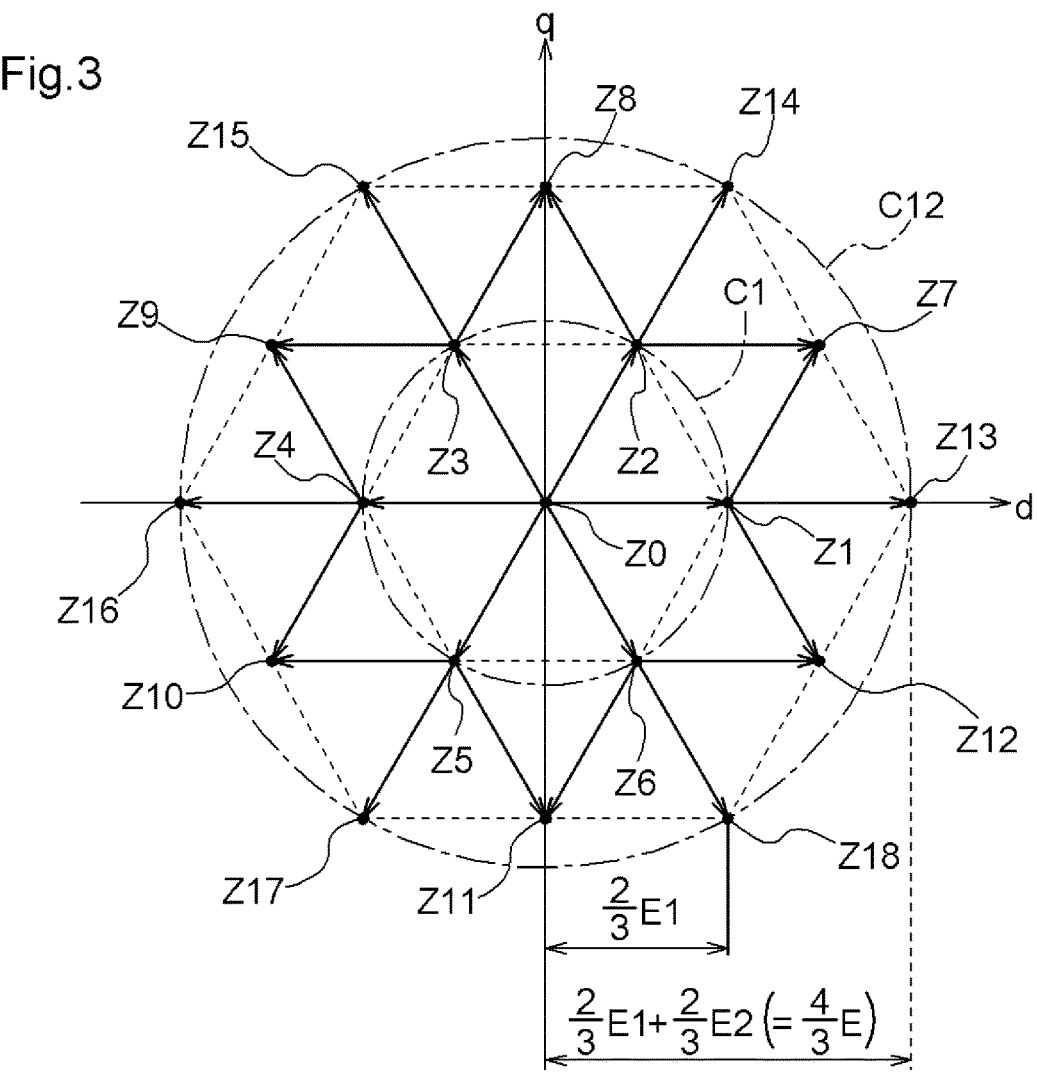
FIG. 3 is a vector diagram of the rotating electrical machine drive system using two inverters.

FIG. 3 plots the coordinates of a null vector and the coordinates of active vectors at 18 points. Z0 indicates the coordinates of a null vector in the d-q-axis vector coordinate system (10 vectors have the same set of coordinates). Z1 to Z6 indicate the coordinates of active vectors which are implemented substantially by one inverter 10 in the d-q-axis vector coordinate system. Z7 to Z18 indicate coordinates corresponding to active vectors implemented by the two inverters 10 in the d-q-axis vector coordinate system.

Z1 includes (000-011), (100-000), (100-111), and (111-011), Z2 includes (000-001), (110-000), (110-111), and (111-001), Z3 includes (000-101), (010-000), (010-111), and (111-101), Z4 includes (000-100), (011-000), (011-111), and (111-100), Z5 includes (000-110), (001-000), (001-111), and (111-110), and Z6 includes (000-010), (101-000), (101-111), and (111-010). These 24 space vectors each are a combination of a null vector which is a space vector of one inverter 10 and an active vector which is a space vector of the other inverter 10.

Note that 12 space vectors, Z1: (101-001) and (110-010), Z2: (010-011) and (100-101), Z3: (011-001) and (110-100), Z4: (001-101) and (010-110), Z5: (011-010) and (101-100), and Z6: (001-011) and (100-110), also indicate the coordinates of Z1 to Z6. Note, however, that the space vectors each are a combination of active vectors of both of the two inverters 10, instead of one inverter 10 having a null vector. Z7, Z8, Z9, Z10, Z11, and Z12 correspond to 12 space vectors, i.e., Z7 corresponds to (100-001) and (110-011), Z8 to (010-001) and (110-101), Z9 to (010-100) and (011-101), Z10 to (001-100) and (011-110), Z11 to (001-010) and (101-110), and Z12 to (100-010) and (101-011). In addition, Z13, Z14, Z15, Z16, Z17, and Z18 correspond to six space vectors, (100-011), (110-001), (010-101), (011-100), (001-110), and (101-010), respectively.

Figure 4:
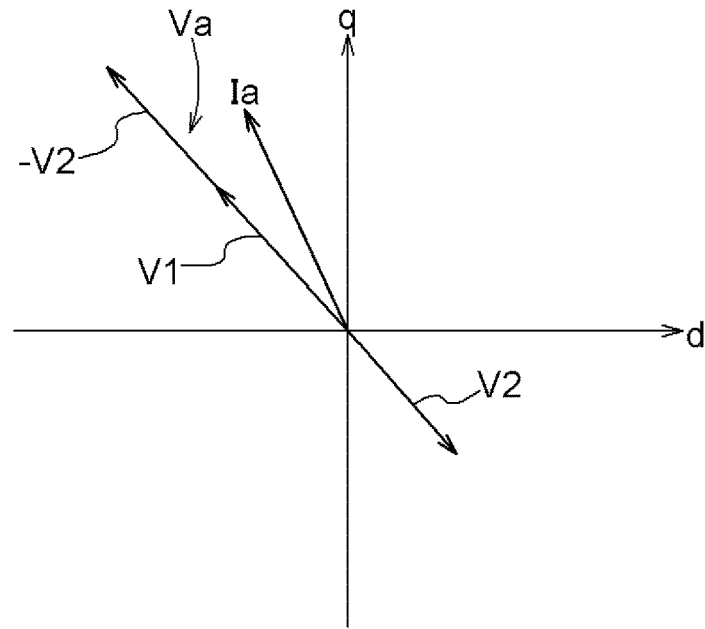
FIG. 4 is a schematic voltage vector diagram of a rotating electrical machine in an orthogonal vector space.

FIG. 4 exemplifies a vector diagram for one operating point of the rotating electrical machine 80 in the d-q-axis vector coordinate system. In the drawing, "V1" represents a first voltage vector indicating voltage of the first inverter 11 and "V2" represents a second voltage vector indicating voltage of the second inverter 12. Voltage that appears in the stator coils 8 which are open-end windings through the two inverters 10 corresponds to the difference "V1–V2" between the first voltage vector V1 and the second voltage vector V2. "Va" in the drawing represents a combined voltage vector that appears in the stator coils 8. In addition, "Ia" represents current flowing through the stator coils 8 of the rotating electrical machine 80. As shown in FIG. 4, when the first inverter 11 and the second inverter 12 are controlled such that the vector directions of the first voltage vector V1 and the second voltage vector V2 differ from each other by 180 degrees, the combined voltage vector Va is a vector obtained by adding the magnitude of the second voltage vector V2 to the direction of the first voltage vector V1.

As in the present embodiments, when drive of the rotating electrical machine 80 having open-end windings of a plurality of phases which are independent of each other is controlled through the two inverters 10, generally, switching control of the two inverters 10 is performed using the same control scheme. However, it is preferable to determine a scheme for switching control based on various elements (operating conditions) such as torque, rotational speed, and voltage on the direct-current side that are required for the rotating electrical machine 80, so that operation with higher system efficiency can be performed. Hence, the rotating electrical machine control device 1 has a control mode in which the first inverter 11 and the second inverter 12 are controlled using different control schemes, based on an operating region (control region R) of the rotating electrical machine 80. It has been confirmed by experiments and simulations conducted by the inventors that system efficiency can be increased by providing a control mode in which the first inverter 11 and the second inverter 12 are controlled using different control schemes, based on the operating conditions of the rotating electrical machine 80.

First Embodiment

An embodiment of the rotating electrical machine control device 1 having a control mode in which the first inverter 11 and the second inverter 12 are controlled using different control schemes, based on the operating conditions of the rotating electrical machine 80 will be described in detail below.

Figure 5:
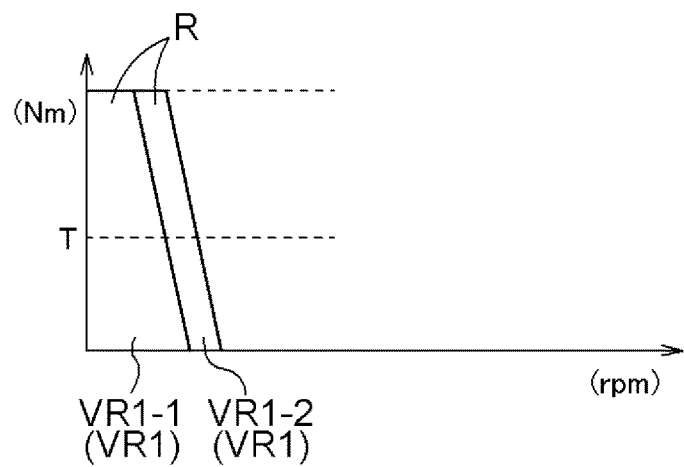
FIG. 5 is a diagram showing an example of control regions of the rotating electrical machine.

In the present embodiment (first embodiment), a plurality of control regions R based on the operating conditions of the rotating electrical machine 80 (see FIG. 5, etc.) are set, and the rotating electrical machine control device 1 controls the inverters 10 using control schemes determined based on the control regions R. FIG. 5 shows an example of a relationship between the rotational speed and torque of the rotating electrical machine 80. For example, as shown in FIG. 5, as the control regions R of the rotating electrical machine 80, at least a first speed region VR1 and a second speed region VR2 in which the rotational speed of the rotating electrical machine 80 is higher than in the first speed region VR1 for the same torque T are set.

As described above, the rotating electrical machine control device 1 can control the first inverter 11 and the second inverter 12 using a plurality of control schemes with different switching patterns, and can control the first inverter 11 and the second inverter 12 using control schemes which are independent of each other. The control schemes include pulse width modulation control (PWM) in which a plurality of pulses with different patterns are outputted in one cycle of electrical angle; and mixed pulse width modulation control (MX-PWM) in which control is performed such that a plurality of pulses with different patterns are outputted during a first period T1 which is a half cycle of electrical angle (see FIG. 8, etc.) and an inactive state continues during a second period T2 which is the other half cycle (see FIG. 8, etc.) (which will be described later with reference to FIGS. 8 to 11). In the second speed region VR2, the rotating electrical machine control device 1 controls both inverters, the first inverter 11 and the second inverter 12, by mixed pulse width modulation control.

In the mixed pulse width modulation control, since switching control signals are in inactive state during the second period T2, too, loss in the inverters 10 decreases, and harmonic current resulting from switching also decreases and thus loss (iron loss) in the rotating electrical machine 80 also decreases. That is, by performing the mixed pulse width modulation control, system loss can be reduced.

In the first speed region VR1, the rotating electrical machine control device 1 controls the first inverter 11 and the second inverter 12 using different control schemes than the mixed pulse width modulation control. For example, as shown in the following table 1, in the first speed region VR1, the rotating electrical machine control device 1 controls one of the inverters 10, the first inverter 11 or the second inverter 12, (here, the first inverter 11) by active short-circuit control (ASC), and controls the other inverter 10 (here, the second inverter 12) by pulse width modulation control (PWM). Such control in the first speed region VR1 is referred to as target first speed region control.

TABLE 1

| R | INV1 | INV2 |
|---|------|------|
| VR1 | ASC | PWM |
| VR2 | MX-PWM | MX-PWM |

Note that although table 1 exemplifies a mode in which in the first speed region VR1, the first inverter 11 is controlled by active short-circuit control, as a matter of course, a mode in which the second inverter 12 is controlled by active short-circuit control may be adopted. Furthermore, in the first speed region VR1, a control scheme for controlling the first inverter 11 and a control scheme for controlling the second inverter 12 may be alternately switched in accordance with a condition determined in advance. By switching between the control schemes, consumption of only one of the first inverter 11 and the second inverter 12 or an increase in the amount of discharge of only one of the first direct current power supply 61 and the second direct current power supply 62 can be suppressed. Here, it is preferred that the determined condition be, for example, a set period of time or the amounts of discharge of the direct current power supplies 6.

Figure 6:
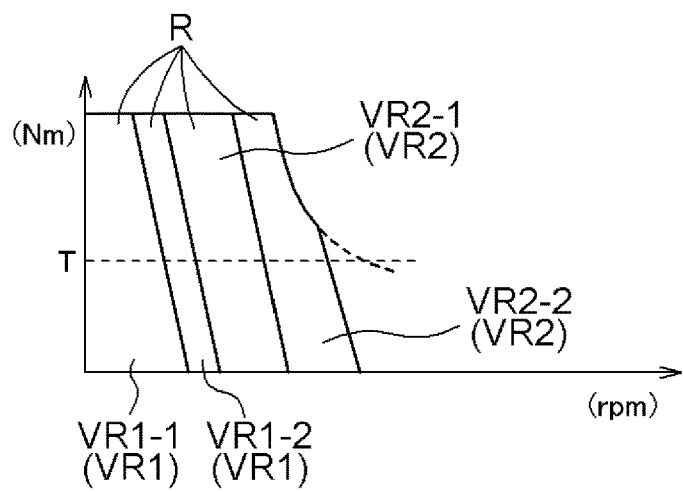
FIG. 6 is a diagram showing an example of control regions of the rotating electrical machine.

Meanwhile, as control regions R, as shown in FIG. 6, there may be set a low-speed side first speed region VR1-1 on a low speed side in a first speed region VR1; and a high-speed side first speed region VR1-2 on a high speed side in the first speed region VR1, in which the rotational speed of the rotating electrical machine 80 is higher than in the low-speed side first speed region VR1-1 for the same torque T. As shown in the following 2, in the low-speed side first speed region VR1-1, the rotating electrical machine control device 1 controls one of the inverters 10, the first inverter 11 or the second inverter 12, (here, the first inverter 11) by active short-circuit control, and controls the other inverter 10 (here, the second inverter 12) by continuous pulse width modulation control. In addition, in the high-speed side first speed region VR1-2, the rotating electrical machine control device 1 controls one of the inverters 10, the first inverter 11 or the second inverter 12, (here, the first inverter 11) by active short-circuit control, and controls the other inverter 10 (here, the second inverter 12) by discontinuous pulse width modulation control.

TABLE 2

| R | INV1 | INV2 |
|---|------|------|
| VR1-1 (VR1) | ASC | CPWM (PWM) |
| VR1-2 (VR1) | ASC | DPWM (PWM) |
| VR2 | MX-PWM | MX-PWM |

Note that it is preferred that pulse width modulation control performed when the first speed region VR1 is not divided into the low-speed side first speed region VR1-1 and the high-speed side first speed region VR1-2, i.e., when only the first speed region VR1 is set as shown in table 1, be continuous pulse width modulation (CPWM).

Note that although table 2 exemplifies a mode in which in the low-speed side first speed region VR1-1 and the high-speed side first speed region VR1-2, the first inverter 11 is controlled by active short-circuit control, as a matter of course, a mode in which the second inverter 12 is controlled by active short-circuit control may be adopted. In addition, an inverter 10 to be controlled by active short-circuit control may be different between the low-speed side first speed region VR1-1 and the high-speed side first speed region VR1-2 (also including a reverse combination), e.g., in the low-speed side first speed region VR1-1, the first inverter 11 is controlled by active short-circuit control and in the high-speed side first speed region VR1-2, the second inverter 12 is controlled by active short-circuit control. Furthermore, as described above, in the low-speed side first speed region VR1-1 and the high-speed side first speed region VR1-2 (i.e., the first speed region VR1), a control scheme for controlling the first inverter 11 and a control scheme for controlling the second inverter 12 may be alternately switched in accordance with a condition determined in advance.

In addition, as shown in FIG. 6, as control regions R, there may be set a low-speed side second speed region VR2-1 on a low speed side in a second speed region VR2; and a high-speed side second speed region VR2-2 on a high speed side in the second speed region VR2, in which the rotational speed of the rotating electrical machine 80 is higher than in the low-speed side second speed region VR2-1 for the same torque T. In addition, mixed pulse width modulation control (MX-PWM) may include mixed continuous pulse width modulation control (MX-CPWM) and mixed discontinuous pulse width modulation control (MX-DPWM). Though details will be described later, in the mixed continuous pulse width modulation control, control is performed such that an inactive state continues during a second period T2, and pulse width modulation is continuously performed for all of the arms 3A for a plurality of phases during a first period T1 (which will be described later with reference to FIGS. 8 and 10). Likewise, though details will be described later, in the mixed discontinuous pulse width modulation control, control is performed such that during a second period T2, an inactive state continues, and during a first period T1, pulse width modulation is performed including a period during which switching elements 3 in an arm 3A for one of the plurality of phases are fixed to on state or off state (which will be described later with reference to FIGS. 9 and 11).

In such a case, as shown in the following table 3, in the low-speed side second speed region VR2-1, the rotating electrical machine control device 1 controls both inverters 10, the first inverter 11 and the second inverter 12, by mixed continuous pulse width modulation control (MX-CPWM), and in the high-speed side second speed region VR2-2, the rotating electrical machine control device 1 controls both inverters 10, the first inverter 11 and the second inverter 12, by mixed discontinuous pulse width modulation control (MX-DPWM). Note that it is preferred that mixed pulse width modulation control (MX-PWM) performed when the second speed region VR2 is not divided into the low-speed side second speed region VR2-1 and the high-speed side second speed region VR2-2, i.e., when only the second speed region VR2 is set as shown in tables 1 and 2, be mixed continuous pulse width modulation control (MX-CPWM).

TABLE 3

| R | INV1 | INV2 |
|---|------|------|
| VR1-1 (VR1) | ASC | CPWM (PWM) |
| VR1-2 (VR1) | ASC | DPWM (PWM) |
| VR2-1 (VR2) | MX-CPWM(MX-PWM) | MX-CPWM(MX-PWM) |
| VR2-2 (VR2) | MX-DPWM(MX-PWM) | MX-DPWM(MX-PWM) |

In addition, as shown in FIG. 7, as a control region R, there may be further set a third speed region VR3 in which the rotational speed of the rotating electrical machine 80 is higher than in the second speed region VR2 for the same torque T. In this case, as shown in the following table 4, it is preferred that in the third speed region VR3, the rotating electrical machine control device 1 control both inverters 10, the first inverter 11 and the second inverter 12, by the above-described rectangular-wave control. Note that table 4 exemplifies assignments of control schemes for a case in which each of the first speed region VR1 and the second speed region VR2 is divided into two regions on the low speed side and the high speed side. A mode for a case in which the first speed region VR1 and the second speed region VR2 are not divided is obtained by simply adding the third speed region VR3 to table 1, and thus, provision of a table is omitted.

TABLE 4

| R | INV1 | INV2 |
|---|---|---|
| VR1-1 (VR1) | ASC | CPWM (PWM) |
| VR1-2 (VR1) | ASC | DPWM (PWM) |
| VR2-1 (VR2) | MX-CPWM(MX-PWM) | MX-CPWM(MX-PWM) |
| VR2-2 (VR2) | MX-DPWM(MX-PWM) | MX-DPWM(MX-PWM) |
| VR3 | 1-Pulse | 1-Pulse |

Here, it is preferred that boundaries between the control regions R be set according to at least one of the rotational speed of the rotating electrical machine 80 based on the torque of the rotating electrical machine 80 and a ratio of the root-mean-square value of line-to-line voltage of alternating current voltages of a plurality of phases to direct current bus voltage (which may be an instruction value or may be an equivalent from output voltage).

As exemplified in FIGS. 5 to 7, the operating conditions of the rotating electrical machine 80 are often defined by a relationship between rotational speed and torque. The control regions R may be set based on rotational speed which is one parameter. Here, the rotational speed that defines a boundary between control regions R can be set to be constant regardless of torque, but it is further preferred that the rotational speed that defines a boundary between control regions R be set to different values depending on the torque. By doing so, drive of the rotating electrical machine 80 can be controlled with high efficiency, based on the operating conditions of the rotating electrical machine 80.

In addition, for example, when the rotating electrical machine 80 requires high output (high rotational speed or high torque), a voltage-type inverter implements the requirement by increasing direct current bus voltage or increasing a ratio at which direct current bus voltage is converted into alternating current voltage. When the direct current bus voltage is constant, the requirement can be implemented by increasing a ratio at which the direct current bus voltage is converted into alternating current voltage. This ratio can be represented as a ratio of the root-mean-square value of three-phase alternating current electric power to direct current bus electric power (in a case of a voltage-type inverter, it is equivalent to a ratio of the root-mean-square value of three-phase alternating current line-to-line voltage to direct current bus voltage). As described above, control schemes for controlling the inverters 10 include various schemes from a scheme in which the ratio is low to a scheme in which the ratio is high.

When the control regions R are set based on the ratio of the root-mean-square value of three-phase alternating current line-to-line voltage to direct current bus voltage (modulation index) which is determined according to a requirement for the rotating electrical machine 80, drive of the rotating electrical machine 80 can be controlled with high efficiency, based on the operating conditions of the rotating electrical machine 80. Table 5 shown below corresponds to table 4 shown above and exemplifies modulation indices for each control region R. Though details will be described later, in the table, "Vi_inv1" represents the modulation index of the first inverter 11, "Mi_inv2" represents the modulation index of the second inverter 12, and "Mi_sys" represents the modulation index of the entire system.

TABLE 5

| R | Mi_sys | INV1 | Mi_inv1 | INV2 | Mi_inv2 |
|---|---|---|---|---|---|
| VR1-1 | M < a | ASC | M = 0 | CPWM | M < 2a |
| VR1-2 | a ≤ M < X | ASC | M = 0 | DPWM | 2a ≤ M < 2X |
| VR2-1 | X ≤ M < b | MX-CPWM | X ≤ M < b | MX-CPWM | X ≤ M < b |
| VR2-2 | b ≤ M < 0.78 | MX-DPWM | b ≤ M < 0.78 | MX-DPWM | b ≤ M < 0.78 |
| VR3 | M = 0.78 | 1-Pulse | M = 0.78 | 1-Pulse | M = 0.78 |

In the present embodiment, the terminal-to-terminal voltage "E1" of the first direct current power supply 61 and the terminal-to-terminal voltage "E2" of the second direct current power supply 62 are identical (both are voltage "E"). When the root-mean-square value on the alternating current side of the first inverter 11 is "Va_inv1" and the root-mean-square value on the alternating current side of the second inverter 12 is "Va_inv2", the modulation index "Mi_inv1" of the first inverter 11 and the modulation index "Mi_inv2" of the second inverter 12 are as shown in the following equations (1) and (2). In addition, the modulation index "Mi_sys" of the entire system is as shown in the following equation (3).

$$Mi\_inv1 = Va\_inv1/E1 = Va\_inv1/E \quad (1)$$

$$Mi\_inv2 = Va\_inv2/E2 = Va\_inv2/E \quad (2)$$

$$Mi\_sys = (Va\_inv1 + Va\_inv2)/(E1 + E2) \quad (3)$$
$$= (Va\_inv1 + Va\_inv2)/2E$$

For the instantaneous value of voltage, an instantaneous vector needs to be considered, but when only the modulation index is simply considered, the modulation index "Mi_sys" of the entire system is "(Mi_inv1+Mi_inv2)/2" from equations (1) to (3). Note that table 5 shows, as rated values, modulation indices for each control region R. Hence, upon actual control, taking into account hunting occurring when a control scheme changes between control regions R, etc., modulation indices for each control region R may include an overlapping range.

Note that the modulation index "X" is set based on a theoretical upper limit value (approximately 0.707) of a modulation index for continuous pulse width modulation (space vector pulse width modulation), and further taking into account dead time. As shown in tables 1 to 5, etc., in the first speed region VR1, modulation may be performed by only one inverter 10. Thus, in the first speed region VR1, the maximum modulation index "2X" of one inverter 10 (here, the second inverter 12) is set to, for example, about 0.5 to 0.6, based on a theoretical upper limit value of a modulation index for continuous pulse width modulation control (approximately 0.707 for space vector pulse width modulation), and further taking into account dead time. Thus, the modulation "X" is set to, for example, a value of about 0.25 to 0.3. The modulation indices "a" and "b" are set as appropriate, based on experiments, simulations, etc.

In the first speed region VR1, one inverter 10 (e.g., the first inverter 11) out of the two inverters 10 is controlled by active short-circuit control. That is, the rotating electrical machine 80 is driven substantially by only one inverter 10 (e.g., the second inverter 12) out of the two inverters 10. Since one inverter 10 does not perform switching operation, switching loss can be reduced correspondingly, and as a result, the rotating electrical machine 80 can be driven while loss in the entire system is suppressed.

When two inverters 10 are provided like the present configuration, alternating current voltage with an amplitude larger than that of voltage on the direct current side of each inverter 10 can be generated. Note, however, that the rotating electrical machine control device 1 does not need to control the two inverters 10 such that the amplitude of alternating current is always large, and for example, when the rotational speed of the rotating electrical machine 80 is low, it may be sufficient to generate alternating current voltage that can be generated by one inverter 10. When one of the two inverters 10 is controlled by active short-circuit control, the stator coils 8 of three phases are short-circuited in the one inverter 10. In this case, the other inverter 10 controls drive of the rotating electrical machine 80 having the stator coils 8 that are connected to each other to have a neutral point.

In addition, as described above, a modulation index for continuous pulse width modulation is higher in space vector pulse width modulation than in sinusoidal pulse width modulation, and is even higher in discontinuous pulse width modulation than in space vector pulse width modulation. When the first speed region VR1 is divided, the high-speed side first speed region VR1-2 is a control region in which the rotational speed of the rotating electrical machine 80 is higher than in the low-speed side first speed region VR1-1, and the high-speed side first speed region VR1-2 requires a higher modulation index than the low-speed side first speed region VR1-1. By performing continuous pulse width modulation control in the low-speed side first speed region VR1-1 and performing discontinuous pulse width modulation control in the high-speed side first speed region VR1-2, in the entire first speed region VR1, control schemes are appropriately switched from one to another according to a load, by which the rotating electrical machine 80 can be driven while loss in the entire system is suppressed.

In addition, the third speed region VR3 on the highest speed side for the same torque T requires the highest modulation index. In the third speed region VR3, both inverters 10, the first inverter 11 and the second inverter 12, are controlled by rectangular-wave control having the physically highest modulation index. That is, when the rotating electrical machine 80 requires a high load, the rotating electrical machine 80 can be appropriately driven.

The second speed region VR2 is located midway between the first speed region VR1 and the third speed region VR3, and can be said to be a control region corresponding to a so-called medium speed region to high speed region or medium modulation index region to high modulation index region. In this region (second speed region VR2), both of the first inverter 11 and the second inverter 12 may be controlled by continuous pulse width modulation control or discontinuous pulse width modulation control. In the present embodiment, in the second speed region VR2, by controlling both of the first inverter 11 and the second inverter 12 by mixed pulse width modulation control, switching loss in the inverters 10 can be further reduced compared with a case in which both of the first inverter 11 and the second inverter 12 are controlled by continuous pulse width modulation control or discontinuous pulse width modulation control.

According to experiments and simulations conducted by the inventors, it has been confirmed that application of mixed pulse width modulation control is effective particularly for the low-speed side second speed region VR2-1. Namely, when mixed continuous pulse width modulation control is performed in at least the low-speed side second speed region VR2-1, system loss decreases. As shown in the following table 6, in the high-speed side second speed region VR2-2, the rotating electrical machine control device 1 may control both inverters 10, the first inverter 11 and the second inverter 12, by discontinuous pulse width modulation control instead of mixed discontinuous pulse width modulation control.

TABLE 6

| R | Mi_sys | INV1 | Mi_inv1 | INV2 | Mi_inv2 |
|---|---|---|---|---|---|
| VR1-1 | M < a | ASC | M = 0 | CPWM | M < 2a |
| VR1-2 | a ≤ M < X | ASC | M = 0 | DPWM | 2a ≤ M < 2X |
| VR2-1 | X ≤ M < b | MX-CPWM | X ≤ M < b | MX-CPWM | X ≤ M < b |
| VR2-2 | b ≤ M < 0.78 | DPWM | b ≤ M < 0.78 | DPWM | b ≤ M < 0.78 |
| VR3 | M = 0.78 | 1-Pulse | M = 0.78 | 1-Pulse | M = 0.78 |

Control schemes for each control region R will be described below with reference to exemplary waveforms of U-phase voltage instructions (Vu1 and Vu2) and U-phase upper-stage-side switching control signals (Su1+ and Su2+). Depiction of a second U-phase lower-stage-side switching control signal Su2− and the V-phase and the W-phase is omitted.

Figure 8:
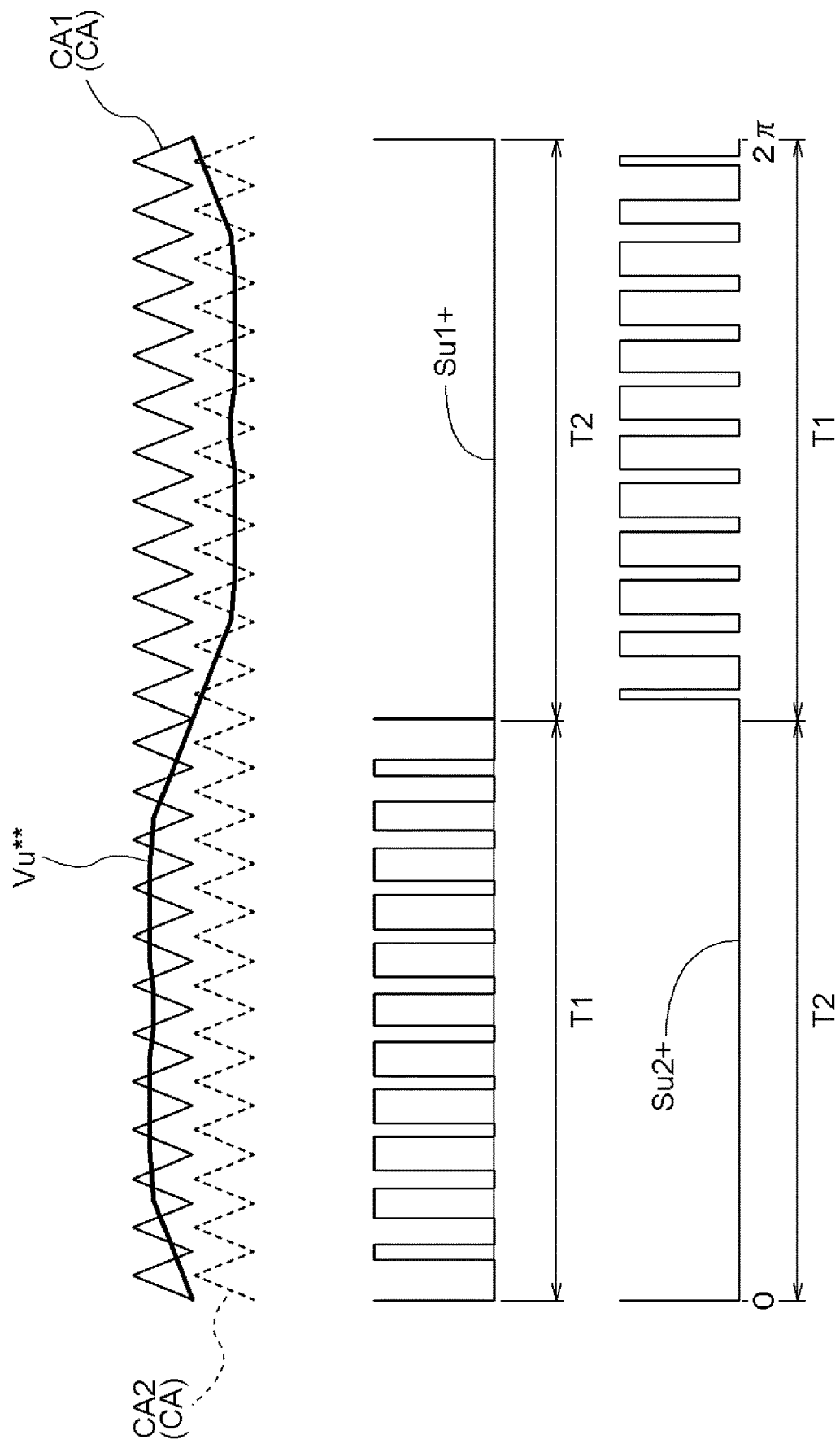
FIG. 8 is a waveform diagram showing an example of a voltage instruction and switching control signals for a second speed region (low-speed side second speed region).
Figure 10:
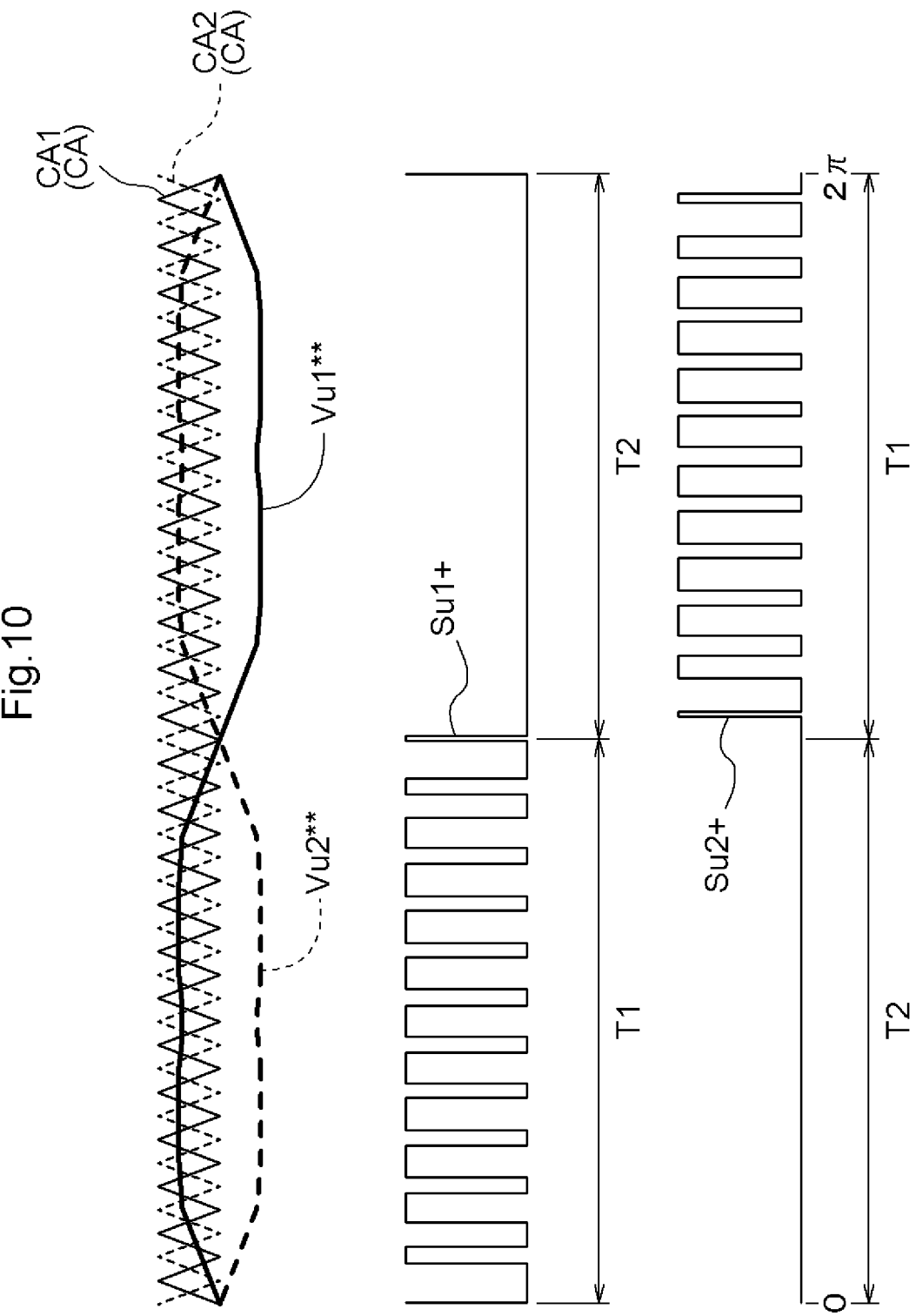
FIG. 10 is a waveform diagram showing another example of voltage instructions and switching control signals for the second speed region (low-speed side second speed region).
Figure 11:
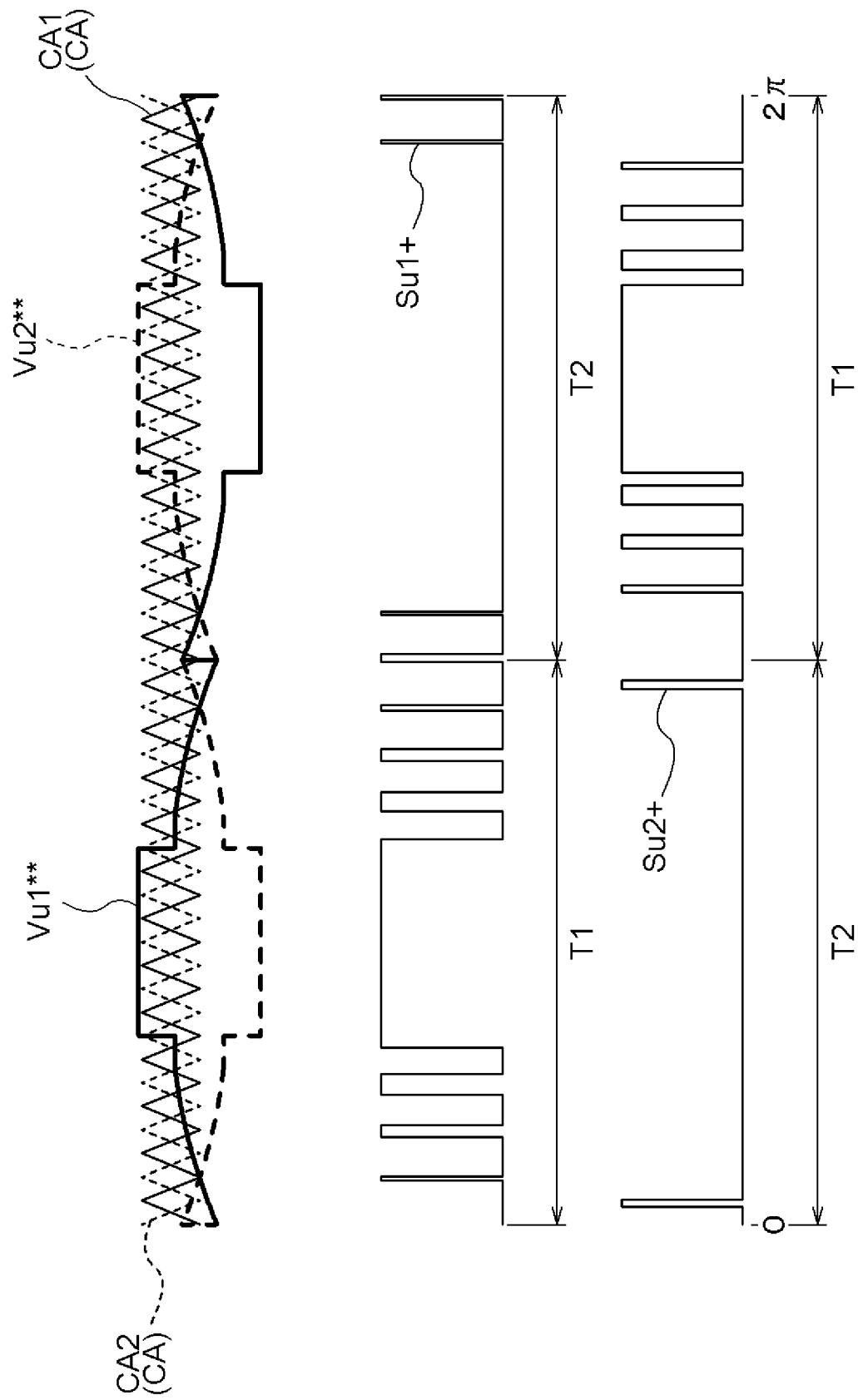
FIG. 11 is a waveform diagram showing another example of voltage instructions and switching control signals for the high-speed side second speed region.

First, the most characteristic mixed pulse width modulation control (MX-PWM) in the present embodiment which is performed in the second speed region VR2 will be described with reference to FIGS. 8 to 11. FIGS. 8 and 10 show mixed continuous pulse width modulation control (MX-CPWM) and FIGS. 9 and 11 show mixed discontinuous pulse width modulation control (MX-DPWM).

Figure 9:
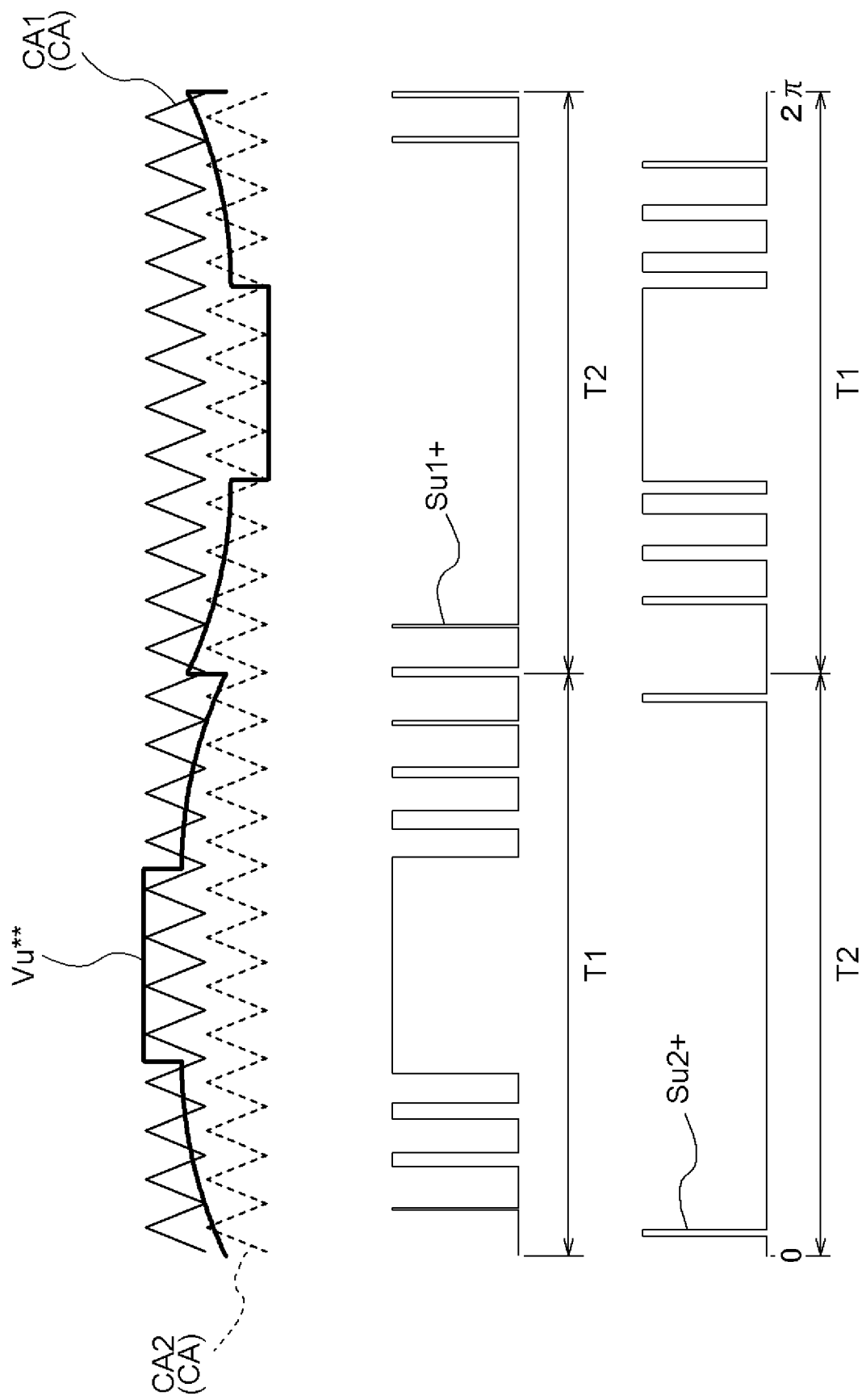
FIG. 9 is a waveform diagram showing an example of a voltage instruction and switching control signals for a high-speed side second speed region.

FIGS. 8 and 9 show examples of a first carrier CA1 which is a carrier CA for the first inverter 11, a second carrier CA2 which is a carrier CA for the second inverter 12, a common U-phase voltage instruction Vu** which is a U-phase voltage instruction common to the first inverter 11 and the second inverter 12, a first U-phase upper-stage-side switching control signal Su1+, and a second U-phase upper-stage-side switching control signal Su2+. Depiction of a first U-phase lower-stage-side switching control signal Su1− and a second U-phase lower-stage-side switching control signal Su2−, and the V-phase and the W-phase is omitted (the same also applies to other control schemes).

For example, the first carrier CA1 can change between "0.5<CA1<1", the second carrier CA2 can change between "0<CA2<0.5", and the voltage instruction (V) can change between "0≤V≤1". As a result of a comparison of the carriers CA (the first carrier CA1 and the second carrier VA2) and the voltage instruction (V), if the voltage instruction is greater than or equal to the carriers CA, then the switching control signals are "1", and if the voltage instruction is less than the carriers CA, then the switching control signals are "0". Comparative logic between the carriers CA and the voltage instruction (V) is also the same in the following description.

As shown in FIGS. 8 and 9, the amplitudes of the first carrier CA1 and the second carrier CA2 are half of an amplitude allowed for the voltage instruction (V). In general pulse width modulation, the amplitudes of the carriers CA are equal to an amplitude allowed for the voltage instruction, and the carriers CA for mixed pulse width modulation can be referred to as half carriers. By using such half carriers, during a first period T1 which is a half cycle of electrical angle, such a half carrier crosses the voltage instruction (V), and thus, a plurality of pulses with different patterns are outputted as a switching control signal. During a second period T2 which is the other half cycle, the half carrier does not cross the voltage instruction (V**), and thus, the switching control signal is outputted such that an inactive state continues.

Note that in mixed discontinuous pulse width modulation control, as shown in FIG. 9, during the second period T2, too, pulses in an active state are partially outputted as a switching control signal. This results from the fact that the modulation index for discontinuous pulse width modulation which serves as a base is large compared with that of continuous pulse width modulation. Locations where the pulses in an active state are outputted during the second period T2 are near the center of the amplitude of the voltage instruction (V) and in the neighborhood of inflection points of the voltage instruction (V). As shown in FIG. 9, it can be said that in mixed discontinuous pulse width modulation control, too, an inactive state is continuously outputted during the second period T2. In addition, when the second period T2 is a period during which the switching control signal is only in an inactive state (a period less than a half cycle), and a period in one cycle other than the second period T2 (a period greater than or equal to a half cycle) is set, mixed pulse width modulation can also be defined as follows. It can also be said that mixed pulse width modulation control performs control such that a plurality of pulses with different patterns are outputted during the first period T1 which is greater than or equal to a half cycle of electrical angle, and an inactive state continues during the second period T2 which is the other period of one cycle of electrical angle.

FIGS. 10 and 11 exemplify a different mode of mixed continuous pulse width modulation control and mixed discontinuous pulse width modulation control than that of FIGS. 8 and 9. Switching control signals to be generated are the same. FIGS. 10 and 11 show examples of a first carrier CA1 which is a carrier CA for the first inverter 11, a second carrier CA2 which is a carrier CA for the second inverter 12, a first U-phase voltage instruction Vu1 which is a U-phase voltage instruction for the first inverter 11, a second U-phase voltage instruction Vu2 which is a U-phase voltage instruction for the second inverter 12, a first U-phase upper-stage-side switching control signal Su1+, and a second U-phase upper-stage-side switching control signal Su2+. For example, the first carrier CA1 and the second carrier CA2 can change between "0.5<CA1<1" and the voltage instructions (V) can change between "0≤V≤1". The first carrier CA1 and the second carrier CA2 differ from each other in phase by 180 degrees (π). In addition, the first U-phase voltage instruction Vu1 and the second U-phase voltage instruction Vu2 also differ from each other in phase by 180 degrees (π).

As shown in FIGS. 10 and 11, the amplitudes of the first carrier CA1 and the second carrier CA2 are half of an amplitude allowed for the voltage instructions (V). Thus, the carriers CA in the mode shown in FIGS. 10 and 11 are also half carriers. By using such half carriers, during a first period T1 which is a half cycle of electrical angle (or greater than or equal of a half cycle), such a half carrier crosses the voltage instruction (V), and thus, a plurality of pulses with different patterns are outputted as a switching control signal. During a second period T2 which is the other period of the cycle, the half carrier does not cross the voltage instruction (V**), and thus, the switching control signal is outputted such that an inactive state continues.

The mode exemplified in FIGS. 8 and 9 is a scheme in which modulation is performed using two half carriers and one common reference voltage instruction (V), and thus can be said to be a double half carrier and single reference scheme. On the other hand, the mode exemplified in FIGS. 10 and 11 is a scheme in which modulation is performed using two half carriers and two voltage instructions (V), and thus can be said to be a double half carrier and double reference scheme.

As described above with reference to FIGS. 8 to 11, in mixed pulse width modulation control, a plurality of pulses are generated based on half carriers (the first carrier CA1 and the second carrier CA2) which are carriers CA whose wave heights are half of a variable range of an instruction value (a voltage instruction; in the above-described examples, the U-phase voltage instructions (Vu (Vu=Vu1=Vu2), Vu1, and Vu2)), and the instruction value.

In the present embodiment, as schemes for mixed pulse width modulation control, two schemes, the double half carrier and single reference scheme and the double half carrier and double reference scheme, are exemplified.

In the double half carrier and single reference scheme, as described with reference to FIGS. 8 and 9, pulses for the first inverter 11 are generated based on a first half carrier (first carrier CA1) that is set, as a half carrier, on one of a higher voltage side and a lower voltage side (here, the higher voltage side) than the center of the amplitude of an instruction value (common U-phase voltage instruction Vu), and an instruction value (common U-phase voltage instruction Vu) common to the first inverter 11 and the second inverter 12. In addition, in this scheme, pulses for the second inverter 12 are generated based on a second half carrier (second carrier CA2) that has the same phase as the first half carrier (first carrier CA1) and that is set on the other one of the higher voltage side and the lower voltage side (here, the lower voltage side) than the center of the amplitude of the instruction value (common U-phase voltage instruction Vu), and the instruction value (common U-phase voltage instruction Vu).

In the double half carrier and double reference scheme, as described with reference to FIGS. 10 and 11, pulses for the first inverter 11 are generated based on a first half carrier (first carrier CA1) that is set, as a half carrier, on one of a higher voltage side and a lower voltage side (here, the higher voltage side) than the centers of the amplitudes of instruction values (the first U-phase voltage instruction Vu1 and the second U-phase voltage instruction Vu2), and a first instruction value for the first inverter 11 (first U-phase voltage instruction Vu1). In addition, in this scheme, pulses for the second inverter 12 are generated based on a second half carrier (second carrier CA2) that differs from the first half carrier (first carrier CA1) in phase by 180 degrees and that is set on the same side (the higher voltage side) as the first half carrier (first carrier CA1), and a second instruction value for the second inverter 12 (second U-phase voltage instruction Vu2) that differs from the first instruction value (first U-phase voltage instruction Vu1**) in phase by 180 degrees.

Note that though depiction is omitted, pulses can also be generated using a single half carrier and double reference scheme in which pulses are generated based on a common half carrier and instruction values whose phases differ from each other by 180 degrees. That is, in this scheme, a common half carrier (carrier CA) is set on one of a higher voltage side and a lower voltage side (e.g., the higher voltage side) than the centers of the amplitudes of instruction values (the first U-phase voltage instruction Vu1 and the second U-phase voltage instruction Vu2), and pulses for the first inverter 11 are generated based on the half carrier (carrier CA) and a first instruction value for the first inverter 11 (first U-phase voltage instruction Vu1). In addition, in this scheme, pulses for the second inverter 12 are generated based on a second instruction value for the second inverter 12 (second U-phase voltage instruction Vu2) that differs from the first instruction value (first U-phase voltage instruction Vu1**) in phase by 180 degrees, and the half carrier (carrier CA).

Note, however, that it has been confirmed by simulations and experiments conducted by the inventors that harmonic content, particularly, at the frequency of the carrier CA is suppressed in the double half carrier and single reference scheme and the double half carrier and double reference scheme, compared with the single half carrier and double reference scheme. Thus, it is preferred that mixed pulse width modulation control be performed using the double half carrier and single reference scheme or the double half carrier and double reference scheme.

Figure 12:
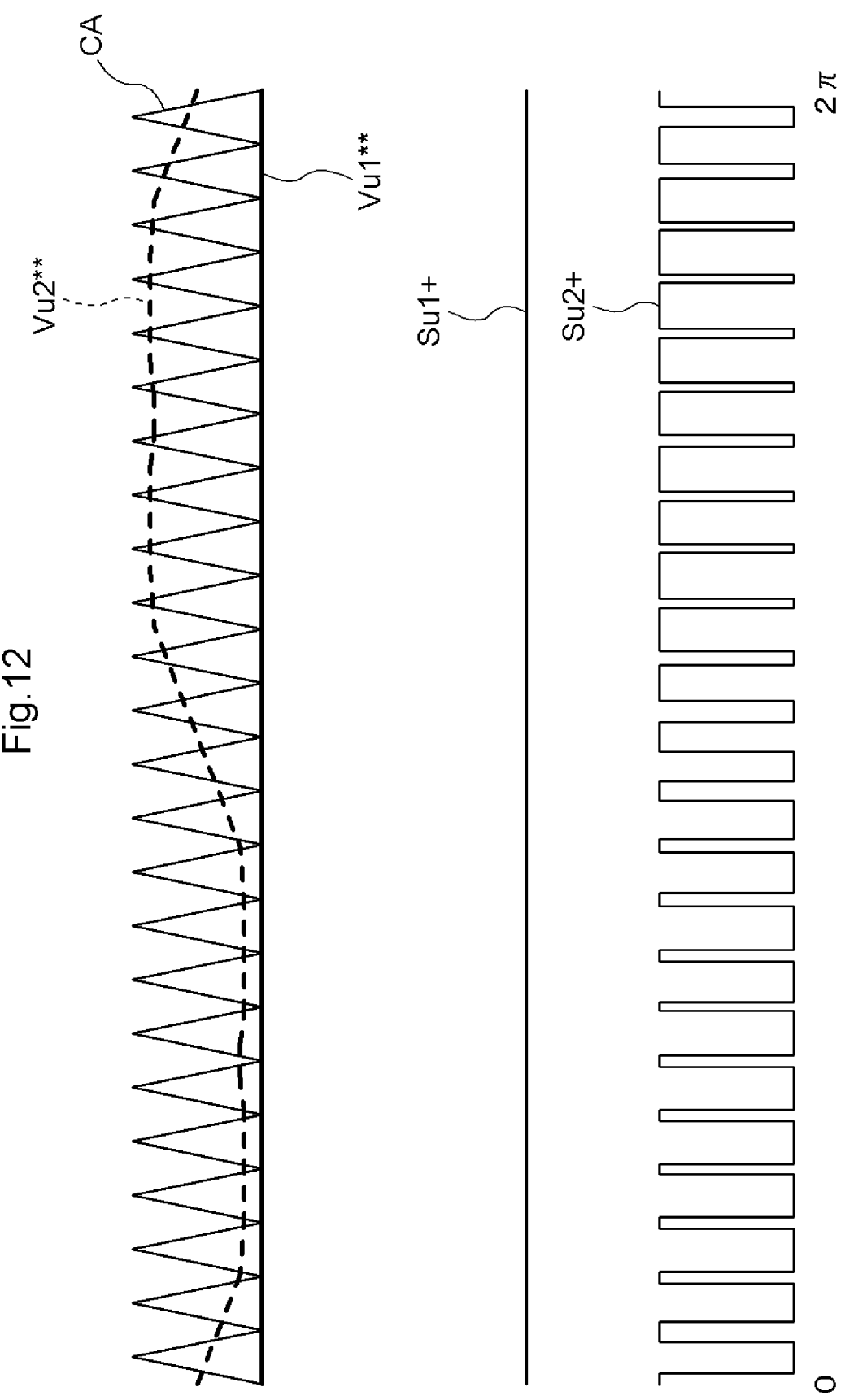
FIG. 12 is a waveform diagram showing an example of voltage instructions and switching control signals for a first speed region (low-speed side first speed region).

A waveform diagram of FIG. 12 shows an example of a first U-phase voltage instruction Vu1 which is a U-phase voltage instruction for the first inverter 11, a second U-phase voltage instruction Vu2 which is a U-phase voltage instruction for the second inverter 12, a carrier CA, a first U-phase upper-stage-side switching control signal Su1+, and a second U-phase upper-stage-side switching control signal Su2+ for the low-speed side first speed region VR1-1. For example, the carrier CA changes between "0<CA<1" and the voltage instructions (V) change between "0≤V≤1". Variable ranges of the carrier CA and the voltage instructions (V**) are also the same in the following description.

In the low-speed side first speed region VR1-1, the second inverter 12 is controlled by continuous pulse width modulation control. As shown in FIG. 12, the second U-phase upper-stage-side switching control signal Su2+ in pulse form is generated based on the carrier CA and the second U-phase voltage instruction Vu2**.

As described above, in the low-speed side first speed region VR1-1, the first inverter 11 is controlled by active short-circuit control, and thus, the first U-phase voltage instruction Vu1  is fixed to, for example, "0" and the first U-phase upper-stage-side switching control signal Su1+ is always "0". Though depiction is omitted, a first U-phase lower-stage-side switching control signal Su1− is always "1". By this, the upper-stage-side switching element 3H (31H) in the arm 3A for the U-phase in the first inverter 11 is controlled to off state, and the lower-stage-side switching element 3L (31L) is controlled to on state. The same also applies to the V-phase and the W-phase, and by this, the first inverter 11 is controlled by lower-stage-side active short-circuit control. Note that the first U-phase switching control signals Su1 may be set to fixed values without setting the first U-phase voltage instruction Vu1.

Figure 13:
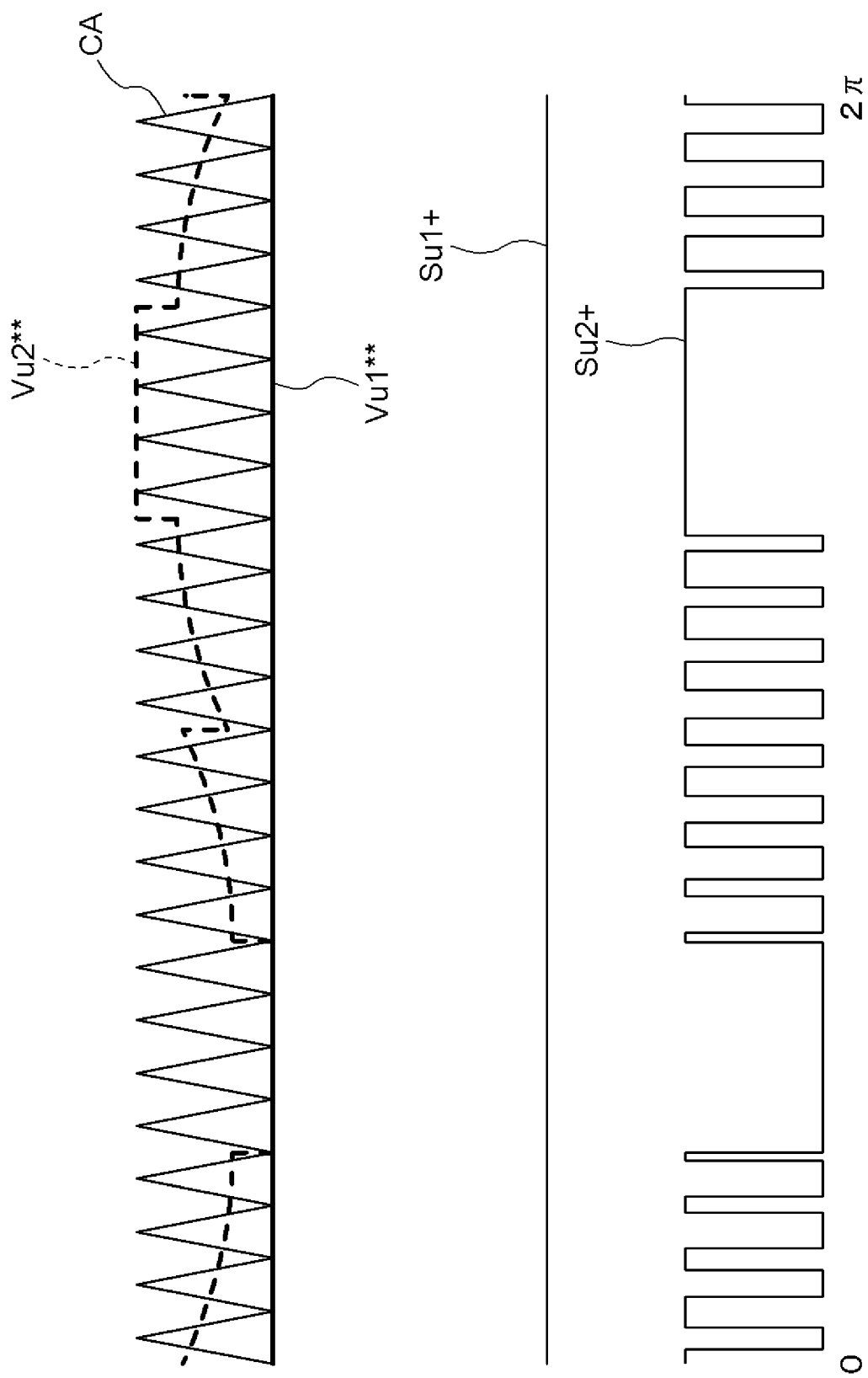
FIG. 13 is a waveform diagram showing an example of voltage instructions and switching control signals for a high-speed side first speed region.

A waveform diagram of FIG. 13 shows an example of a first U-phase voltage instruction Vu1, a second U-phase voltage instruction Vu2, a carrier CA, a first U-phase upper-stage-side switching control signal Su1+, and a second U-phase upper-stage-side switching control signal Su2+ for the high-speed side first speed region VR1-2. As with the low-speed side first speed region VR1-1, in the high-speed side first speed region VR1-2, the first inverter 11 is controlled by active short-circuit control, and thus, the first U-phase voltage instruction Vu1 has a fixed value. In the high-speed side first speed region VR1-2, the second inverter 12 is controlled by discontinuous pulse width modulation control. In a section where the second U-phase voltage instruction Vu2 is "0" or "1", the first U-phase upper-stage-side switching control signal Su1+ has a fixed value and the switching element 3 (32) is fixed to on state or off state.

Figure 14:
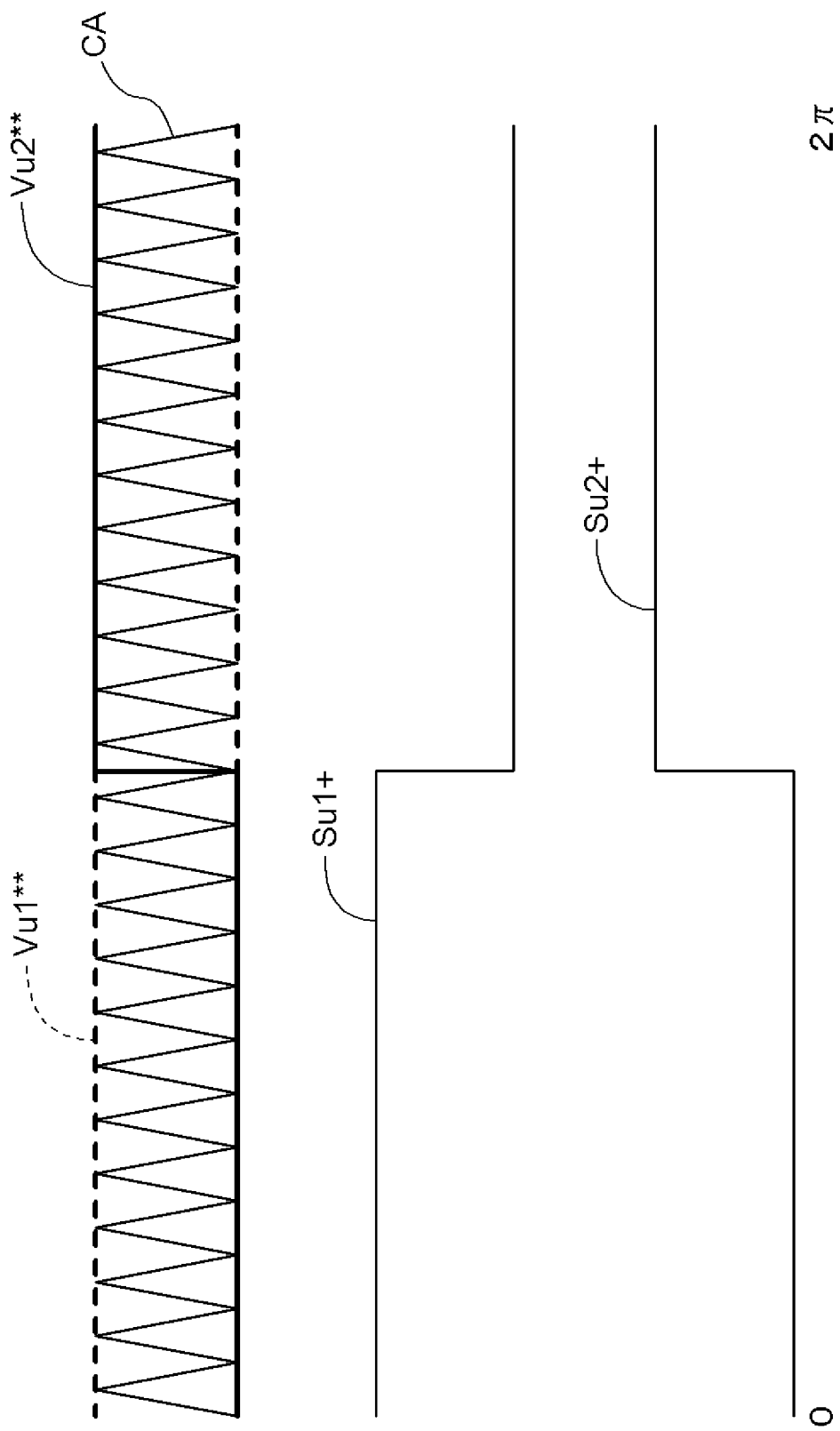
FIG. 14 is a waveform diagram showing another example of voltage instructions and switching control signals for a third speed region.

A waveform diagram of FIG. 14 shows an example of a first U-phase voltage instruction Vu1, a second U-phase voltage instruction Vu2, a carrier CA, a first U-phase upper-stage-side switching control signal Su1+, and a second U-phase upper-stage-side switching control signal Su2+ for the third speed region VR3. As described above, in the third speed region VR3, the first inverter 11 and the second inverter 12 are both controlled by rectangular-wave control. Note that when the inverters 10 are controlled by rectangular-wave modulation control, the carrier CA is not required, but for easy comparison with other control schemes, the carrier CA is also shown.

Figure 15:
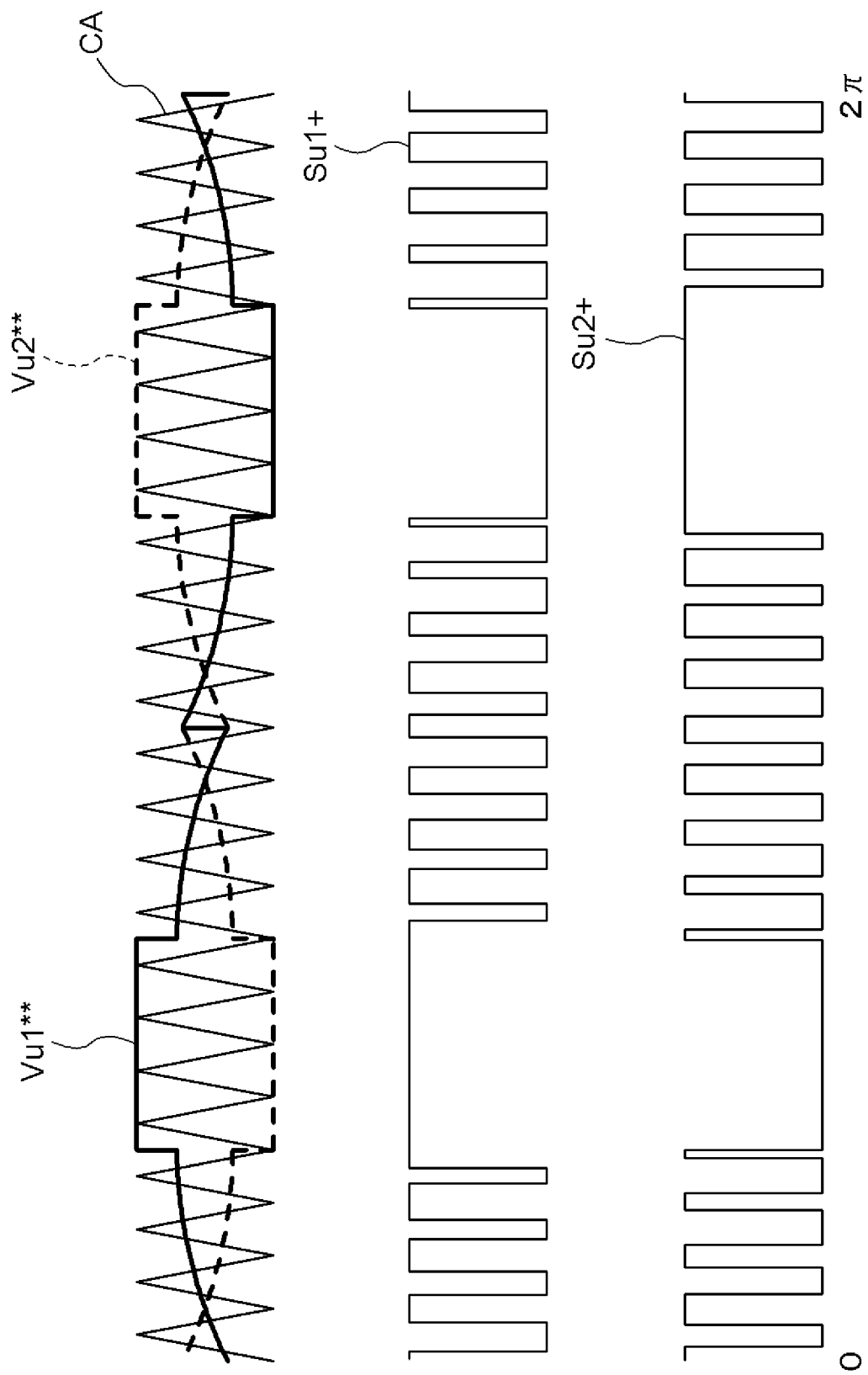
FIG. 15 is a waveform diagram showing another example of voltage instructions and switching control signals for the high-speed side second speed region.

A waveform diagram of FIG. 15 shows an example of a first U-phase voltage instruction Vu1, a second U-phase voltage instruction Vu2, a carrier CA, a first U-phase upper-stage-side switching control signal Su1+, and a second U-phase upper-stage-side switching control signal Su2+ for a case in which as described above with reference to table 6, both inverters 10 are controlled by discontinuous pulse width modulation control in the high-speed side second speed region VR2-2.

As shown in FIGS. 8 to 11, 14, and 15, when switching control is performed on both of the first inverter 11 and the second inverter 12, the first U-phase voltage instruction Vu1 and the second U-phase voltage instruction Vu2 have phases different from each other by approximately 180 degrees. For example, the maximum amplitude of U-phase voltage is "(4/3)E" and the maximum amplitude of line-to-line voltage is "2E" (see also the vector diagrams of FIGS. 3 and 4). Note that the first direct current power supply 61 and the second direct current power supply 62 are independent of each other, and the first direct current bus voltage E1 of the first direct current power supply 61 and the second direct current bus voltage E2 of the second direct current power supply 62 may have different values. For example, to be precise, the maximum amplitude of U-phase voltage is "(⅔)E1)+(⅔)E2", but for easy understanding, in this specification, "E1=E2=E".

As described above, in the first speed region VR1 which is a relatively low electric power region with a relatively small modulation index and a relatively low rotational speed, all electric power is supplied from one inverter 10. At this time, a voltage instruction (V) is provided to one inverter 10 so as to perform active short-circuit control, and a normal voltage instruction (V) is provided to the other inverter 10. In the second speed region VR2 and the third speed region VR3 which are high electric power regions relative to the first speed region VR1 and have a large modulation index and a high rotational speed relative to the first speed region VR1, equal electric power is supplied from the two inverters 10. At this time, identical voltage instructions (V**) whose phases differ from each other by 180 degrees ($\pi$) are provided to both inverters 10.

Meanwhile, when switching control of the inverters 10 is performed, ripple components superimposed on an alternating current fundamental may generate noise in an audio frequency band. When the two inverters 10 are controlled using different control schemes, ripples based on each control scheme occur, which may increase noise in the audio frequency band. Particularly, when the rotational speed of the rotating electrical machine 80 is low, the possibility of inclusion of the frequency of ripple components (or sideband frequencies thereof) in the audio frequency band increases. It is desirable to appropriately set control schemes for the rotating electrical machine 80, i.e., control schemes for the inverters 10, based on operating conditions so that both of operation with high system efficiency and a reduction in audible noise can be achieved.

The rotating electrical machine control device 1 of the present embodiment has, as control modes of the rotating electrical machine 80, a loss reduction priority mode and a noise reduction priority mode in a switchable manner. In the loss reduction priority mode, the rotating electrical machine control device 1 performs target first speed region control in the first speed region VR1 as described above, and in the noise reduction priority mode, the rotating electrical machine control device 1 performs alternative first speed region control instead of the target first speed region control. Specifically, in the noise reduction priority mode, as shown in the following table 7, in the first speed region VR1, the rotating electrical machine control device 1 performs alternative first speed region control in which both inverters 10, the first inverter 11 and the second inverter 12, are controlled by pulse width modulation control (continuous pulse width modulation control), instead of target first speed region control.

TABLE 7

| R | Mi_sys | INV1 | Mi_inv1 | INV2 | Mi_inv2 |
| --- | --- | --- | --- | --- | --- |
| VR1 | M < X | CPWM | M < X | CPWM | M < X |
| VR2-1 | X ≤ M < b | MX-CPWM | X ≤ M < b | MX-CPWM | X ≤ M < b |
| VR2-2 | b ≤ M < 0.78 | MX-DPWM | b ≤ M < 0.78 | MX-DPWM | b ≤ M < 0.78 |
| VR3 | M = 0.78 | 1-Pulse | M = 0.78 | 1-Pulse | M = 0.78 |

When switching control of the inverters 10 is performed, ripple components superimposed on an alternating current fundamental may generate noise in the audio frequency band. Particularly, when the rotational speed of the rotating electrical machine 80 is low, the possibility of inclusion of the frequency of ripple components (or sideband frequencies thereof) in the audio frequency band increases. For example, when the two inverters 10 are controlled using different control schemes, ripples based on each control scheme occur, which may increase noise in the audio frequency band. In the loss reduction priority mode, only one inverter 10 is driven in the first speed region VR1 and the second speed region VR2 in which the rotational speed of the rotating electrical machine 80 is relatively low, and thus, there is no chance of the two inverters 10 outputting noise in different frequency bands. However, since output from the one inverter 10 to be driven is large, noise energy is high. In addition, in the first speed region VR1 and the second speed region VR2, sound accompanying traveling of the vehicle (traveling sound such as sound of tires contacting a road surface) is also small, and thus, when noise outputted from the one inverter 10 to be driven is noise in the audio frequency band, there is a possibility that the noise is likely to be audible to a user.

For example, it is preferred that upon the start of the vehicle or upon deceleration to make a stop, taking into account the fact that noise in the audio frequency band is likely to be audible to the user, the noise reduction priority mode be selected, and upon steady-state driving where the vehicle travels in a steady state, the loss reduction priority mode be selected. Note that these modes may be selected by a user's operation (a setting switch (also including input from a touch panel, etc.)).

In the noise reduction priority mode, in the first speed region VR1 and the second speed region VR2 in which the rotational speed of the rotating electrical machine 80 is relatively low, the first inverter 11 and the second inverter 12 are controlled using the same control scheme. In addition, in the two inverters 10 that allow currents to flow through the stator coils 8, the phases of the currents differ from each other by substantially 180 degrees. When the two inverters 10 are controlled using the same control scheme, the phases of currents including ripple components differ from each other by substantially 180 degrees. Thus, at least some of the ripple components can cancel each other out, enabling a reduction in noise in the audio frequency band.

Figure 16:
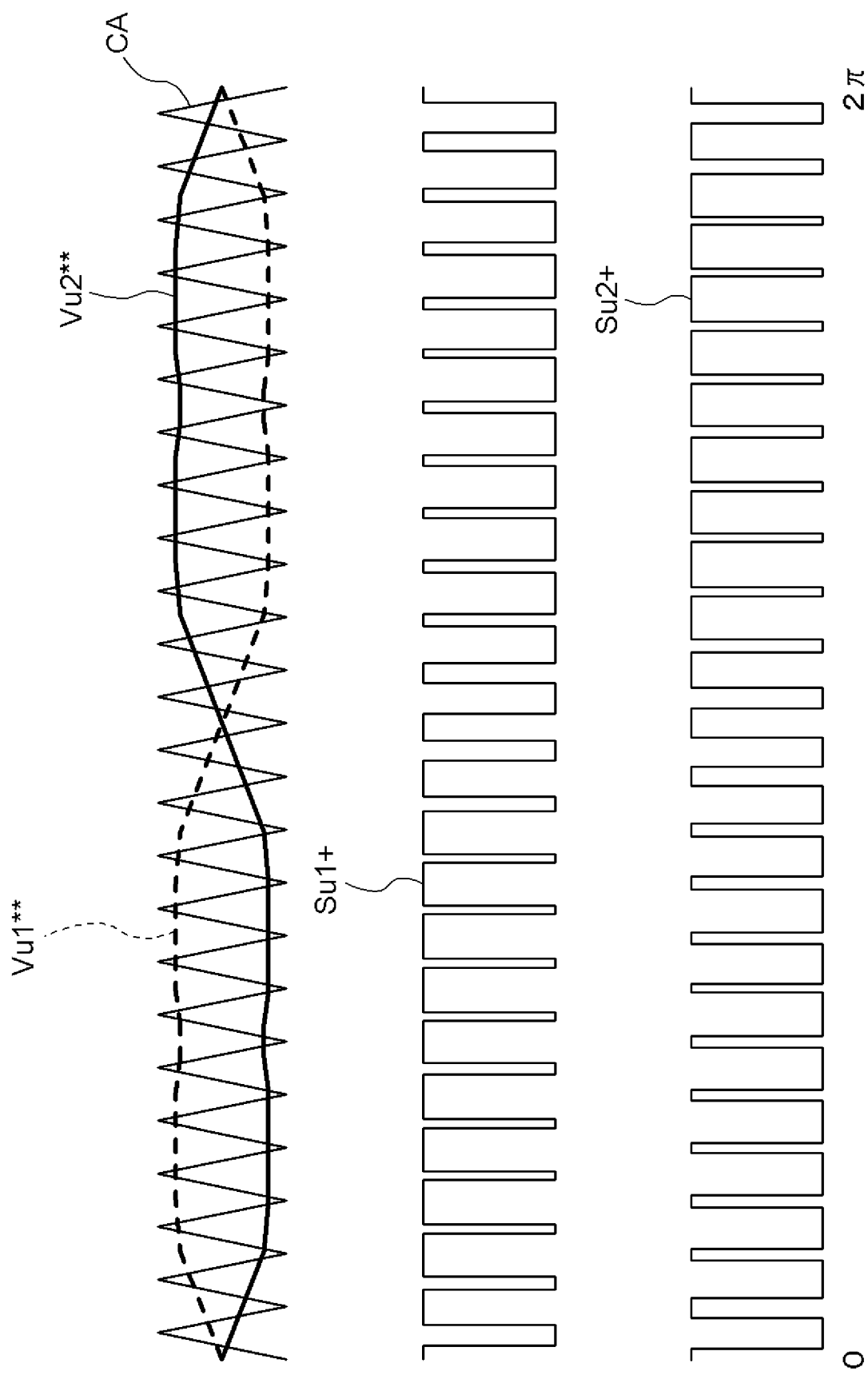
FIG. 16 is a waveform diagram showing an example of voltage instructions and switching control signals for the first speed region in noise reduction priority mode.

A waveform diagram of FIG. 16 shows an example of a first U-phase voltage instruction Vu1, a second U-phase voltage instruction Vu2, a carrier CA, a first U-phase upper-stage-side switching control signal Su1+, and a second U-phase upper-stage-side switching control signal Su2+ for the first speed region VR1 in the noise reduction priority mode. As shown in table 7, in the noise reduction priority mode, in the first speed region VR1, the first inverter 11 and the second inverter 12 are both controlled by continuous pulse width modulation control.

Meanwhile, in the above description, a mode is exemplified in which in the loss reduction priority mode, as described with reference to tables 1 to 6, mixed continuous pulse width modulation control (MX-CPWM) is performed in the second speed region VR2 (when the second speed region VR2 is divided, the low-speed side second speed region VR2-1). However, as shown in the following table 8, as with the second speed region VR2 (low-speed side second speed region VR2-1), in the first speed region VR1, too, mixed continuous pulse width modulation control (MX-CPWM) may be performed on both of the first inverter 11 and the second inverter 12. Namely, as target first speed region control, both of the first inverter 11 and the second inverter 12 may be controlled by mixed continuous pulse width modulation control (MX-CPWM).

table 7, in the noise reduction priority mode, in the first speed region VR1, alternative first speed region control is performed instead of the target first speed region control. The alternative first speed region control is, as described above, a scheme (CPWM/CPWM) in which both inverters 10 are controlled by continuous pulse width modulation (CPWM). That is, for control schemes performed in the first speed region VR1, there are three ways of control schemes, "ASC/PWM", "MX-CPWM/MX-CPWM", and "CPWM/CPWM".

When, as in the present embodiment, two inverters 10 are provided, alternating current voltage with an amplitude larger than that of voltage on the direct current side of each inverter 10 can be generated. Note, however, that the rotating electrical machine control device 1 does not need to control the two inverters 10 such that the amplitude of alternating current is always large, and for example, when the rotational speed of the rotating electrical machine 80 is low, it may be sufficient to generate alternating current voltage that can be generated by one inverter 10. Hence, in the above-described mode described with reference to tables 1 to 6, a mode is exemplified in which as target first speed region control, one inverter 10 out of the two inverters 10 is controlled by active short-circuit control. In this mode, the stator coils 8 are short-circuited in the one inverter 10, resulting in the rotating electrical machine 80 being the same as a rotating electrical machine in which stator coils have an electrical neutral point. That is, the rotating electrical machine 80 is driven substantially by only one inverter 10 out of the two inverters 10. Since the inverter 10 controlled by active short-circuit control does not perform switching operation, the rotating electrical machine 80 can be driven while loss in the entire system is suppressed.

In the mode exemplified in table 8, as target first speed region control, mixed pulse width modulation control is performed. As described above, the mixed pulse width modulation control is a control scheme having, during one cycle of electrical angle, a combination of a period during which pulse width modulation is performed and a period with no modulation (fixed state), each period being about a half cycle. Thus, the rotating electrical machine 80 is driven substantially by only one inverter 10 out of the two inverters 10 for each half cycle. Since the inverters 10 do not perform switching operation for about a half period of their driving time, switching loss decreases and system loss decreases. It has been confirmed by experiments and simulations conducted by the inventors that even when any of "ASC/PWM" and "MX-CPWM/MX-CPWM" is performed as target first

TABLE 8

| R | Mi_sys | INV1 | Mi_inv1 | INV2 | Mi_inv2 |
|---|---|---|---|---|---|
| VR1 | M < X | MX-CPWM | M < X | MX-CPWM | M < X |
| VR2-1 | X ≤ M < b | MX-CPWM | X ≤ M < b | MX-CPWM | X ≤ M < b |
| VR2-2 | b ≤ M < 0.78 | MX-DPWM | b ≤ M < 0.78 | MX-DPWM | b ≤ M < 0.78 |
| VR3 | M = 0.78 | 1-Pulse | M = 0.78 | 1-Pulse | M = 0.78 |

That is, in the loss reduction priority mode, target first speed region control performed in the first speed region VR1 has two schemes: a scheme described with reference to tables 1 to 6 (a scheme (ASC/PWM) in which one inverter 10 is controlled by active short-circuit control (ASC)) and a scheme described with reference to table 8 (a scheme (MX-CPWM/MX-CPWM) in which both inverters 10 are controlled by mixed continuous pulse width modulation (MX-CPWM)). In addition, as described with reference to speed region control, compared with a 1-inverter system, an improvement in loss is achieved in substantially the same manner.

Figure 17:
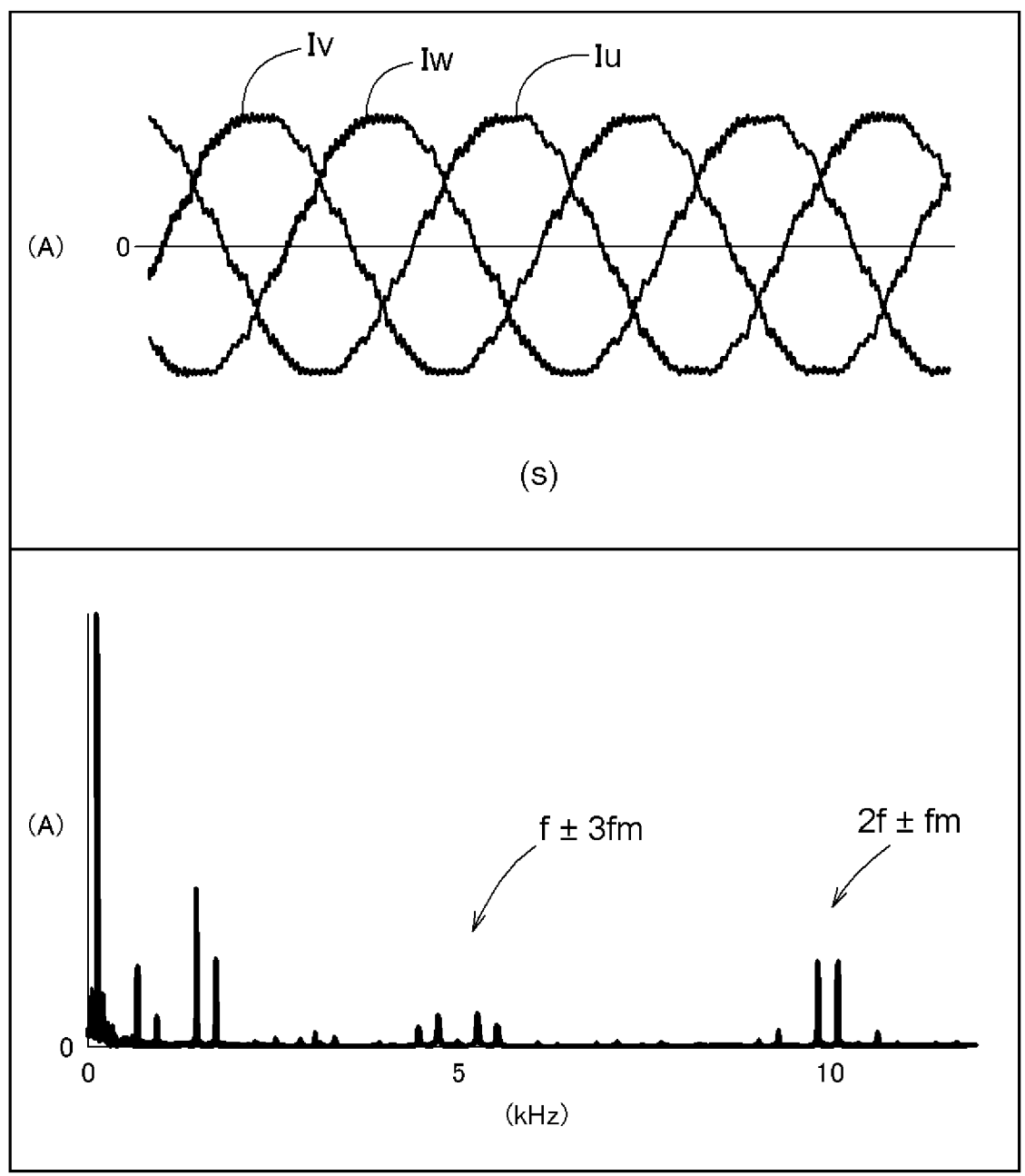
FIG. 17 is a diagram showing an example of a case in which mixed continuous pulse width modulation control is performed on both inverters in a 2-inverter system in the first speed region.
Figure 18:
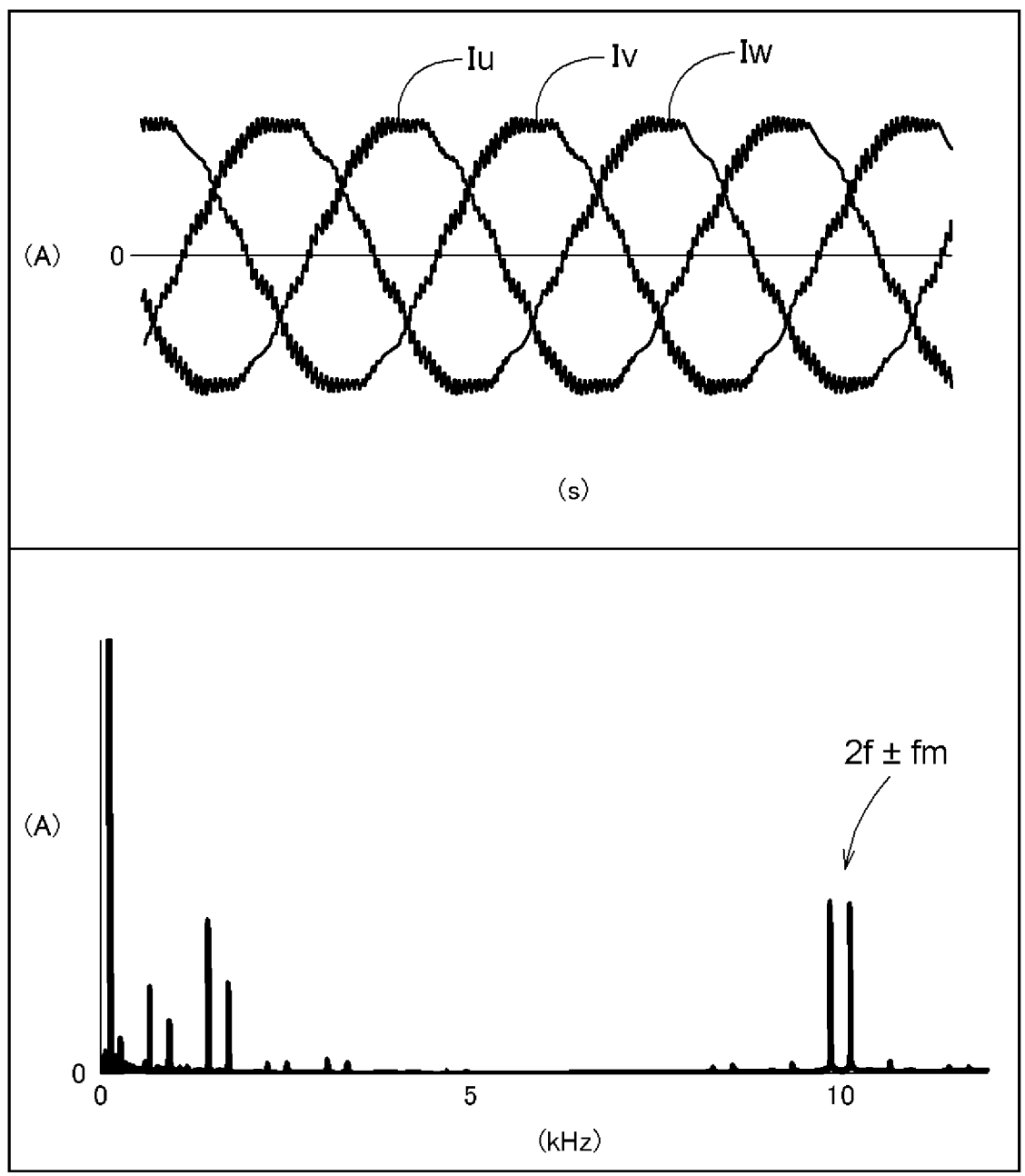
FIG. 18 is a diagram showing an example of a case in which continuous pulse width modulation control is performed on both inverters in the 2-inverter system in the first speed region.
Figure 19:
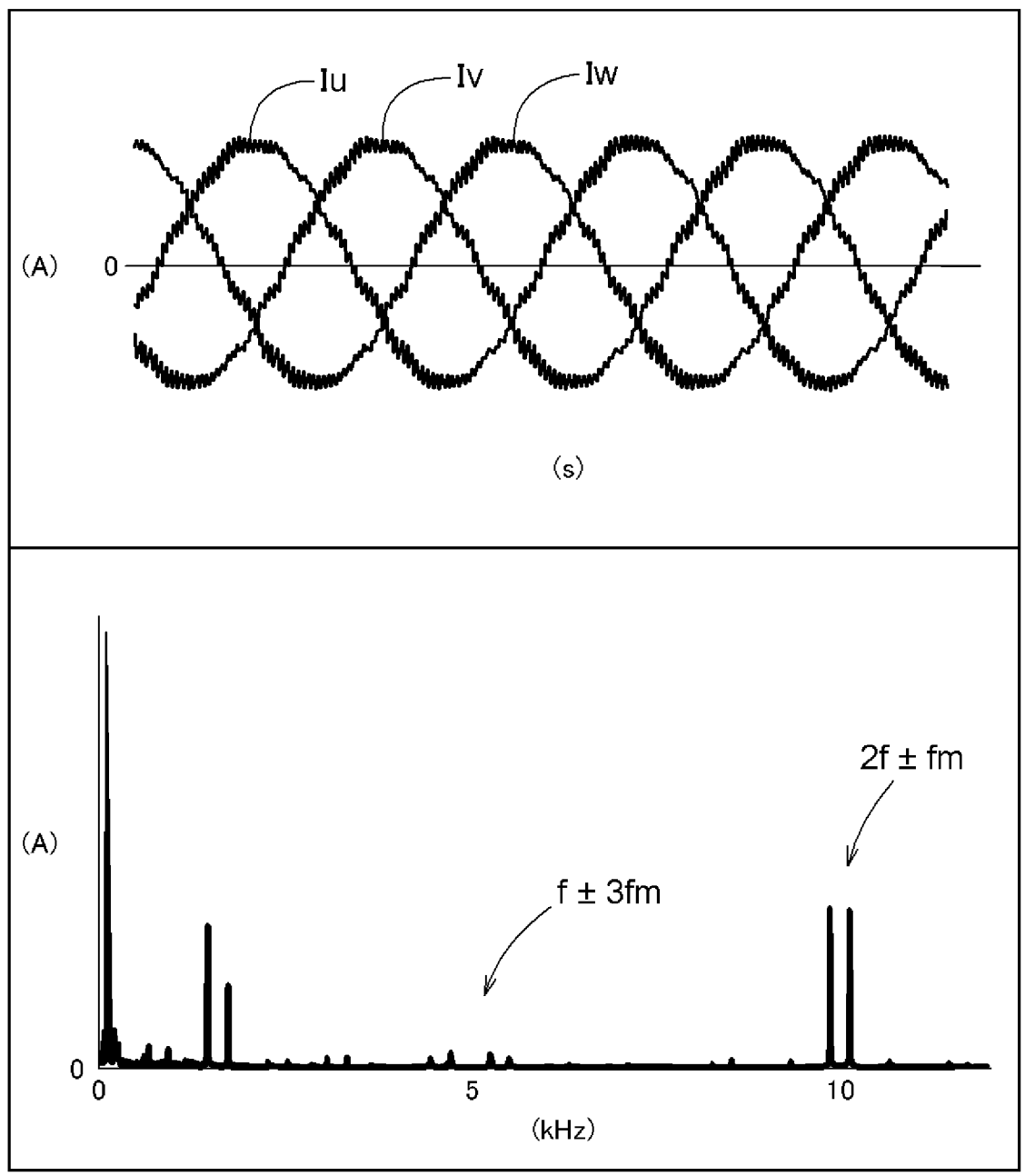
FIG. 19 is a diagram showing an example of a case in which continuous pulse width modulation control is performed in a 1-inverter system in the first speed region.

FIGS. 17 to 19 show waveforms of three-phase currents (a U-phase current Iu, a V-phase current Iv, and a W-phase current Iw) flowing through the stator coils 8 and frequency characteristics (results of analysis by a fast Fourier transform (FFT) of the three-phase currents) for different control schemes. FIG. 17 shows currents and a frequency characteristic for "MX-CPWM/MX-CPWM", FIG. 18 shows currents and a frequency characteristic for "CPWM/CPWM", and FIG. 19 shows, as a comparative example, currents and a frequency characteristic for a 1-inverter system. Note that for "ASC/PWM" ("ASC/CPWM"), a frequency characteristic has substantially the same trend as that of "MX-CPWM/MX-CPWM", and thus depiction thereof is omitted. Note also that here a case in which the frequency "f" of the carrier CA is 5 [kHz] is exemplified.

As is clear from a comparison of FIGS. 17 and 19, in a case of adopting a 2-inverter system in which the rotating electrical machine 80 is driven through the two inverters 10 for a loss reduction, when "MX-CPWM/MX-CPWM" are used as control schemes, harmonic content near 5 [kHz] (harmonic content at sideband frequencies "f±3fm" of the frequency "f" of the carrier CA) slightly increases over the 1-inverter system ("fm" is the rotational speed of the rotating electrical machine 80; the same also applies hereinafter). On the other hand, as is clear from a comparison of FIGS. 18 and 19, even in a case of adopting the 2-inverter system, when "CPWM/CPWM" are used as control schemes, harmonic content near 5 [kHz] (harmonic content at sideband frequencies "f±3fm" of the frequency "f" of the carrier CA) decreases over the 1-inverter system, and almost no harmonic content is observed.

Human audible frequencies are said to be on the order of approximately 20 [Hz] to 15 [kHz], and frequencies exceeding 10 [kHz] are generally less likely to be audible, and frequencies near 5 [kHz] are likely to be perceived as noise. In "MX-CPWM/MX-CPWM" and "ASC/PWM" which are performed in the loss reduction priority mode, harmonic content near 5 [kHz] slightly increases compared with the 1-inverter system. On the other hand, in "CPWM/CPWM" performed in the noise reduction priority mode, harmonic content near 5 [kHz] greatly decreases compared with the 1-inverter system.

Thus, for example, it is preferable that upon the start of the vehicle or upon deceleration to make a stop, taking into account the fact that noise in the audio frequency band is likely to be audible to the user, the noise reduction priority mode be selected. On the other hand, upon steady-state driving where the vehicle travels in a steady state, noise in the audio frequency band is less likely to be audible to the user due to traveling sound, etc., and the time occupied by steady-state driving is way longer than the start time, etc., and thus, it is preferable to select the loss reduction priority mode upon steady-state driving.

Note that, though depiction is omitted, the magnitude of harmonic content in the audio frequency band (mainly, harmonic content at the sideband frequencies "f±3fm" of the frequency "f" of the carrier CA) has a relationship approximately like ""CPWM/CPWM"<"ASC/PWM" ("ASC/CPWM")≈"MX-CPWM/MX-CPWM"". For example, in a case in which frequent transitions between the first speed region VR1 and the second speed region VR2 can be expected, when "MX-CPWM/MX-CPWM" are selected for the first speed region VR1, even if a transition between the first speed region VR1 and the second speed region VR2 frequently occurs, since the same control schemes can be continued, controllability improves. On the other hand, in a case in which no frequent transitions between the first speed region VR1 and the second speed region VR2 can be expected, it is preferred to select "ASC/PWM" ("ASC/CPWM") for the first speed region VR1.

Control schemes for the first speed region VR1 in the loss reduction priority mode may be selected according to, for example, whether a road on which the vehicle travels is an expressway or a general road (in a case of a general road, frequent acceleration and deceleration are expected and thus "MX-CPWM/MX-CPWM" are selected, etc.). Alternatively, control schemes may be selected according to the most recent average travel speed of the vehicle (in a case of a low average speed, it is expected that there are frequent acceleration and deceleration, reducing the average speed, and thus, "MX-CPWM/MX-CPWM" are selected). Alternatively, a selection may be made by a user's operation (a setting switch (also including input from a touch panel, etc.)).

Figure 20:
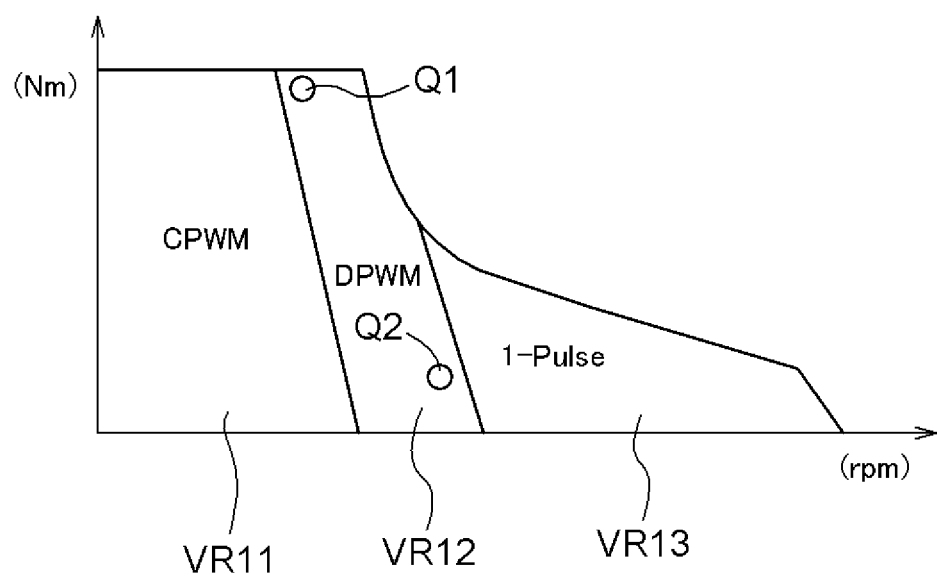
FIG. 20 is a diagram showing an example of control regions of a rotating electrical machine in a 1-inverter system.

FIG. 20 shows, as a comparative example, an example of control regions of a rotating electrical machine in a 1-inverter system in which stator coils 8 of three phases are connected to each other at a neutral point. As shown in the following table 9, the inverter is, for example, controlled by continuous pulse width modulation control (CPWM) in a first region VR11, controlled by discontinuous pulse width modulation control (DPWM) in a second region VR12, and controlled by rectangular-wave control (1-Pulse) in a third region VR13.

TABLE 9

| R | Mi_sys | INV1 | Mi_inv |
|---|---|---|---|
| VR11 | M < Y, where Y > X | CPWM | M < Y, where Y > X |
| VR12 | Y ≤ M < 0.78 | DPWM | Y ≤ M < 0.78 |
| VR13 | M = 0.78 | 1-Pulse | M = 0.78 |

Here, the modulation index "Y" has a value larger than the modulation index "X" exemplified in tables 5 to 8, and is set to, for example, about 0.5 to 0.6, based on a theoretical upper limit value (approximately 0.707) of a modulation index for continuous pulse width modulation (space vector pulse width modulation), and further taking into account dead time.

In addition, as described above, in the present embodiment, the second speed region VR2 is set in a region corresponding to the second region VR12 in which discontinuous pulse width modulation (DPWM) is performed in the 1-inverter system, and characteristic mixed pulse width modulation control (MX-PWM) is performed. By the mixed pulse width modulation control, loss in the inverter 10 decreases, and harmonic current resulting from switching also decreases and thus loss (iron loss) in the rotating electrical machine 80 also decreases. That is, by performing the mixed pulse width modulation control, system loss can be reduced. In addition, by setting the first speed region VR1 in a region corresponding to the first region VR11, loss in the entire system can be reduced in the loss reduction priority mode, and a loss reduction and a noise reduction can be achieved in the noise reduction priority mode.

Figure 25:
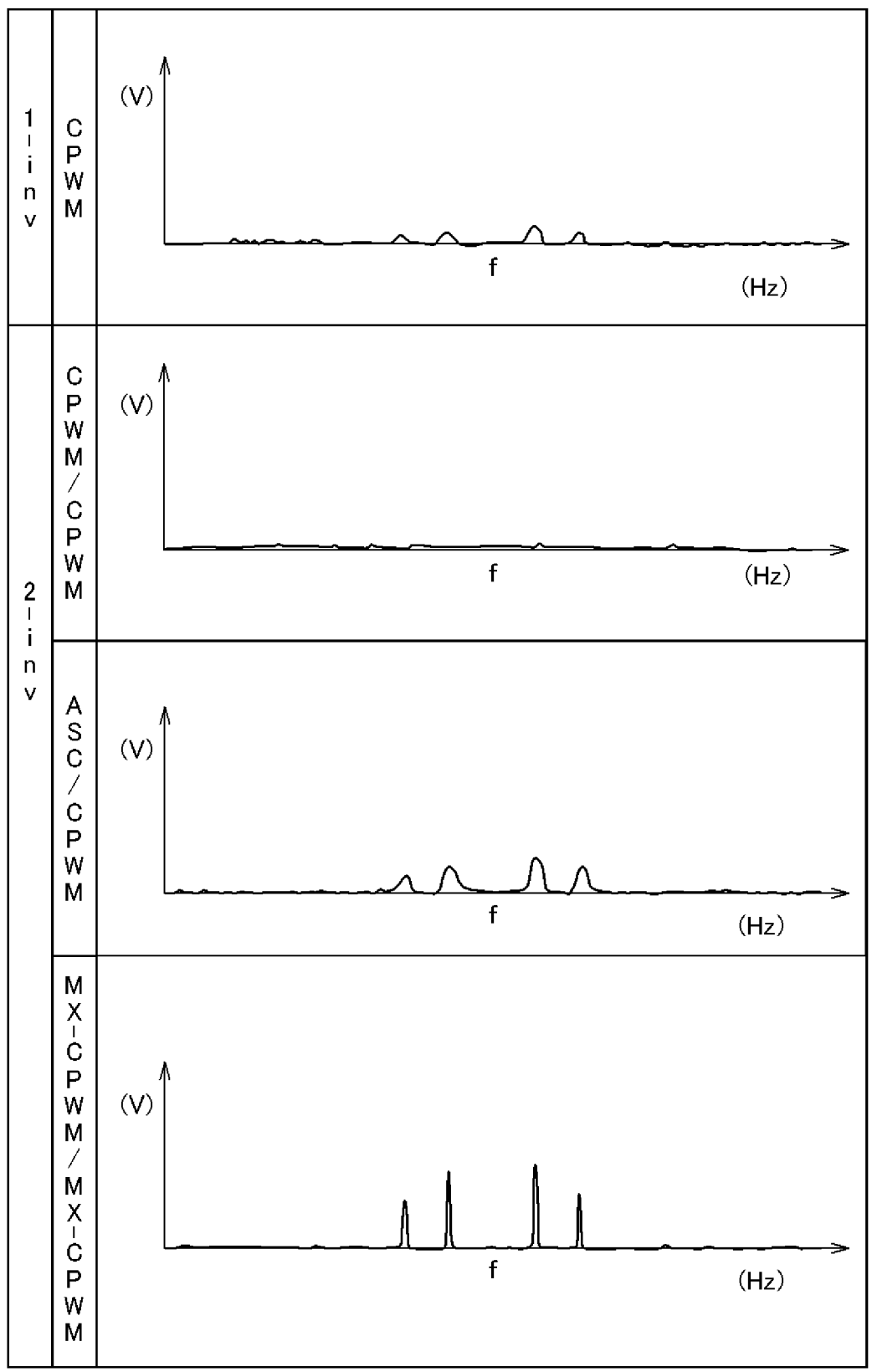
FIG. 25 is a diagram showing an exemplary comparison of FFT analysis results for line-to-line voltage, with the carrier frequency being center frequency between the 1-inverter system and the 2-inverter system, and an exemplary comparison of FFT analysis results for the line-to-line voltage, with the carrier frequency being center frequency between different control schemes of the 2-inverter system.
Figure 26:
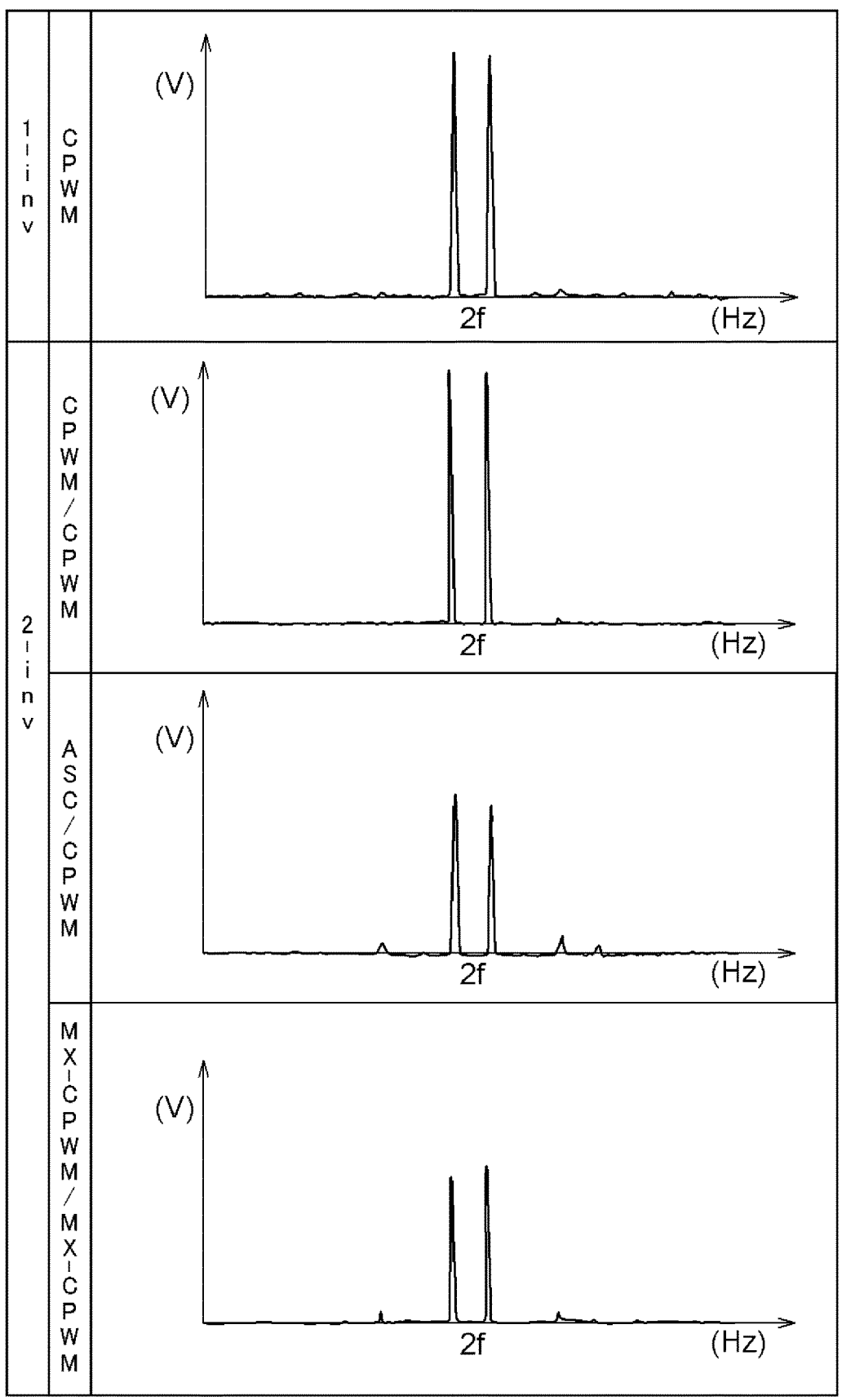
FIG. 26 is a diagram showing an exemplary comparison of FFT analysis results for the line-to-line voltage, with a frequency that is twice the carrier frequency being center frequency between the 1-inverter system and the 2-inverter system, and an exemplary comparison of FFT analysis results for the line-to-line voltage, with the frequency that is twice the carrier frequency being center frequency between different control schemes of the 2-inverter system.
Figure 27:
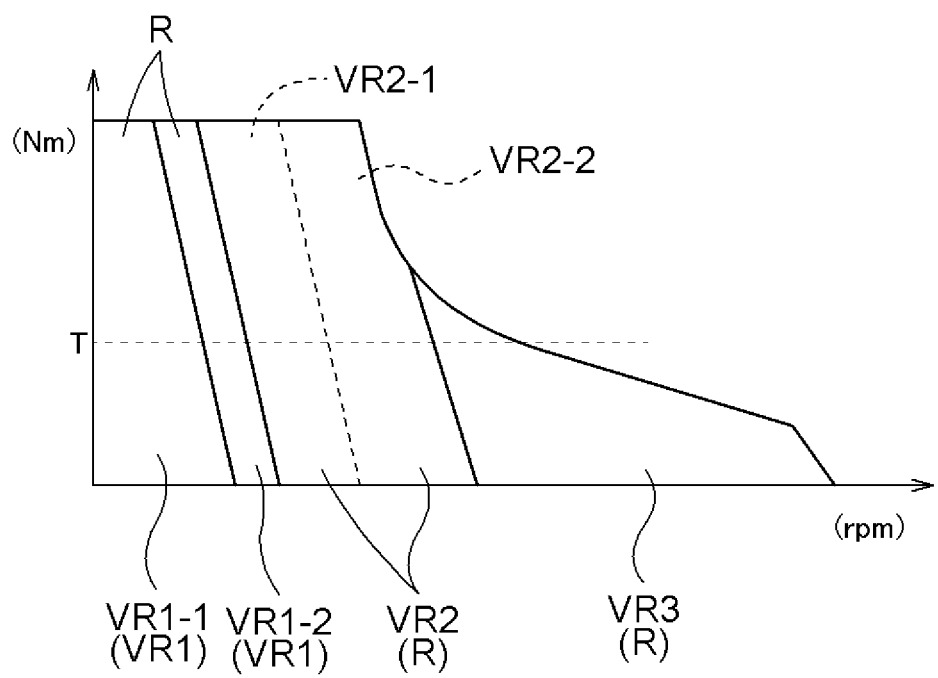
FIG. 27 is a diagram showing an example of control regions of a rotating electrical machine in a 2-inverter system of a comparative example.

FIGS. 21 to 33 show exemplary comparisons of the 1-inverter system and the 2-inverter system and exemplary comparisons of control schemes of the 2-inverter system. FIGS. 21 to 26 show exemplary comparisons for relatively low speed regions (e.g., the first region VR11 and the first speed region VR1). FIGS. 28 to 33 show exemplary comparisons for higher speed regions (e.g., the second region VR12 and the second speed region VR2) than the relatively low speed regions. FIG. 27 shows an example of control regions R of a rotating electrical machine 80 in a 2-inverter system of a comparative example in which discontinuous pulse width modulation control is performed on both inverters 10 in the second speed region VR2. In FIGS. 28 to 33, a comparison is also made between a case in which discontinuous pulse width modulation control is performed on both inverters 10 (a case in which control using the "DPWM/DPWM" schemes are performed) and a case in which mixed continuous pulse width modulation control is performed on both inverters 10 (a case in which control using the "MX-CPWM/MX-CPWM" schemes is performed) in the second speed region VR2 of the 2-inverter system.

Figure 21:
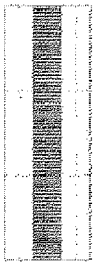
FIG. 21 is a diagram showing exemplary comparisons of switching control signals and line-to-line voltage between the 1-inverter system and the 2-inverter system, and exemplary comparisons of switching control signals and line-to-line voltage between different control schemes of the 2-inverter system.

FIG. 21 shows exemplary comparisons of switching control signals (Su, Su1, and Su2) and line-to-line voltage (Vuv). A column on the left shows exemplary waveforms of the 1-inverter system, and other columns show exemplary waveforms of the 2-inverter system. The exemplary waveforms of the 2-inverter system show, from left, exemplary waveforms for a case (CPWM/CPWM) in which both inverters 10 are controlled by continuous pulse width modulation control (CPWM), exemplary waveforms for a case (ASC/CPWM) in which the first inverter 11 is controlled by active short-circuit control (ASC) and the second inverter 12 is controlled by continuous pulse width modulation control (CPWM), and a case (MX-CPWM/MX-CPWM) in which both inverters 10 are controlled by mixed continuous pulse width modulation control (MX-CPWM). For the 1-inverter system, exemplary waveforms for a case of controlling by continuous pulse width modulation control (CPWM) are shown.

In addition, the first row from top shows exemplary waveforms of a switching control signal Su1 for the arm 3A for the U-phase in the first inverter 11 (in a case of the 1-inverter system, a switching control signal Su for an arm for the U-phase in an inverter in the 1-inverter system), and the second row from top shows exemplary waveforms of a switching control signal Su2 for the arm 3A for the U-phase in the second inverter 12 (in a case of the 1-inverter system, no switching control signal). The third row from top shows exemplary waveforms of line-to-line voltage between the U-phase and V-phase of the stator coils 8 (UV line-to-line voltage Vuv).

Figure 22:
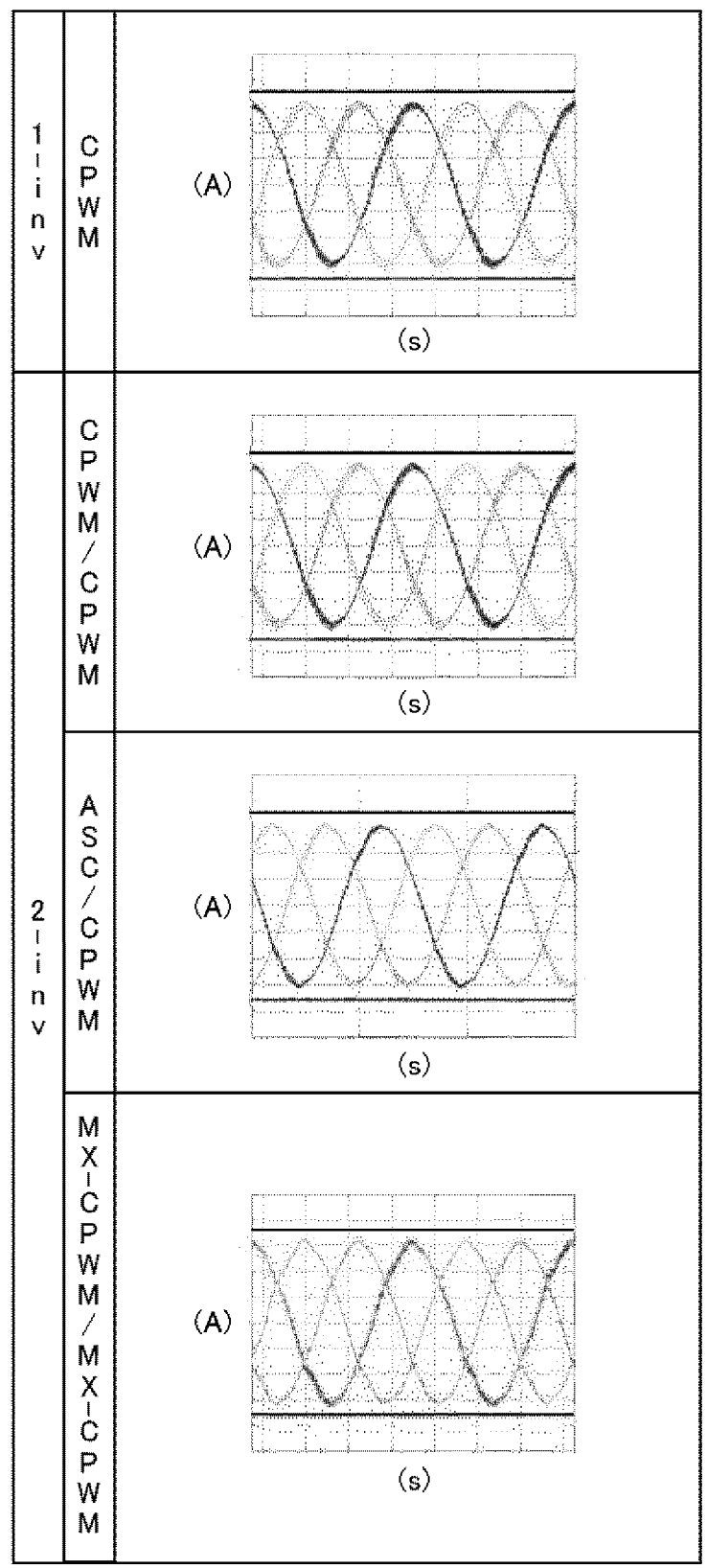
FIG. 22 is a diagram showing an exemplary comparison of phase currents between the 1-inverter system and the 2-inverter system, and an exemplary comparison of phase currents between different control schemes of the 2-inverter system.
Figure 23:
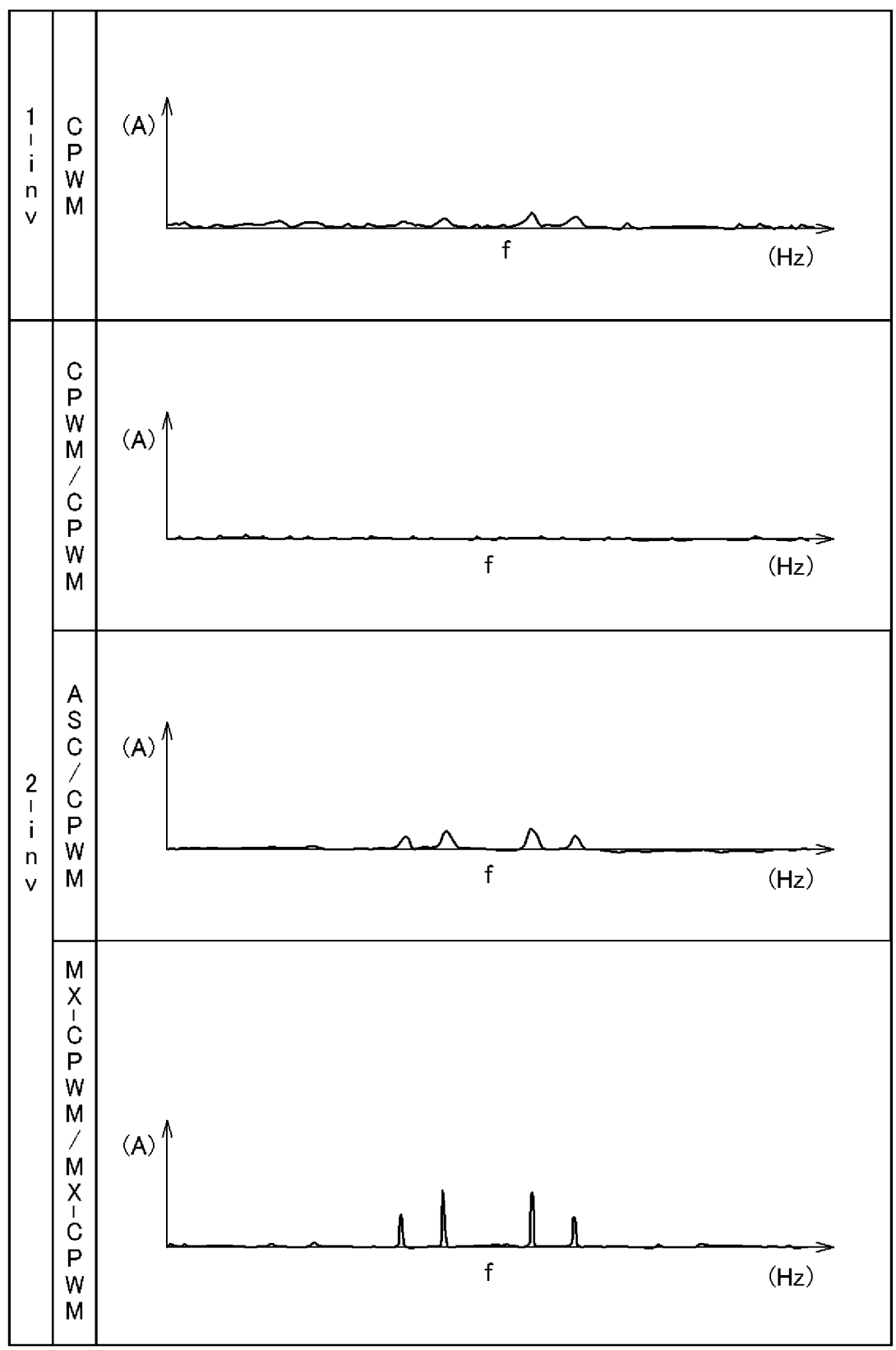
FIG. 23 is a diagram showing an exemplary comparison of FFT analysis results for a phase current, with a carrier frequency being center frequency between the 1-inverter system and the 2-inverter system, and an exemplary comparison of FFT analysis results for the phase current, with the carrier frequency being center frequency between different control schemes of the 2-inverter system.
Figure 24:
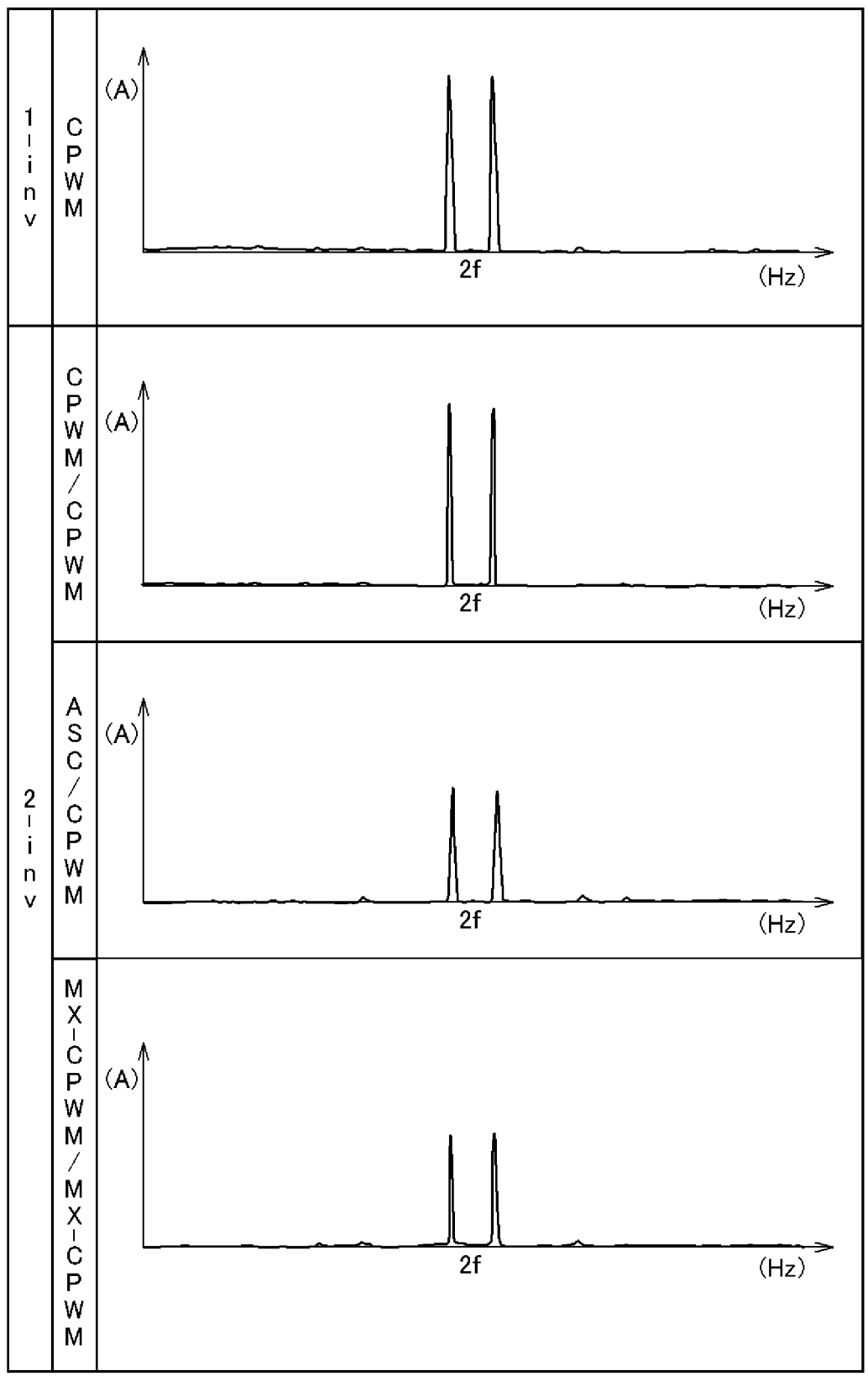
FIG. 24 is a diagram showing an exemplary comparison of FFT analysis results for the phase current, with a frequency that is twice the carrier frequency being center frequency between the 1-inverter system and the 2-inverter system, and an exemplary comparison of FFT analysis results for the phase current, with the frequency that is twice the carrier frequency being center frequency between different control schemes of the 2-inverter system.

FIG. 22 shows an exemplary comparison of three-phase currents (a U-phase current Iu, a V-phase current Iv, and a W-phase current Iw). FIG. 23 shows results of analysis by a fast Fourier transform (FFT) of the U-phase current Iu, with the frequency "f" of a carrier CA (here, for example, 5 [kHz]) being at the center, and shows a comparison of the magnitudes of sideband frequencies "f±3fm" of the frequency "f" of the carrier CA ("fin" is the rotational speed of the rotating electrical machine 80; the same also applies hereinafter). FIG. 24 shows results of analysis by a fast Fourier transform (FFT) of the U-phase current Iu, with the frequency "2f" which is twice the frequency of the carrier CA (here, for example, 10 [kHz])) being at the center, and shows a comparison of the magnitudes of sideband frequencies "2f±fm" of "2f". FIG. 25 shows results of analysis by a fast Fourier transform (FFT) of the UV line-to-line voltage Vuv, with the frequency "f" of the carrier CA being at the center, and shows a comparison of the magnitudes of sideband frequencies "f±3fm" of the frequency "f" of the carrier CA. FIG. 26 shows results of analysis by a fast Fourier transform (FFT) of the UV line-to-line voltage Vuv, with the frequency "2f" which is twice the frequency of the carrier CA being at the center, and shows a comparison of the magnitudes of sideband frequencies "2f±fm" of "2f".

As shown in FIGS. 24 and 26, harmonic content of the U-phase current Iu and the UV line-to-line voltage Vuv at the sideband frequencies "2f±fm" of the frequency "2f" which is twice the frequency of the carrier CA is small in the "ASC/CPWM" schemes and the "MX-CPWM/MX-CPWM" schemes of the 2-inverter system compared with the 1-inverter system and the "CPWM/CPWM" schemes of the 2-inverter system. Hence, iron loss is suppressed, and in the "ASC/CPWM" schemes, switching loss decreases due to one inverter 10 not performing switching, and thus, the entire system loss appropriately decreases. In addition, in the "MX-CPWM/MX-CPWM" schemes, too, as described above with reference to FIGS. 8 to 11, only one of the inverters 10 performs switching for each substantially half cycle, and thus, switching loss decreases and the entire system loss appropriately decreases. Thus, as described above, it is preferred that when a reduction in system loss is prioritized (in a case of the loss reduction priority mode), the "ASC/CPWM" schemes or the "MX-CPWM/MX-CPWM" schemes be selected for the first speed region VR1.

As shown in FIGS. 23 and 25, harmonic content of the U-phase current Iu and the UV line-to-line voltage Vuv at the sideband frequencies "f±3fm" of the frequency "f" of the carrier CA is smallest in the "CPWM/CPWM" schemes of the 2-inverter system. When 2-inverter systems are compared with each other, too, harmonic content at the sideband frequencies "f±3fm" of the frequency "f" of the carrier CA is small in the "CPWM/CPWM" schemes, compared with the "ASC/CPWM" schemes and the "MX-CPWM/MX-CPWM" schemes. Human audible frequencies are said to be on the order of approximately 20 [Hz] to 15 [kHz], and frequencies exceeding 10 [kHz] are generally less likely to be audible, and frequencies near 5 [kHz] are likely to be perceived as noise. That is, harmonic content at the sideband frequencies "f±3fm" of the frequency "f" of the carrier CA and around 5 [kHz] is likely to be audible noise compared with harmonic content around 10 [kHz] which is the sideband frequencies "2f±fm" of "2f". Thus, it is preferred that when, as in this example, the frequency "f" of the carrier CA is 5 [kHz] and priority is given to suppression of harmonic content at the sideband frequencies "f±3fm" becoming audible noise (in a case of the noise reduction priority mode), the "CPWM/CPWM" schemes be selected for the first speed region VR1.

In addition, as shown in FIGS. 24 and 26, harmonic content of the U-phase current Iu and the UV line-to-line voltage Vuv at the sideband frequencies "2f±fm" of the frequency "2f" which is twice the frequency of the carrier CA is substantially equal between "CPWM" of the 1-inverter system and the "CPWM/CPWM" schemes of the 2-inverter system. Thus, it is preferred that in a region in which the rotational speed is relatively low and audible noise is likely to be noticeable, the noise reduction priority mode be selected and control be performed using the "CPWM/CPWM" schemes.

Meanwhile, it is also possible to construct a 2-inverter system without performing mixed pulse width modulation as does in the present embodiment. In this case, to further reduce system loss over the 1-inverter system, as shown in the following tables 10 and 11, control schemes may be set for control regions R shown in FIG. 27. This 2-inverter system is referred to as a 2-inverter system of a comparative example. Note that the control regions R are the same as the regions described above with reference to tables 1 to 8, etc. Note that table 10 shows a relationship between control regions and control schemes in the loss reduction priority mode as described above with reference to tables 1 to 6, etc., and table 11 shows a relationship between control regions and control schemes in the noise reduction priority mode as described above with reference to tables 7 and 8.

TABLE 10

| R | Mi_sys | INV1 | Mi_inv1 | INV2 | Mi_inv2 |
|---|---|---|---|---|---|
| VR1-1 | M < a | ASC | M = 0 | CPWM | M < 2a |
| VR1-2 | a ≤ M < X | ASC | M = 0 | DPWM | 2a ≤ M < 2X |
| VR2 | X ≤ M < 0.78 | DPWM | X ≤ M < 0.78 | DPWM | X ≤ M < 0.78 |
| VR3 | M = 0.78 | 1-Pulse | M = 0.78 | 1-Pulse | M = 0.78 |

TABLE 11

| R | Mi_sys | INV1 | Mi_inv1 | INV2 | Mi_inv2 |
|---|---|---|---|---|---|
| VR1-1 | M < a | CPWM | M = a | CPWM | M < a |
| VR1-2 | a ≤ M < X | DPWM | a ≤ M < X | DPWM | a ≤ M < X |
| VR2 | X ≤ M < 0.78 | DPWM | X ≤ M < 0.78 | DPWM | X ≤ M < 0.78 |
| VR3 | M = 0.78 | 1-Pulse | M = 0.78 | 1-Pulse | M = 0.78 |

As shown in table 10, in the loss reduction priority mode, in the 2-inverter system of the comparative example, in the low-speed side first speed region VR1-1, the rotating electrical machine control device 1 controls one of the inverters 10, the first inverter 11 or the second inverter 12, by active short-circuit control (ASC), and controls the other inverter 10 by continuous pulse width modulation control (CPWM). In addition, in the high-speed side first speed region VR1-2, the rotating electrical machine control device 1 controls one of the inverters 10, the first inverter 11 or the second inverter 12, by active short-circuit control, and controls the other inverter 10 by discontinuous pulse width modulation control (DPWM). In addition, in the second speed region VR2, the rotating electrical machine control device 1 controls both inverters 10, the first inverter 11 and the second inverter 12, by discontinuous pulse width modulation control. In addition, in the third speed region VR3, the rotating electrical machine control device 1 controls both inverters 10, the first inverter 11 and the second inverter 12, by rectangular-wave control (1-Pulse).

In addition, as shown in table 11, in the noise reduction priority mode, in the 2-inverter system of the comparative example, in the low-speed side first speed region VR1-1, the rotating electrical machine control device 1 controls both inverters 10, the first inverter 11 and the second inverter 12, by continuous pulse width modulation control (CPWM). In addition, in the high-speed side first speed region VR1-2, the rotating electrical machine control device 1 controls both inverters 10, the first inverter 11 and the second inverter 12, by discontinuous pulse width modulation control (DPWM). For the second speed region VR2 and the third speed region, the same control as in the loss reduction priority mode is performed.

As described above with reference to FIG. 7 and tables 4 to 6, etc., in the present embodiment in which mixed pulse width modulation is performed, both inverters 10 are controlled by mixed continuous pulse width modulation rectangular-wave control ("MX-CPWM/MX-CPWM" schemes) in at least a part of the second speed region VR2 (e.g., the low-speed side second speed regions VR2-1 shown in FIGS. 7 and 27) and the high-speed side first speed region VR1-2 in which the 2-inverter system of the comparative example exemplified in FIG. 27 and tables 10 and 11 performs control using the "DPWM/DPWM" schemes.

With reference to FIGS. 28 to 33, a case in which discontinuous pulse width modulation control is performed on both inverters 10 (a case of performing control using the "DPWM/DPWM" schemes), a case in which mixed continuous pulse width modulation control is performed on both inverters 10 (a case of performing control using the "MX-CPWM/MX-CPWM" schemes), and a case in which in the 1-inverter system, the inverter is controlled by discontinuous pulse width modulation (DPWM) will be described below by comparison.

Figure 28:
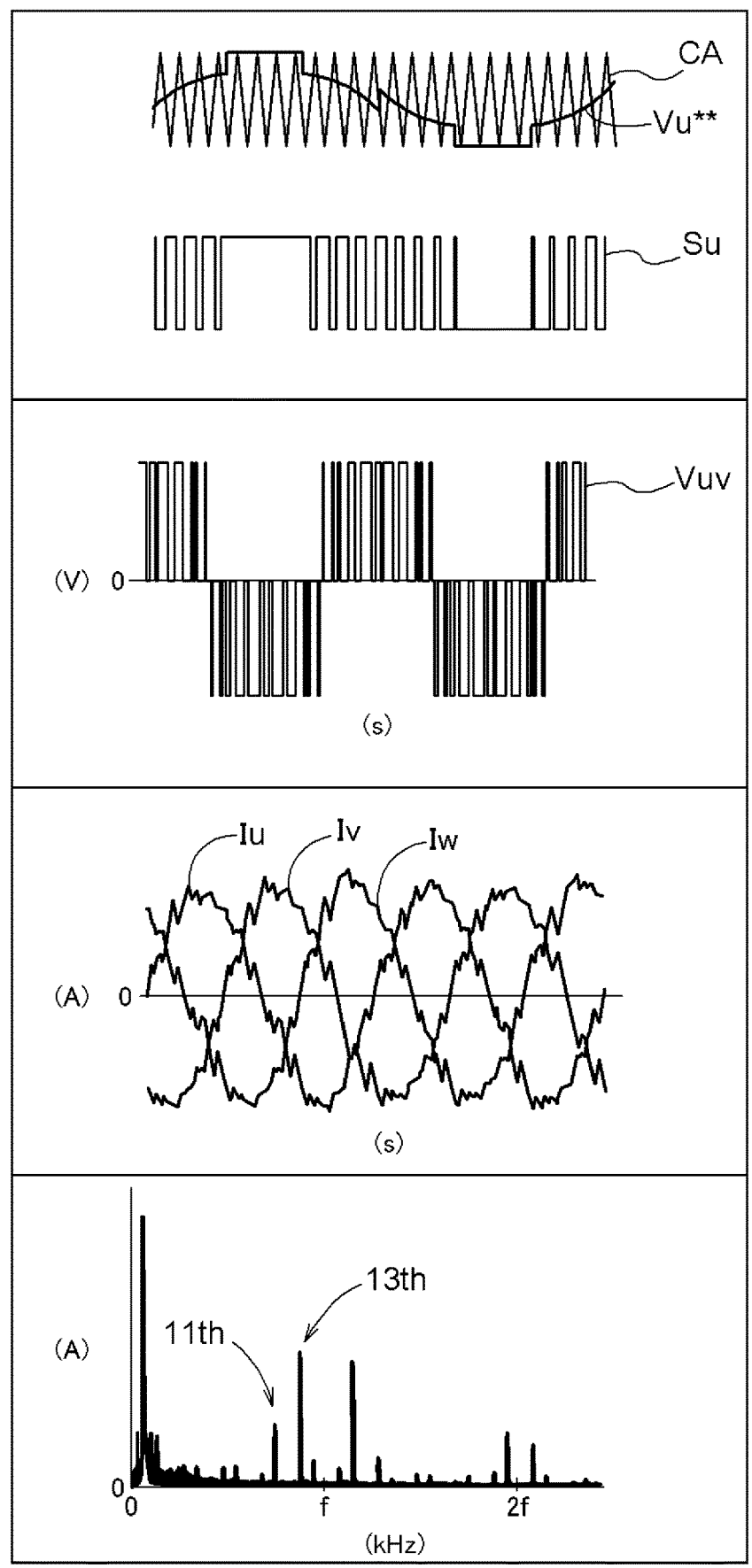
FIG. 28 is a diagram showing exemplary waveforms and exemplary FFT analysis results at a time when discontinuous pulse width modulation control is performed in the 1-inverter system.

FIG. 28 shows exemplary waveforms and exemplary FFT analysis results for a case in which as described above with reference to table 9 and FIG. 20, in the second region VR12 including a region corresponding to the low-speed side second speed region VR2-1, the 1-inverter system performs discontinuous pulse width modulation control. The uppermost segment shows a carrier CA, a U-phase voltage instruction "Vu**", and a U-phase switching control signal "Su", the second segment from top shows a UV line-to-line voltage Vuv, and the third segment from top shows three-phase currents (a U-phase current Iu, a V-phase current Iv, and a W-phase current Iw). The lowermost segment shows results of analysis by a fast Fourier transform (FFT) of the U-phase current Iu.

Figure 29:
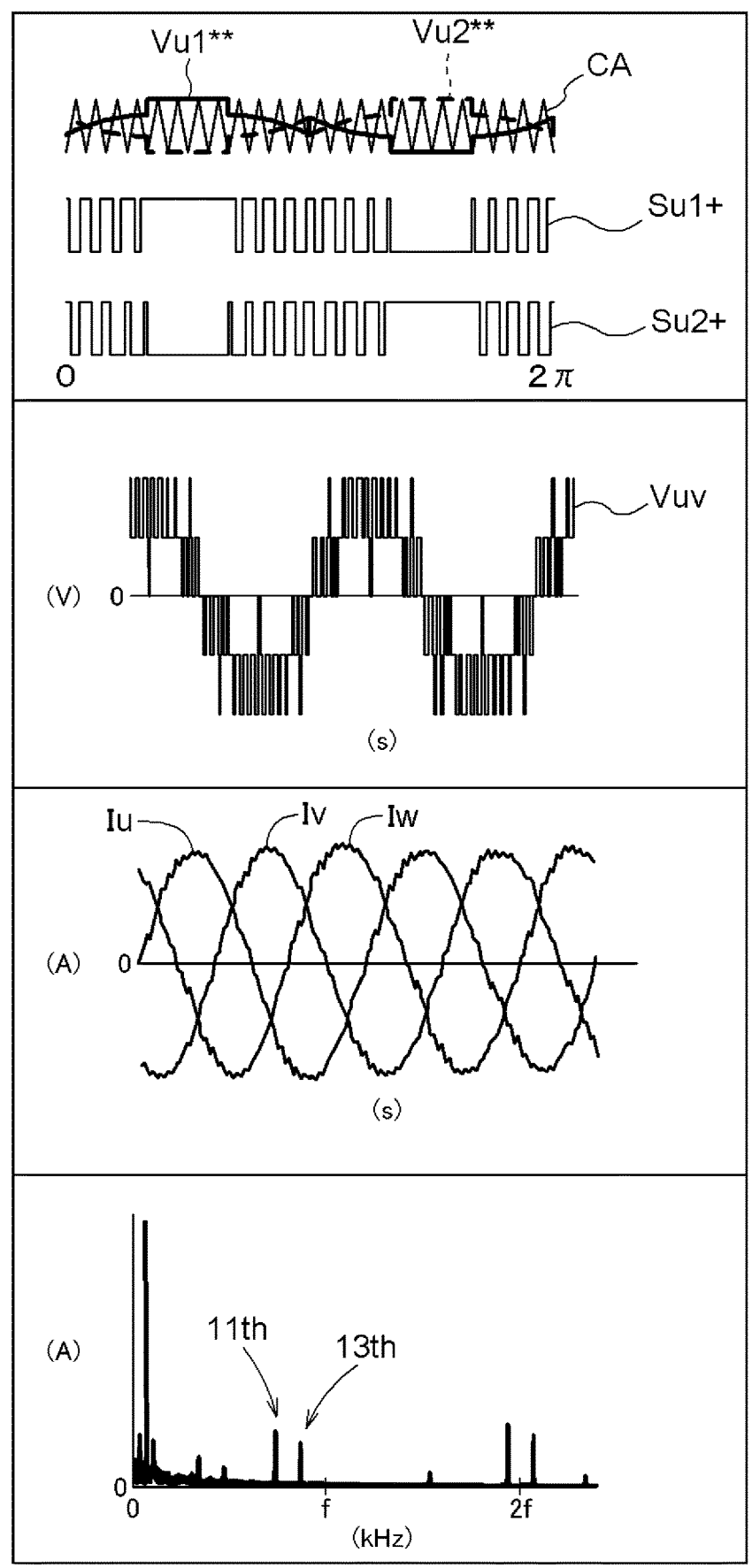
FIG. 29 is a diagram showing exemplary waveforms and exemplary FFT analysis results at a time when discontinuous pulse width modulation control is performed in the 2-inverter system.

FIG. 29 shows exemplary waveforms and exemplary FFT analysis results for a case in which as described above with reference to tables 10 and 11 and FIG. 27, in the second speed region VR2 including the low-speed side second speed region VR2-1, the 2-inverter system performs discontinuous pulse width modulation control on both inverters 10 (a case of performing control using the "DPWM/DPWM" schemes). The uppermost segment shows a carrier CA, U-phase voltage instructions "Vu1" and "Vu2" for the respective two inverters 10, and switching control signals "Su1+ and Su2+" for the two inverters 10. The second and subsequent segments are the same as those of FIG. 28.

Figure 30:
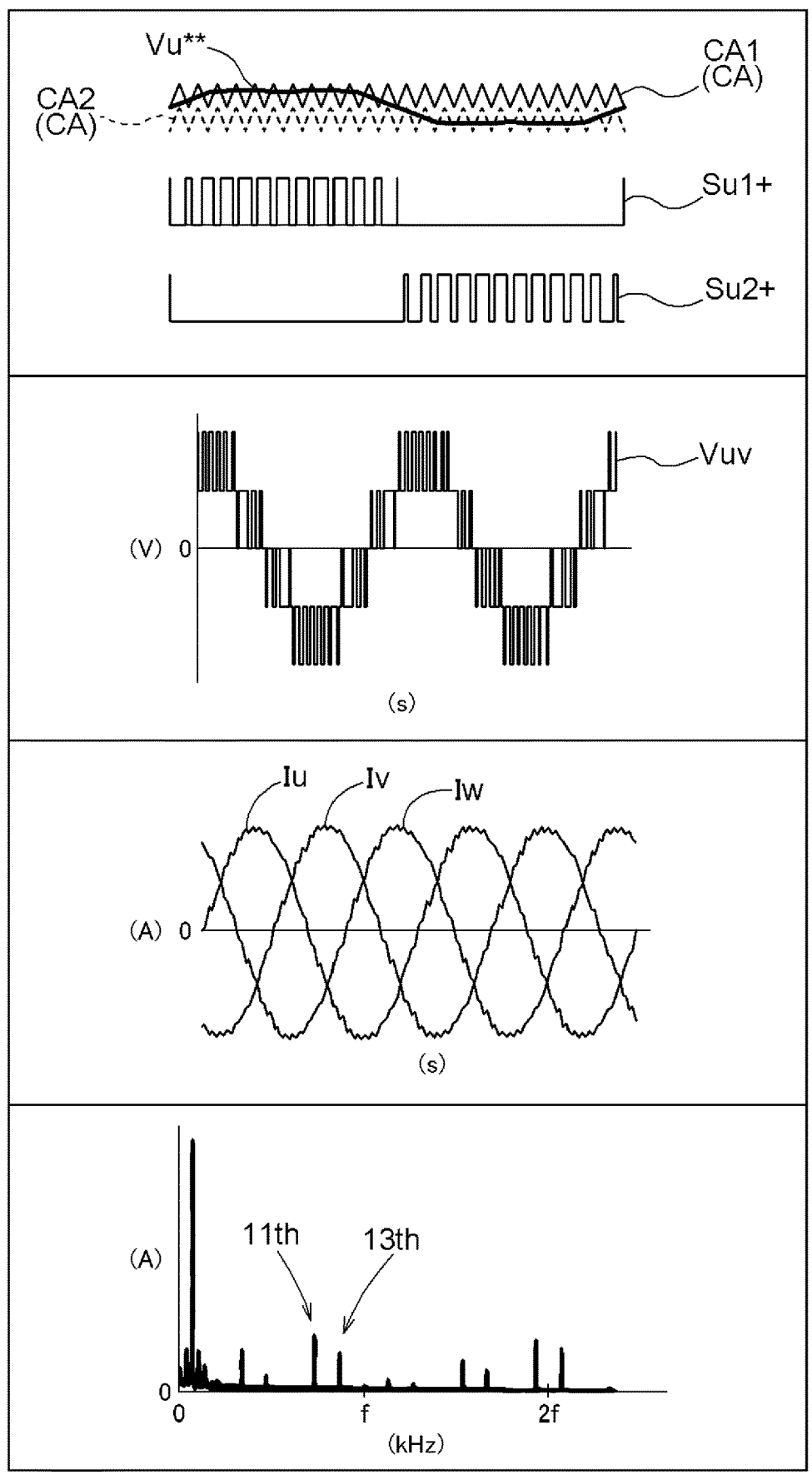
FIG. 30 is a diagram showing exemplary waveforms and exemplary FFT analysis results at a time when mixed continuous pulse width modulation control is performed in the 2-inverter system.

FIG. 30 shows exemplary waveforms and exemplary FFT analysis results for a case in which as described above with reference to tables 3 to 6 and FIG. 7, etc., in the low-speed side second speed region VR2-1 included in the second speed region VR2, the 2-inverter system performs mixed continuous pulse width modulation control on both inverters 10 (a case of performing control using the "MX-CPWM/MX-CPWM" schemes). Signals indicated by the exemplary waveforms are the same as those of FIG. 29.

Figure 31:
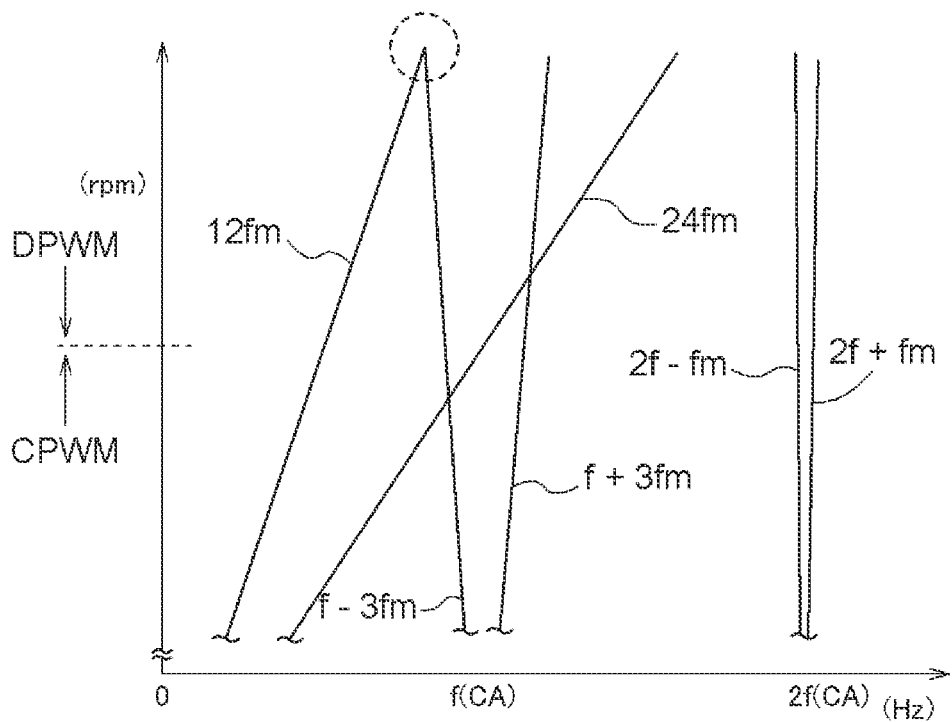
FIG. 31 is a diagram showing a relationship between the rotational speed of the rotating electrical machine and audible noise in the 1-inverter system.
Figure 32:
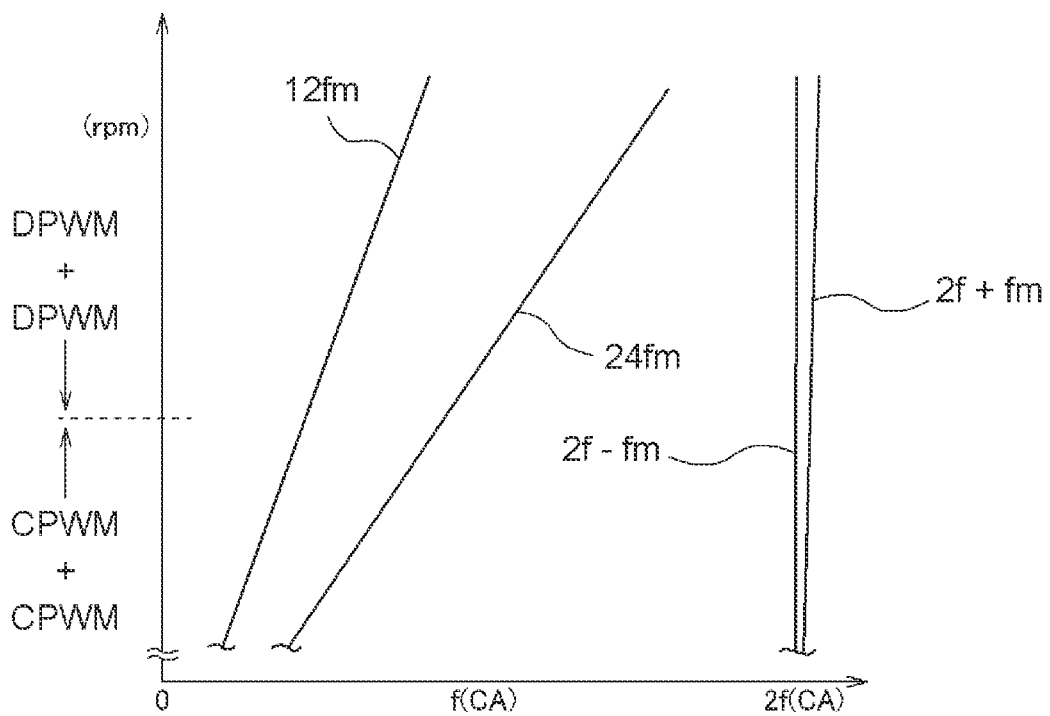
FIG. 32 is a diagram showing a relationship between the rotational speed of the rotating electrical machine and audible noise in the 2-inverter system of the comparative example.
Figure 33:
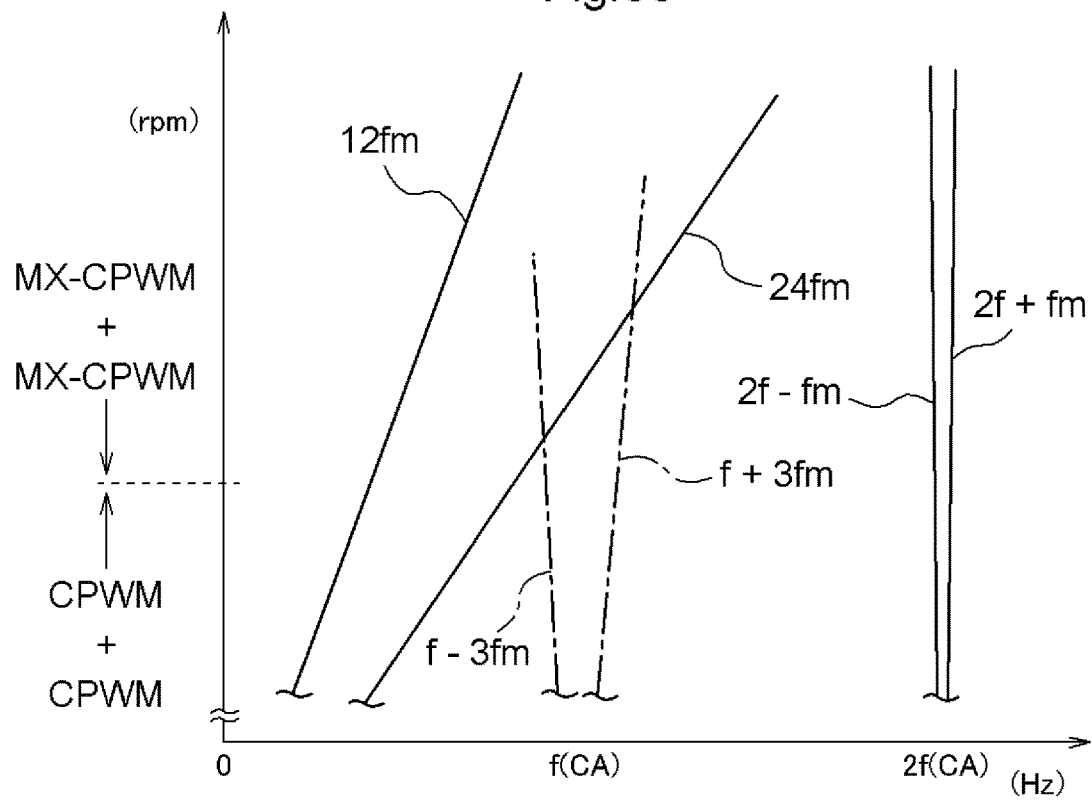
FIG. 33 is a diagram showing a relationship between the rotational speed of the rotating electrical machine and audible noise in the 2-inverter system.

FIG. 31 shows a relationship between rotational speed and audible noise in the 1-inverter system which is described above with reference to table 9, FIG. 32 shows a relationship between the rotational speed of the rotating electrical machine 80 and audible noise in the 2-inverter system of the comparative example which is described above with reference to table 11, etc., and FIG. 33 shows a relationship between the rotational speed of the rotating electrical machine 80 and audible noise in the 2-inverter system of the present embodiment which is described above with reference to table 7, etc. Note that in the 1-inverter system of FIG. 31, as described above with reference to FIG. 20 and table 9, the control region changes from the first region VR11 to the second region VR12 according to the modulation index and the rotational speed of the rotating electrical machine 80, and the control scheme is switched from continuous pulse width modulation control (CPWM) to discontinuous pulse width modulation control (DPWM). In addition, in the 2-inverter system of the comparative example of FIG. 32, as described above with reference to FIGS. 5 to 7 and table 11, the control region changes from the low-speed side first speed region VR1-1 to the high-speed side first speed region VR1-2 according to the modulation index and the rotational speed of the rotating electrical machine 80, and the control scheme is switched from the "CPWM/CPWM" schemes to the "DPWM/DPWM" schemes. In addition, in the 2-inverter system of the present embodiment of FIG. 33, as described above with reference to FIGS. 5 to 7 and table 7, the control region changes from the low-speed side first speed region VR1-1 to the high-speed side first speed region VR1-2 according to the modulation index and the rotational speed of the rotating electrical machine 80, and the control scheme is switched from the "CPWM/CPWM" schemes to the "MX-CPWM/MX-CPWM" schemes.

As is clear from a comparison of FIGS. 28 and 29 and a comparison of FIGS. 28 and 30, many ripples are superimposed on the three-phase currents in a case in which the 1-inverter system performs control using "DPWM", compared with a case in which the 2-inverter system performs control using the "DPWM/DPWM" schemes or the "MX-CPWM/MX-CPWM" schemes. Hence, as the FFT analysis results show, more harmonic content at the sideband frequencies "f±3fm" of the frequency "f" of the carrier CA occurs in the 1-inverter system compared with the 2-inverter system. The harmonic content at the sideband frequencies "f±3fm" may overlap low-order harmonic content (11th and 13th).

In the 1-inverter system, as shown in FIG. 31, noise of the rotating electrical machine 80 occurring according to the speed of the rotating electrical machine 80 (audible noise at "12fm", with the frequency of rotational speed being "fm") and audible noise at the sideband frequencies "f±3fm" overlap each other at a portion circled in broken line, by which audible noise becomes very large. On the other hand, in the 2-inverter system, as shown in FIGS. 32 and 33, there is almost no audible noise at the sideband frequencies "f±3fm" of the frequency "f" of the carrier CA, and thus, there is no chance that the audible noise (12fm) of the rotating electrical machine 80 occurring according to the speed of the rotating electrical machine 80 overlaps the audible noise at the sideband frequencies "f±3fm". Hence, the 2-inverter system can construct a system with a high degree of quietness compared with the 1-inverter system.

In addition, as is clear from a comparison of FIGS. 29 and 30, the number of times the inverters 10 perform switching is small in the "MX-CPWM/MX-CPWM" schemes compared with the "DPWM/DPWM" schemes. Thus, switching loss is small in the "MX-CPWM/MX-CPWM" schemes shown in FIG. 30, compared with the "DPWM/DPWM" schemes shown in FIG. 29, and system loss decreases. As described above, audible noise is equal between the "DPWM/DPWM" schemes and the "MX-CPWM/MX-CPWM" schemes. Thus, by adopting the "MX-CPWM/MX-CPWM" schemes in the second speed region VR2 (the low-speed side second speed region VR2-1) in the 2-inverter system, a high degree of quietness and a reduction in system loss can be achieved.

Meanwhile, when both of the first inverter 11 and the second inverter 12 are driven by mixed pulse width modulation control as described above with reference to table 8, ripples in direct current bus current flowing through the direct current power supplies 6 and the direct current link capacitors 4 (particularly, third order harmonic content at the frequency of rotational speed of the rotating electrical machine 80) may increase in a high-torque operating region. Such harmonic current ripples shorten the lifetimes of the direct current power supplies 6 and the direct current link capacitors 4, which may lead to a malfunction of the rotating electrical machine control device 1. The ripples can be reduced by increasing the capacitance of the direct current link capacitors 4, but the increase in the capacitance may lead to an increase in the physical size of the direct current link capacitors 4 or cost increase. Handling of such ripples will be described below.

Figure 34:
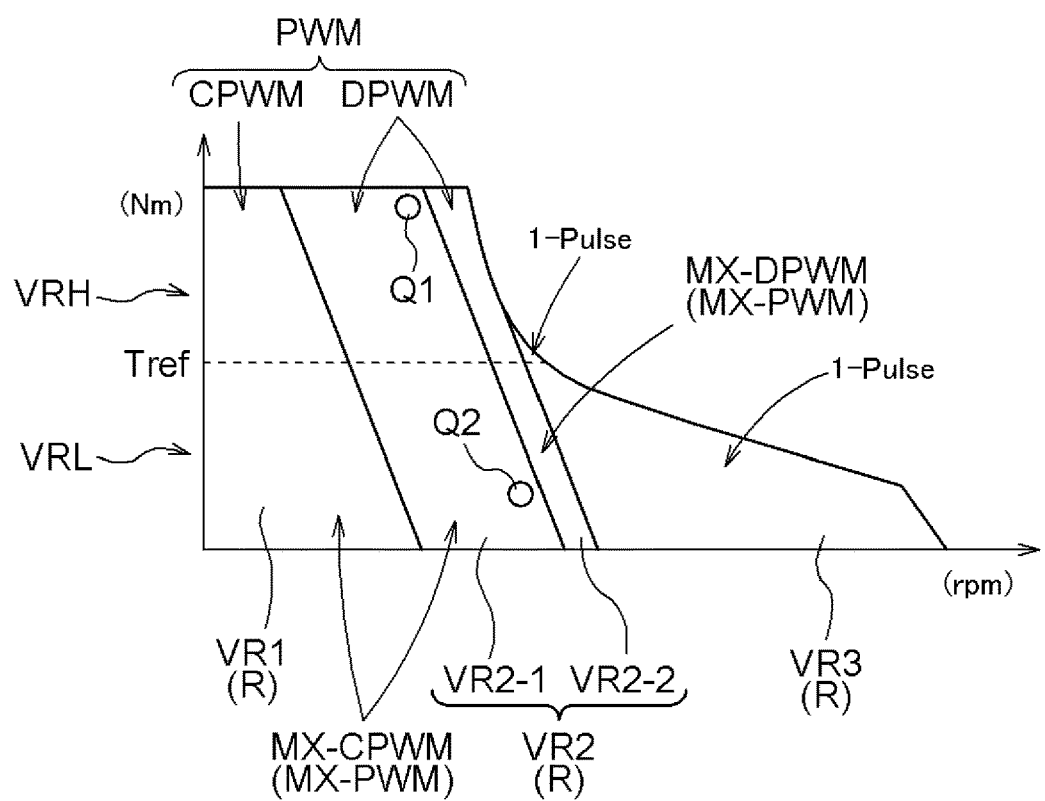
FIG. 34 is a diagram showing an example of control regions of the rotating electrical machine.

FIG. 34 shows an example of control regions of the rotating electrical machine 80, and in a first speed region VR1 and a second speed region VR2, a region with torque greater than or equal to predetermined torque Tref is referred to as high torque region VRH and a region with torque less than the predetermined torque is referred to as low torque region VRL. A first operating point Q1 is an operating point belonging to the high torque region VRH, and a second operating point Q2 is an operating point belonging to the low torque region VRL. In the following, simulation waveforms for those operating points at two locations and FFT analysis results are exemplified, and a 1-inverter system, a 2-inverter system using general pulse width modulation control, and a 2-inverter system using mixed pulse width modulation control will be described by comparison. Note that for reference, FIG. 20 shows a first operating point Q1 and a second operating point Q2 in the 1-inverter system. In addition, although specific numerical values are not shown in the exemplary waveforms, in order for the rotating electrical machines 80 to have equal output, in the 1-inverter system, the rating of voltage on a direct current side (the rating of direct current link voltage Vdc) is twice that of direct current link voltage Vdc of the 2-inverter systems.

FIGS. 35 to 39 show exemplary comparisons of exemplary waveforms for the first operating points Q1 of FIGS. 20 and 34 between the 1-inverter system, the 2-inverter system using general pulse width modulation control, and the 2-inverter system using mixed pulse width modulation control, and exemplary comparisons of FFT analysis results. In addition, FIGS. 40 to 44 show exemplary comparisons of exemplary waveforms for the second operating points Q2 of FIGS. 20 and 34 between the 1-inverter system, the 2-inverter system using general pulse width modulation control, and the 2-inverter system using mixed pulse width modulation control, and exemplary comparisons of FFT analysis results. All of FIGS. 35 to 44 show the 1-inverter system, the 2-inverter system using general pulse width modulation control, and the 2-inverter system using mixed pulse width modulation control in this order from left to right. In addition, in all of FIGS. 35 to 44, the upper side shows exemplary waveforms and the lower side shows FFT analysis results.

Note that simulations are performed in such a manner that in the 1-inverter system, the inverter 10 is driven by discontinuous pulse width modulation control (DPWM), in the 2-inverter system using general pulse width modulation control, both inverters 10 are driven by discontinuous pulse width modulation control (DPWM/DPWM), and in the 2-inverter system using mixed pulse width modulation control, both inverters 10 are driven by mixed continuous pulse width modulation control (MX-CPWM/MX-CPWM). In addition, in FIGS. 35 to 44, "fm" represents the frequency of rotational speed (rotational frequency) of the rotating electrical machine 80, and "f" represents the switching frequency (the frequency of a carrier CA) of the inverters 10. As described above, here, simulations are performed with the switching frequency "f" being 5 [kHz].

Figure 35:
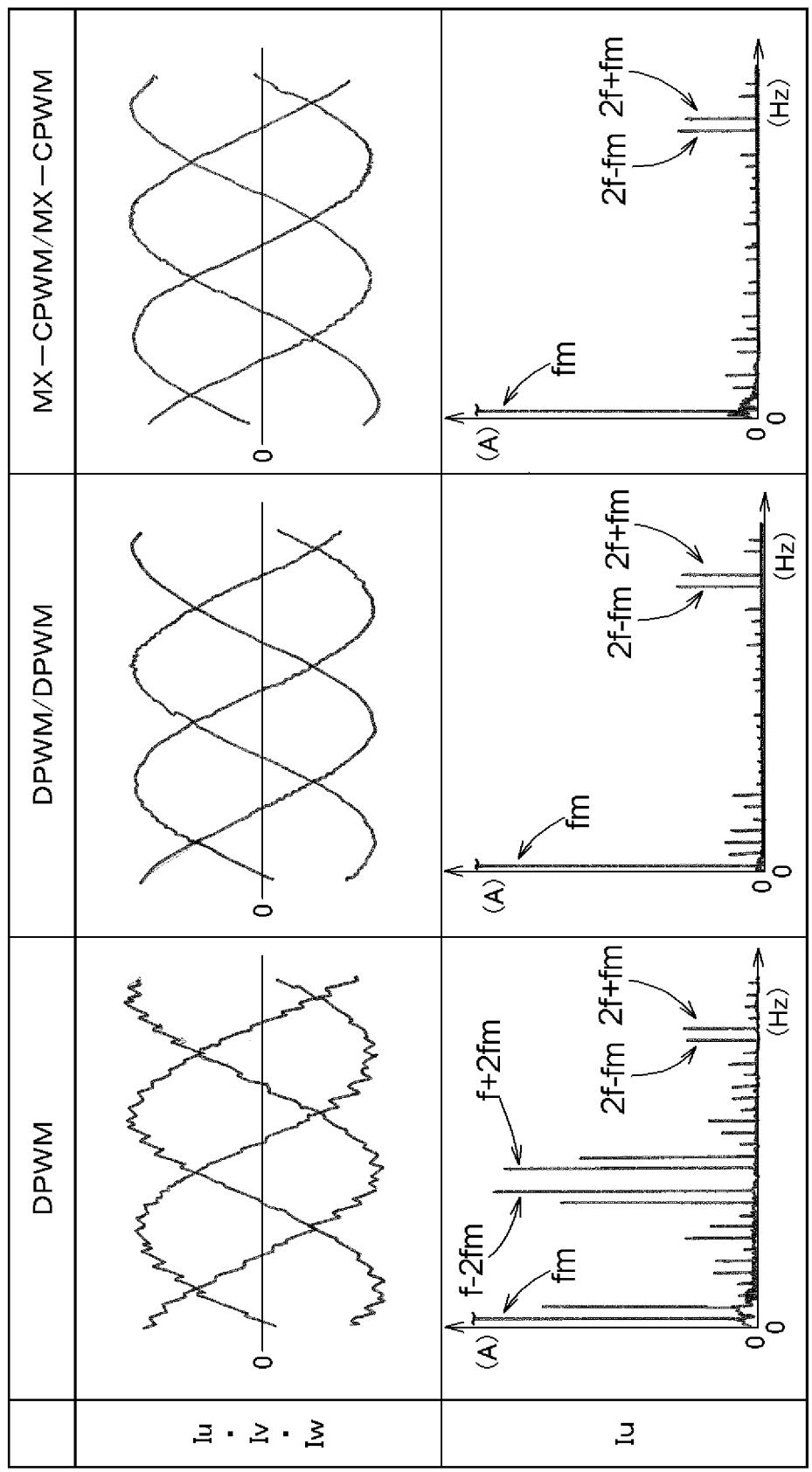
FIG. 35 is a diagram showing exemplary comparisons of phase current waveforms at first operating points (Q1) of FIGS. 20 and 34 between a 1-inverter system, a 2-inverter system using general pulse width modulation control, and a 2-inverter system using mixed pulse width modulation control, and FFT analysis results for a phase current.
Figure 36:
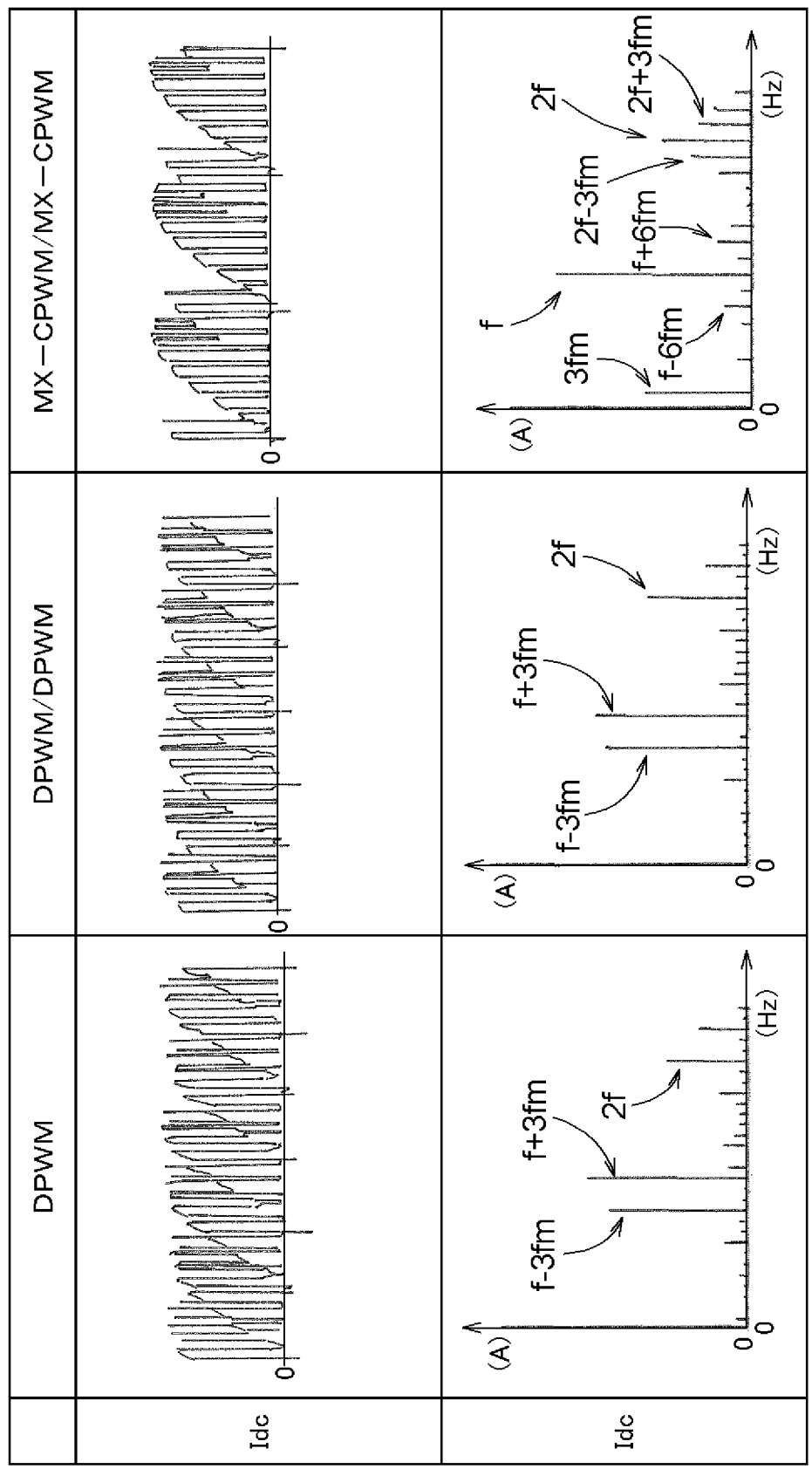
FIG. 36 is a diagram showing exemplary comparisons of direct current bus current waveforms at the first operating points between the 1-inverter system, the 2-inverter system using general pulse width modulation control, and the 2-inverter system using mixed pulse width modulation control, and FFT analysis results for the direct current bus current.
Figure 37:
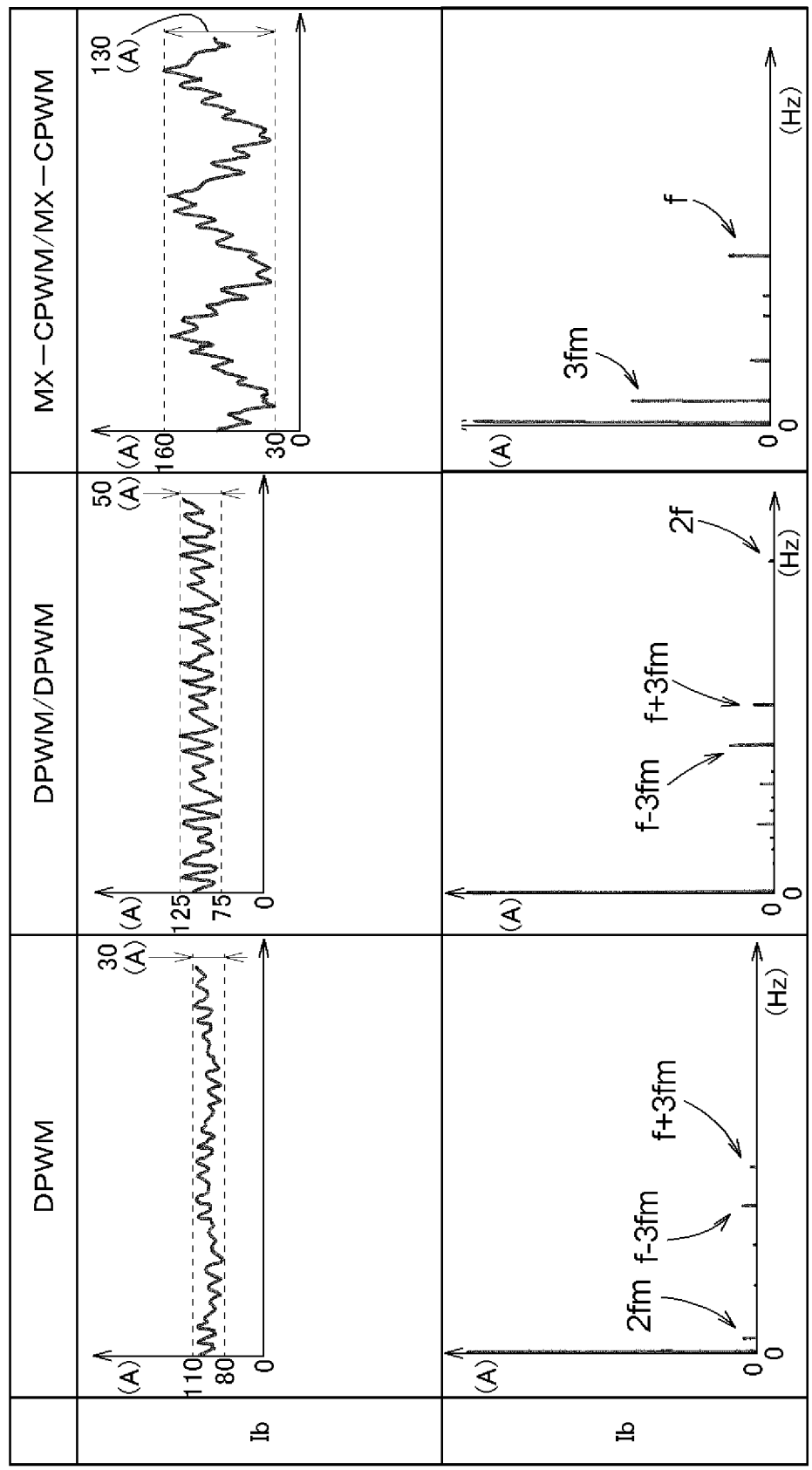
FIG. 37 is a diagram showing exemplary comparisons of battery current waveforms at the first operating points between the 1-inverter system, the 2-inverter system using general pulse width modulation control, and the 2-inverter system using mixed pulse width modulation control, and FFT analysis results for the battery current.
Figure 40:
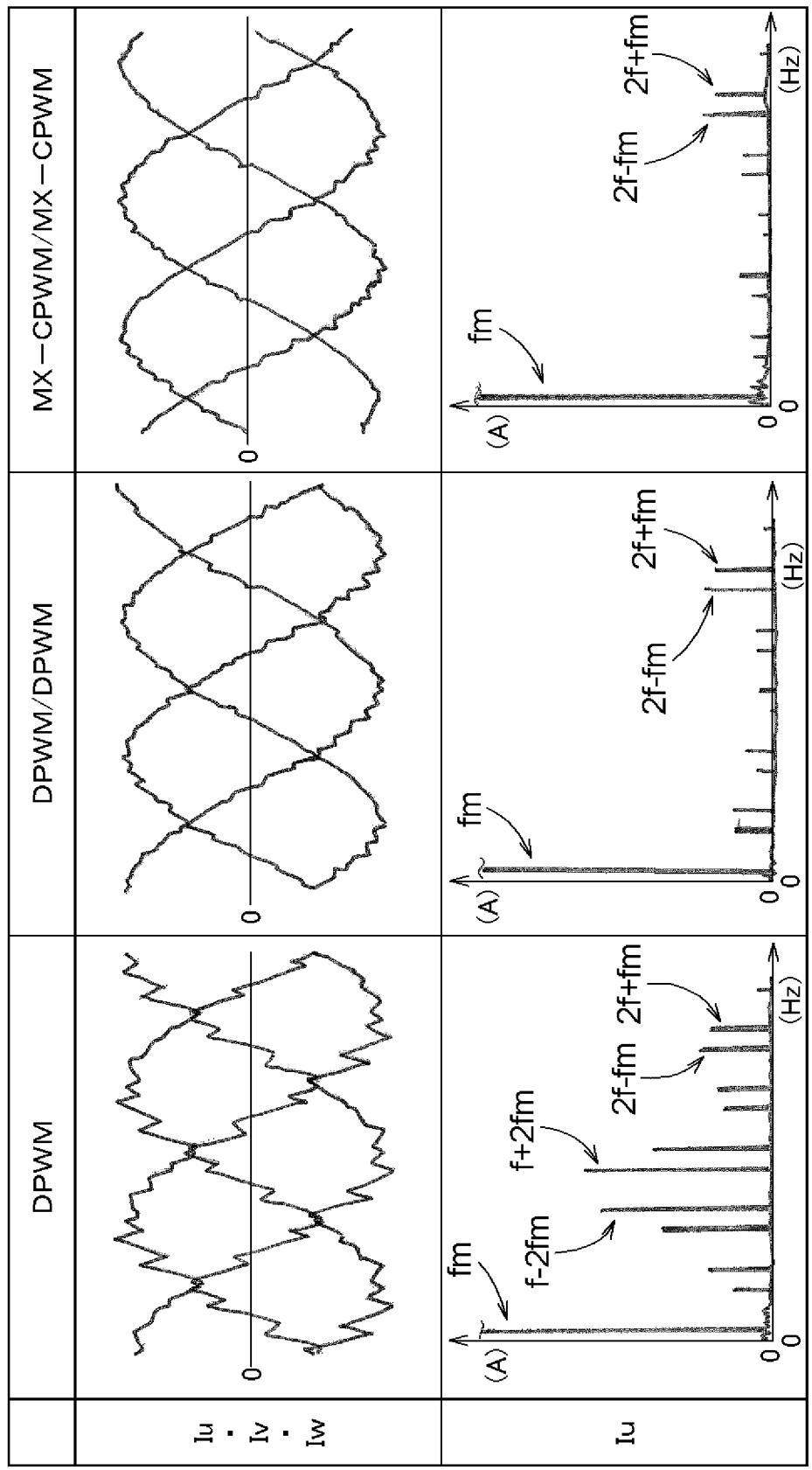
FIG. 40 is a diagram showing exemplary comparisons of phase currents at second operating points (Q2) of FIGS. 20 and 34 between the 1-inverter system, the 2-inverter system using general pulse width modulation control, and the 2-inverter system using mixed pulse width modulation control, and FFT analysis results for the phase current.
Figure 41:
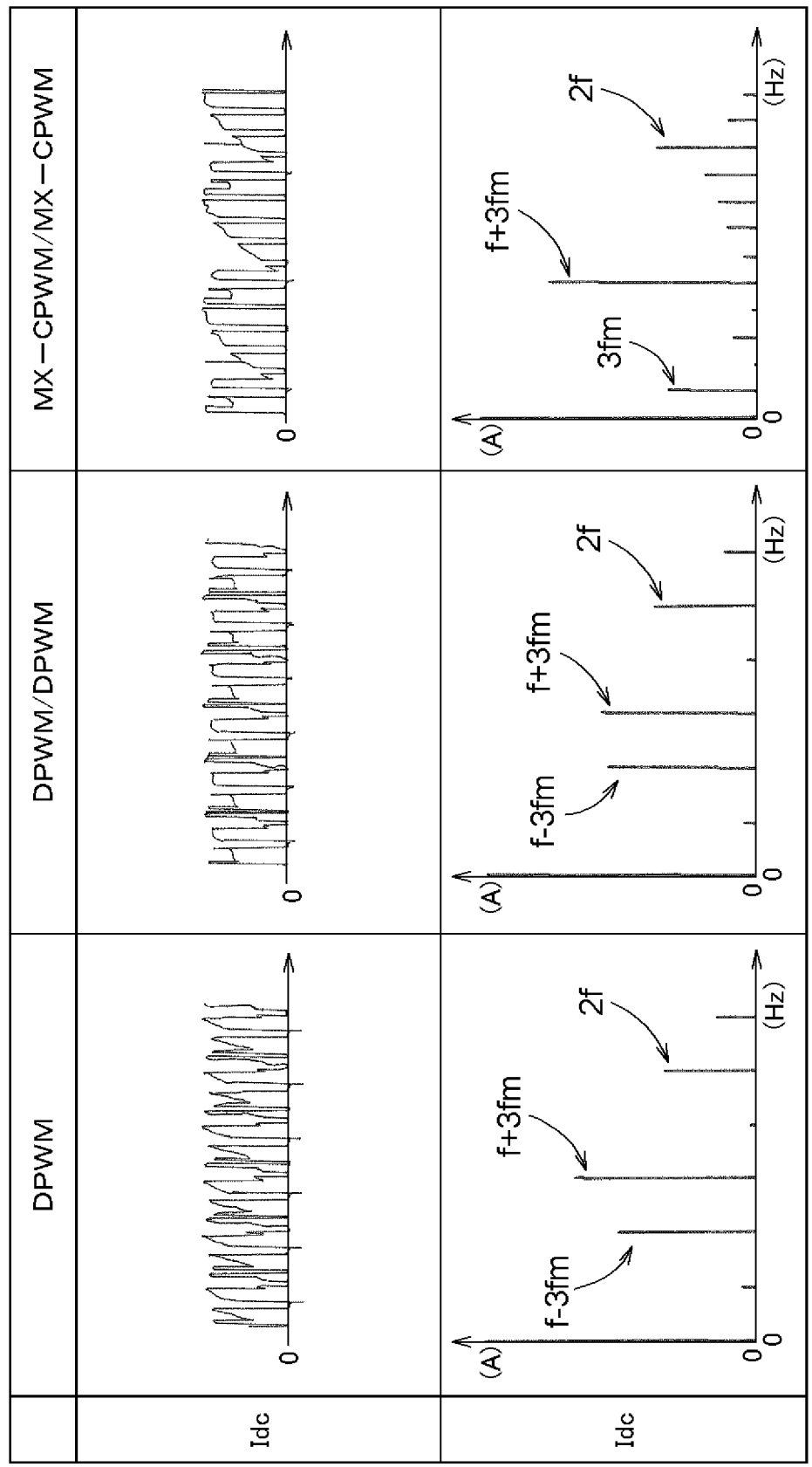
FIG. 41 is a diagram showing exemplary comparisons of direct current bus current waveforms at the second operating points between the 1-inverter system, the 2-inverter system using general pulse width modulation control, and the 2-inverter system using mixed pulse width modulation control, and FFT analysis results for the direct current bus current.
Figure 42:
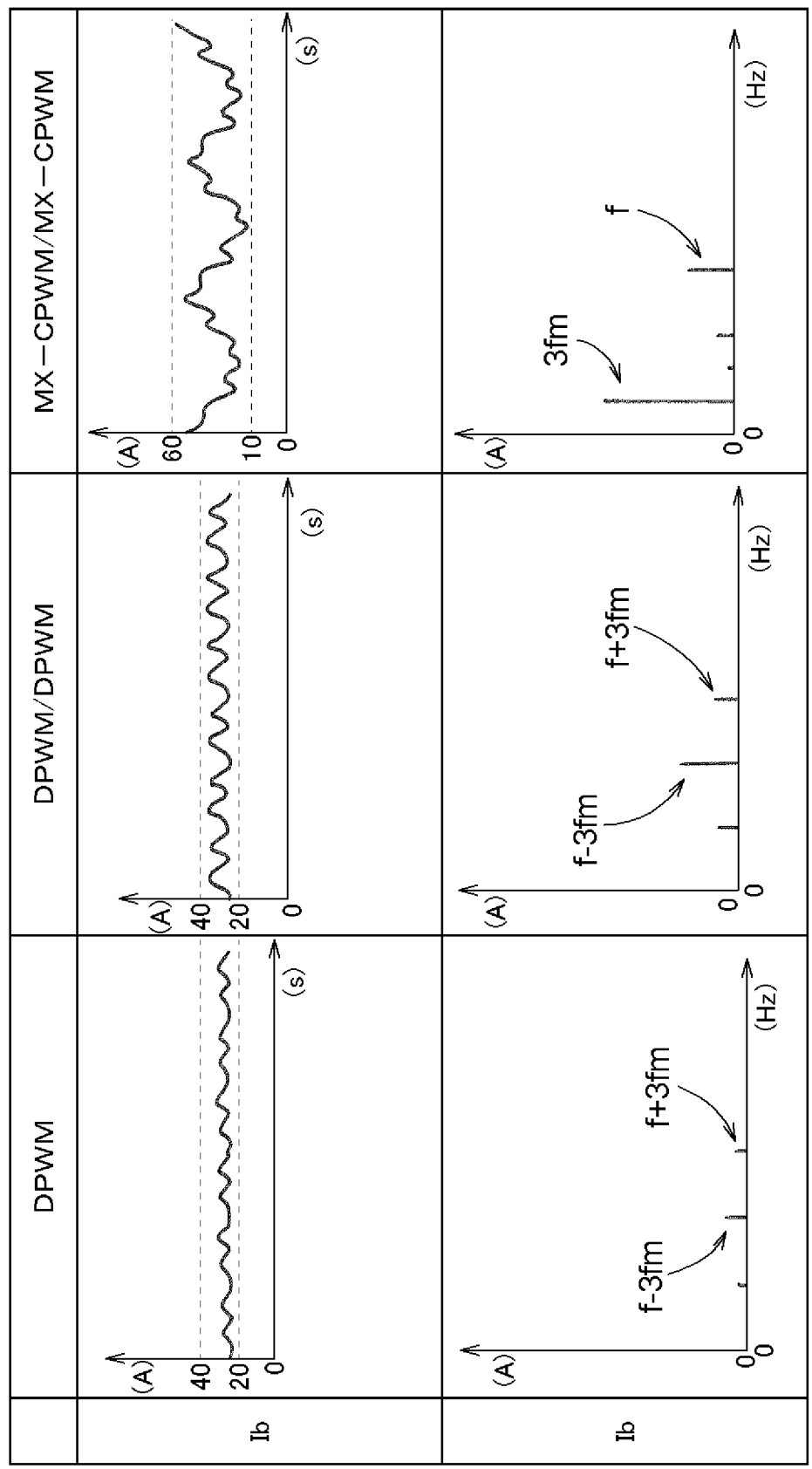
FIG. 42 is a diagram showing exemplary comparisons of battery current waveforms at the second operating points between the 1-inverter system, the 2-inverter system using general pulse width modulation control, and the 2-inverter system using mixed pulse width modulation control, and FFT analysis results for the battery current.

FIGS. 35 and 40 show waveforms of phase currents of three-phase alternating current (Iu, Iv, and Iw) and FFT analysis results for a phase current (e.g., the U-phase current Iu as a representative). FIGS. 36 and 41 show waveforms of the direct current bus current Idc and FFT analysis results for the direct current bus current Idc. Note that for the 2-inverter systems, as a representative, a current waveform on the direct current side of the first inverter 11 is shown. FIGS. 37 and 42 show waveforms of battery current Ib flowing through the direct current power supply 6 and FFT analysis results for the battery current Ib. For the 2-inverter systems, as a representative, a waveform of current flowing through the first direct current power supply 61 provided in the first inverter 11 is shown.

Figure 38:
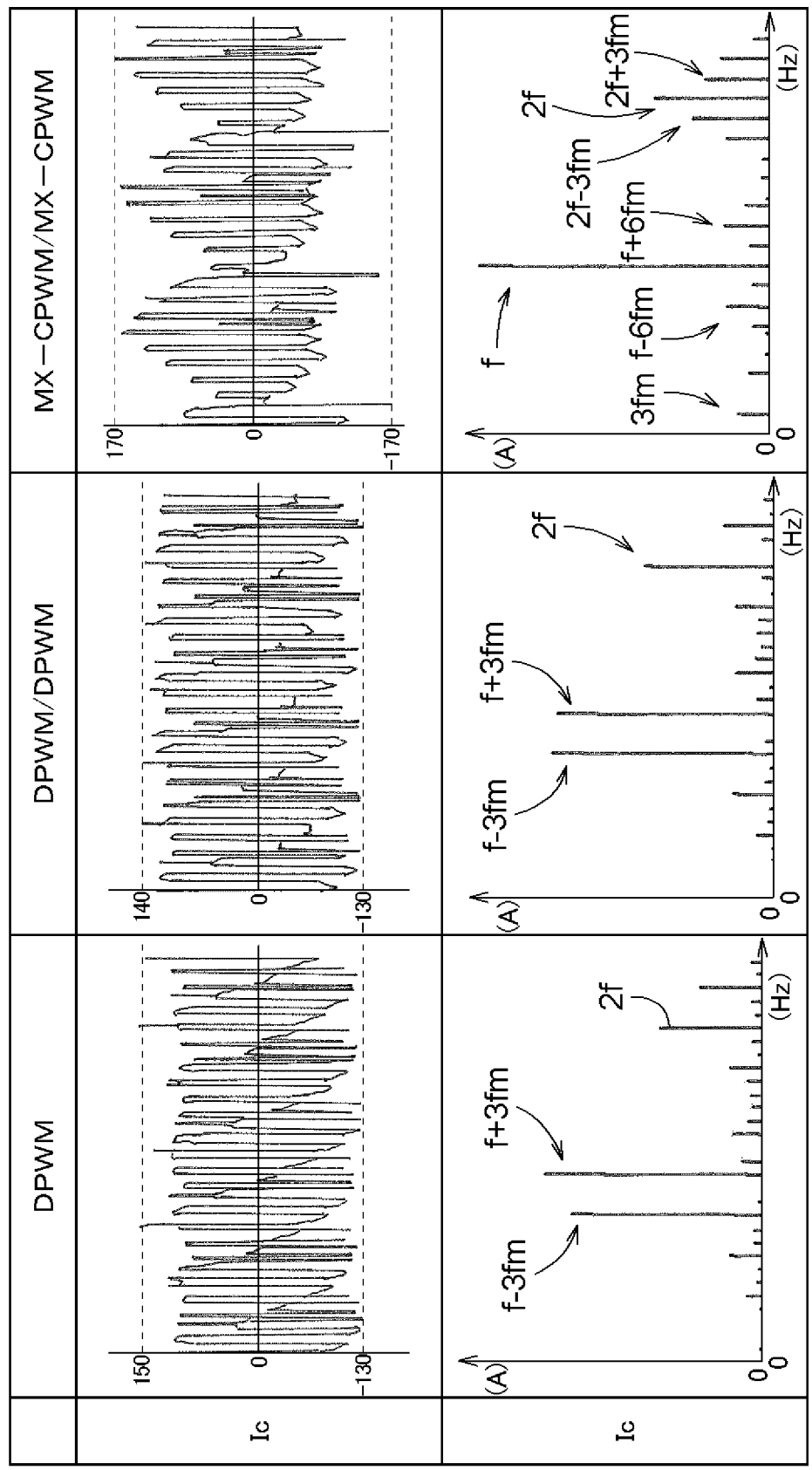
FIG. 38 is a diagram showing exemplary comparisons of capacitor current waveforms at the first operating points between the 1-inverter system, the 2-inverter system using general pulse width modulation control, and the 2-inverter system using mixed pulse width modulation control, and FFT analysis results for the capacitor current.
Figure 43:
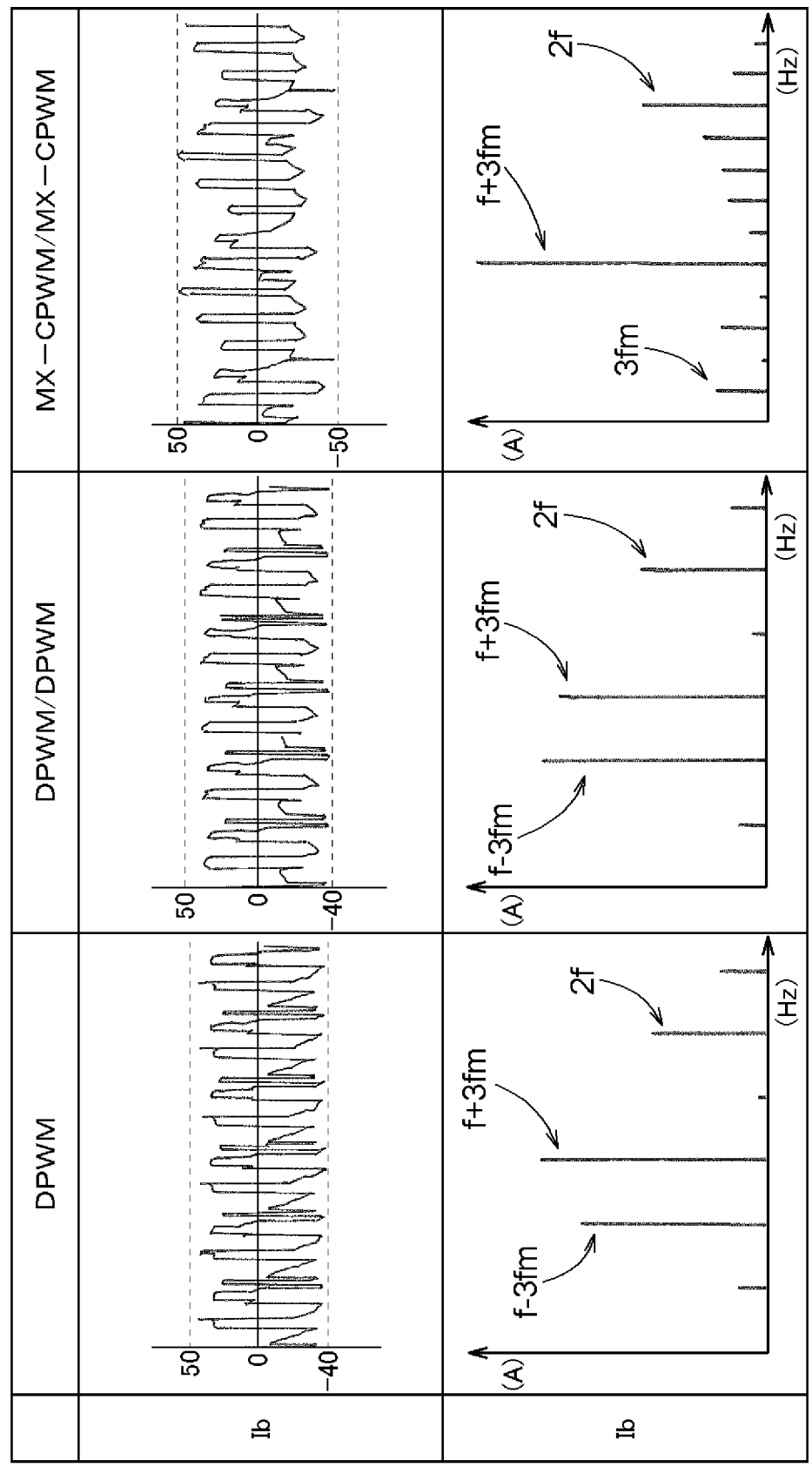
FIG. 43 is a diagram showing exemplary comparisons of capacitor current waveforms at the second operating points between the 1-inverter system, the 2-inverter system using general pulse width modulation control, and the 2-inverter system using mixed pulse width modulation control, and FFT analysis results for the capacitor current.

FIGS. 38 and 43 show waveforms of capacitor current Ic flowing through the direct current link capacitor 4 and FFT analysis results for the capacitor current Ic. For the 2-inverter systems, as a representative, a waveform of current flowing through the first direct current link capacitor 41 provided in the first inverter 11 is shown.

Figure 39:
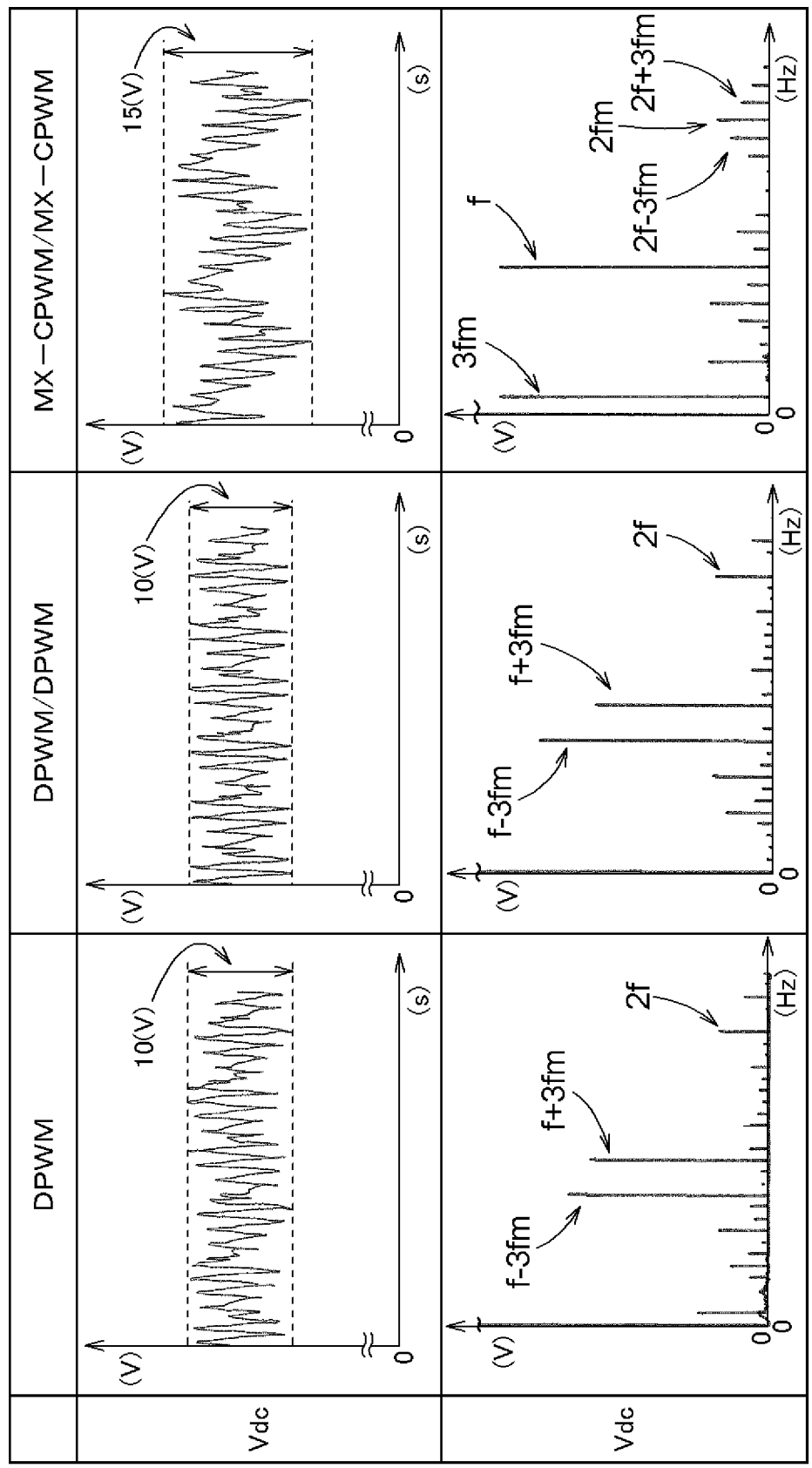
FIG. 39 is a diagram showing exemplary comparisons of direct current bus voltage ripple waveforms at the first operating points between the 1-inverter system, the 2-inverter system using general pulse width modulation control, and the 2-inverter system using mixed pulse width modulation control, and FFT analysis results for the direct current bus voltage ripples.
Figure 44:
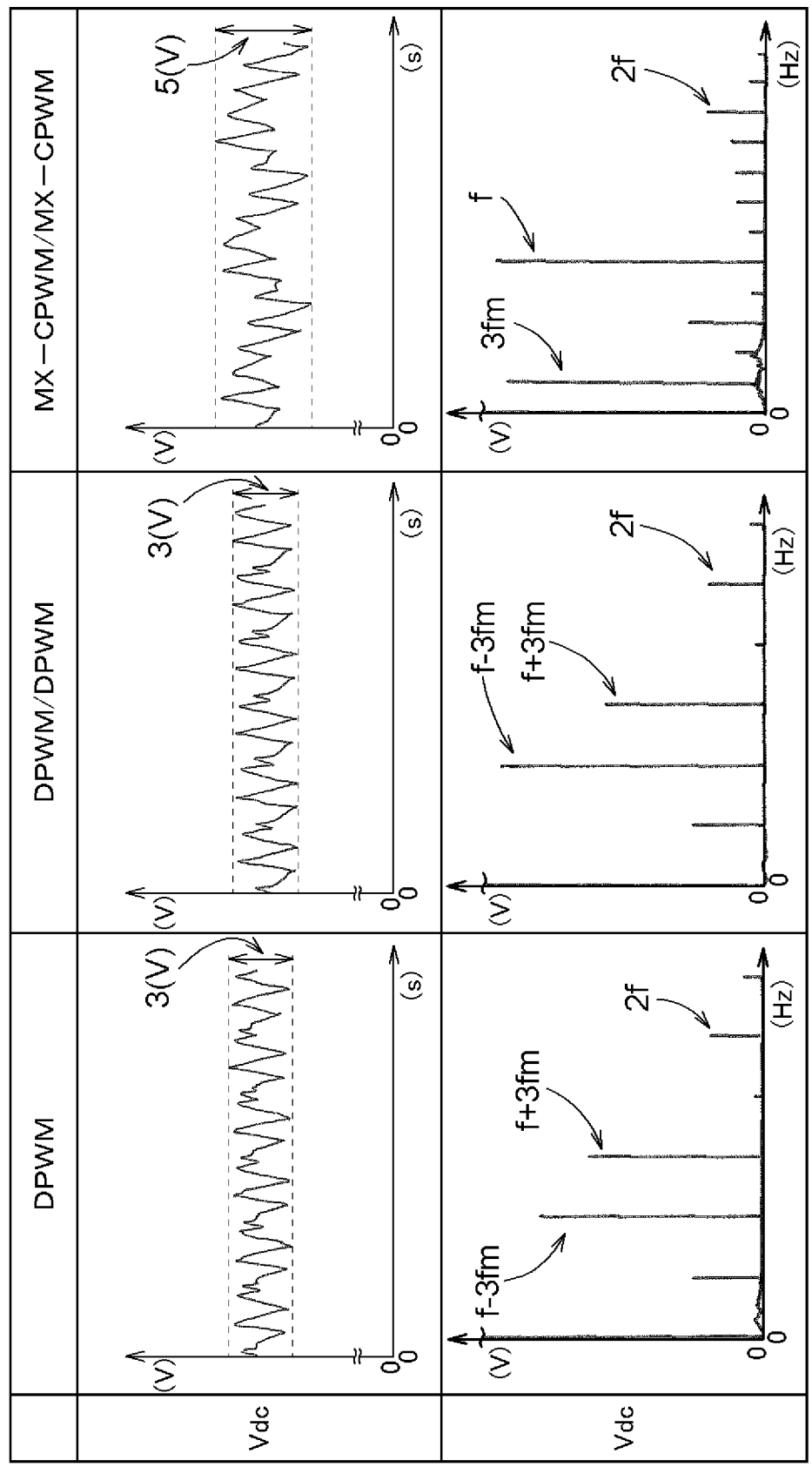
FIG. 44 is a diagram showing exemplary comparisons of direct current bus voltage ripple waveforms at the second operating points between the 1-inverter system, the 2-inverter system using general pulse width modulation control, and the 2-inverter system using mixed pulse width modulation control, and FFT analysis results for the direct current bus voltage ripples.

FIGS. 39 and 44 show waveforms of direct current link voltage Vdc, particularly, direct current bus voltage ripple waveforms appearing in the direct current link voltage Vdc, and FFT analysis results for the direct current bus voltage ripples. Compared with the direct current link voltage Vdc (100 to 200 [V] in the two inverters and 200 to 400 [V] in the 1-inverter system), the wave height of the direct current bus voltage ripples is as small as about 10 [V], and thus, FIGS. 39 and 44 show waveforms of alternating current components near the rated value of direct current. In addition, for the 2-inverter systems, as a representative, a waveform of the direct current link voltage Vdc of the first inverter 11 is shown.

As shown in FIGS. 35 and 40, in the 1-inverter system, high noise components occur near the switching frequency "f". However, in the 2-inverter systems, the first inverter 11 and the second inverter 12 cancel out noise resulting from the switching frequency "f", by which noise components near the switching frequency "f" are greatly suppressed.

As shown in FIGS. 36 and 41, in the 2-inverter systems, too, the direct current bus current Idc is current flowing through each inverter 10 and thus current ripples resulting from the switching frequency "f" cannot be cancelled out, and similar noise components to those in the 1-inverter system are observed. Particularly, since control schemes for the 1-inverter system and the 2-inverter system using general pulse width modulation control are both discontinuous pulse width modulation control (DPWM), FFT analysis results are substantially the same. On the other hand, in the 2-inverter system using mixed continuous pulse width modulation control (MX-CPWM), as described above with reference to FIG. 8, etc., pulses are asymmetrical during one cycle of electrical angle, and thus, a high value of ripples in the third order harmonic content "3fm" at the rotational frequency "fm" is observed.

For the battery current Ib shown in FIGS. 37 and 42, too, the same trend as that of the direct current bus current Idc is observed. As a result, as shown in FIG. 37, the wave height of ripple components in the battery current Ib at the first operating points Q1 is about 30 [A] in the 1-inverter system and is about 50 [A] in the 2-inverter system using general discontinuous pulse width modulation control, whereas in the 2-inverter system using mixed discontinuous pulse width modulation control, the wave height is as very high as about 130 [A]. On the other hand, as shown in FIG. 42, the wave height of ripple components in the battery current Ib at the second operating points Q2 is less than 20 [A] in the 1-inverter system and the 2-inverter system using general discontinuous pulse width modulation control, and is less than 50 [A] even in the 2-inverter system using mixed discontinuous pulse width modulation control. That is, even in the 2-inverter system using mixed discontinuous pulse width modulation control, the wave height of ripple components in the battery current Ib at the second operating point Q2 with relatively small torque is suppressed to less than the wave height (about 50 [A]) at the first operating point Q1 with relatively large torque in the 2-inverter system using general discontinuous pulse width modulation control.

The capacitor current Ic is "the battery current Ib−the direct current bus current Idc". Thus, as shown in FIGS. 38 and 43, the same trend as the trends of the battery current Ib and the direct current bus current Idc is observed. Namely, in the 2-inverter system using mixed discontinuous pulse width modulation control, ripple components in the third order harmonic content "3fm" at the rotational frequency "fm" are observed, but at the second operating point Q2, compared with the first operating point Q1, the wave height of ripple components in the capacitor current Ic is suppressed and is almost equal to that of the 2-inverter system using general discontinuous pulse width modulation control.

As shown in FIGS. 39 and 44, the same trend is also observed for the direct current link voltage Vdc.

Namely, in the 2-inverter system using mixed discontinuous pulse width modulation control, ripple components in the third order harmonic content "3fm" at the rotational frequency "fm" are observed, and at the first operating point Q1, ripple voltage with a wave height of about 15 [V] is observed, while the other systems have ripple voltage with a wave height of about 10 [V]. However, compared with the first operating point Q1, at the second operating point Q2, the wave height of the ripple voltage is suppressed, resulting in ripple voltage with a wave height of about 5 [V], while the 2-inverter system using general discontinuous pulse width modulation control has ripple voltage with a wave height of about 3 [V], and the wave height of the ripple voltage is suppressed to a substantially equal level to that of the 2-inverter system using general discontinuous pulse width modulation control.

When ripples in the battery current Ib increase, loss in the direct current power supply 6 increases. Since the loss turns into heat, the heating value of the direct current power supply 6 increases, which may reduce the lifetime of the direct current power supply 6. To reduce ripples in the third order harmonic content at the rotational frequency "fm" such as those described above, the capacitance of the direct current link capacitor 4 may be increased. Note, however, that the increase in the capacitance leads to an increase in the physical size of the direct current link capacitor 4, and due to an increase in unit prices of parts, an increase in accommodation space, etc., cost may increase.

As described above with reference to FIGS. 35 to 44, at the second operating point Q2 with relatively low torque, compared with the first operating point Q1 with relatively high torque, ripples in the third order harmonic content at the rotational frequency "fm" are suppressed. Thus, it is preferred that in a control region including the second operating point Q2 (low torque region VRL), both inverters 10 be driven by mixed pulse width modulation control, and in a control region including the first operating point Q1 (high torque region (VRH)), both inverters 10 be driven by general pulse width modulation. Namely, it is preferred that in the high torque region VRH with torque greater than or equal to the predetermined torque Tref which is torque determined in advance in the first speed region VR1 and the second speed region VR2, the rotating electrical machine control device 1 control both inverters 10, the first inverter 11 and the second inverter, by pulse width modulation control, and in the low torque region VRL with torque less than the predetermined torque Tref in the first speed region VR1 and the second speed region VR2, the rotating electrical machine control device 1 control both inverters 10, the first inverter 11 and the second inverter 12, by mixed pulse width modulation control. For example, it is preferred that the rotating electrical machine control device 1 drive the inverters 10 as shown in the following table 12.

TABLE 12

| Torque | Mi_sys | INV1 | Mi_inv1 | INV2 | Mi_inv2 |
|---|---|---|---|---|---|
| T < Tref | M < b | MX-CPWM | M < b | MX-CPWM | M < b |
|  | b ≤ M < 0.78 | MX-DPWM | b ≤ M < 0.78 | MX-DPWM | b ≤ M < 0.78 |
|  | M = 0.78 | 1-Pulse | M = 0.78 | 1-Pulse | M = 0.78 |
| T ≥ Tref | M < X | CPWM | M < X | CPWM | M < X |
|  | X ≤ M < 0.78 | DPWM | X ≤ M < 0.78 | DPWM | X ≤ M < 0.78 |
|  | M = 0.78 | 1-Pulse | M = 0.78 | 1-Pulse | M = 0.78 |

Here, when the control regions described above with reference to table 8 are applied to table 12, the following table 13 is obtained. FIG. 34 exemplifies control regions R and control schemes that correspond to this mode. Note that as shown in tables 8 and 12, Mi_sis, Mi_inv1, and Mi_inv2 are the same, and thus, in table 13, Mi_inv1 and Mi_inv2 are omitted.

TABLE 13

| Torque | R | Mi_sys | INV1 | INV2 |
|---|---|---|---|---|
| T < Tref | VR1 (VRL) | M < X | MX-CPWM | MX-CPWM |
|  | VR2-1 (VRL) | X ≤ M < b | MX-CPWM | MX-CPWM |
|  | VR2-2 (VRL) | b ≤ M < 0.78 | MX-DPWM | MX-DPWM |
|  | VR3 | M = 0.78 | 1-Pulse | 1-Pulse |
| T ≥ Tref | VR1 (VRH) | M < X | CPWM | CPWM |
|  | VR2-1 (VRH) | X ≤ M < b | DPWM | DPWM |
|  | VR2-2 (VRH) | b ≤ M < 0.78 | DPWM | DPWM |
|  | VR3 | M = 0.78 | 1-Pulse | 1-Pulse |

Namely, as exemplified in table 13, in the low torque region VRL with torque less than the predetermined torque Tref in the first speed region VR1 and the low-speed side second speed region VR2-1, the rotating electrical machine control device 1 controls both inverters 10, the first inverter 11 and the second inverter 12, by mixed continuous pulse width modulation control (MX-CPWM), and in the low torque region VRL with torque less than the predetermined torque Tref in the high-speed side second speed region VR2-2, the rotating electrical machine control device 1 controls both inverters 10, the first inverter 11 and the second inverter 12, by mixed discontinuous pulse width modulation control (MX-DPWM). In addition, in the high torque region VRH in the first speed region VR1, the rotating electrical machine control device 1 controls both inverters 10, the first inverter 11 and the second inverter 12, by continuous pulse width modulation control (CPWM), and in the high torque region VRH in the second speed region VR2, the rotating electrical machine control device 1 controls both inverters 10, the first inverter 11 and the second inverter 12, by discontinuous pulse width modulation control (DPWM).

Note that the actual direct current power supply 6 has a resistive component (battery resistance Rb) and an inductance component (battery inductance Lb). In a simulation performed by the inventors, using the battery resistance Rb and battery inductance Lb of the existing direct current power supply 6, battery current Ib and direct current link voltage Vdc are computed from direct current bus current Idc. It has also been confirmed that the values of the computed battery current Ib and direct current link voltage Vdc match a current gain frequency characteristic based on the switching frequency "f". Note that when the battery resistance Rb and the battery inductance Lb increase, the frequency characteristic changes in a direction in which the current gain decreases, and thus, current ripples are further reduced.

Figure 45:
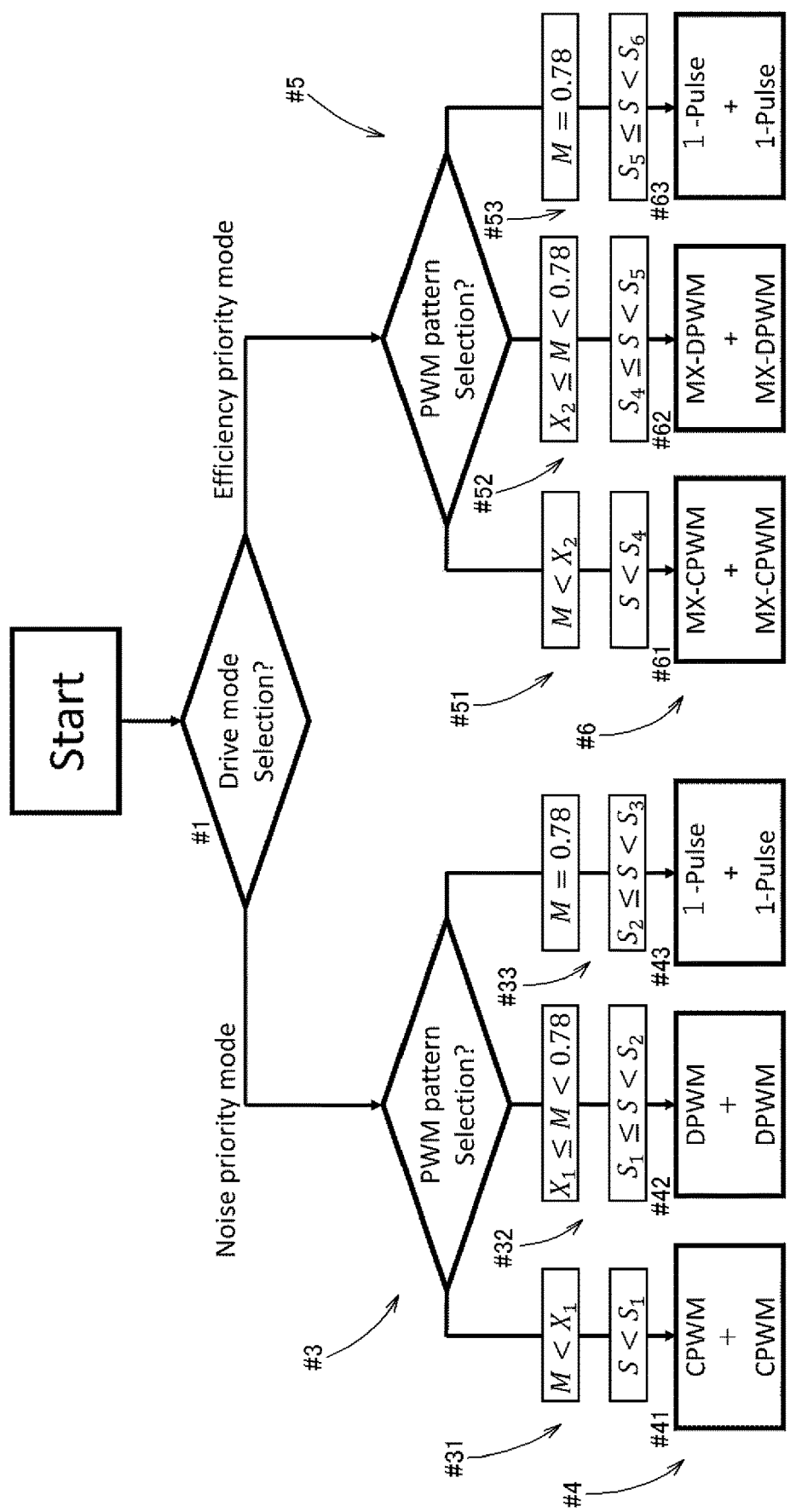
FIG. 45 is a flowchart showing an example of a procedure for selecting control schemes for a case in which ripples in direct current bus current flowing through direct current link capacitors are not taken into account.
Figure 46:
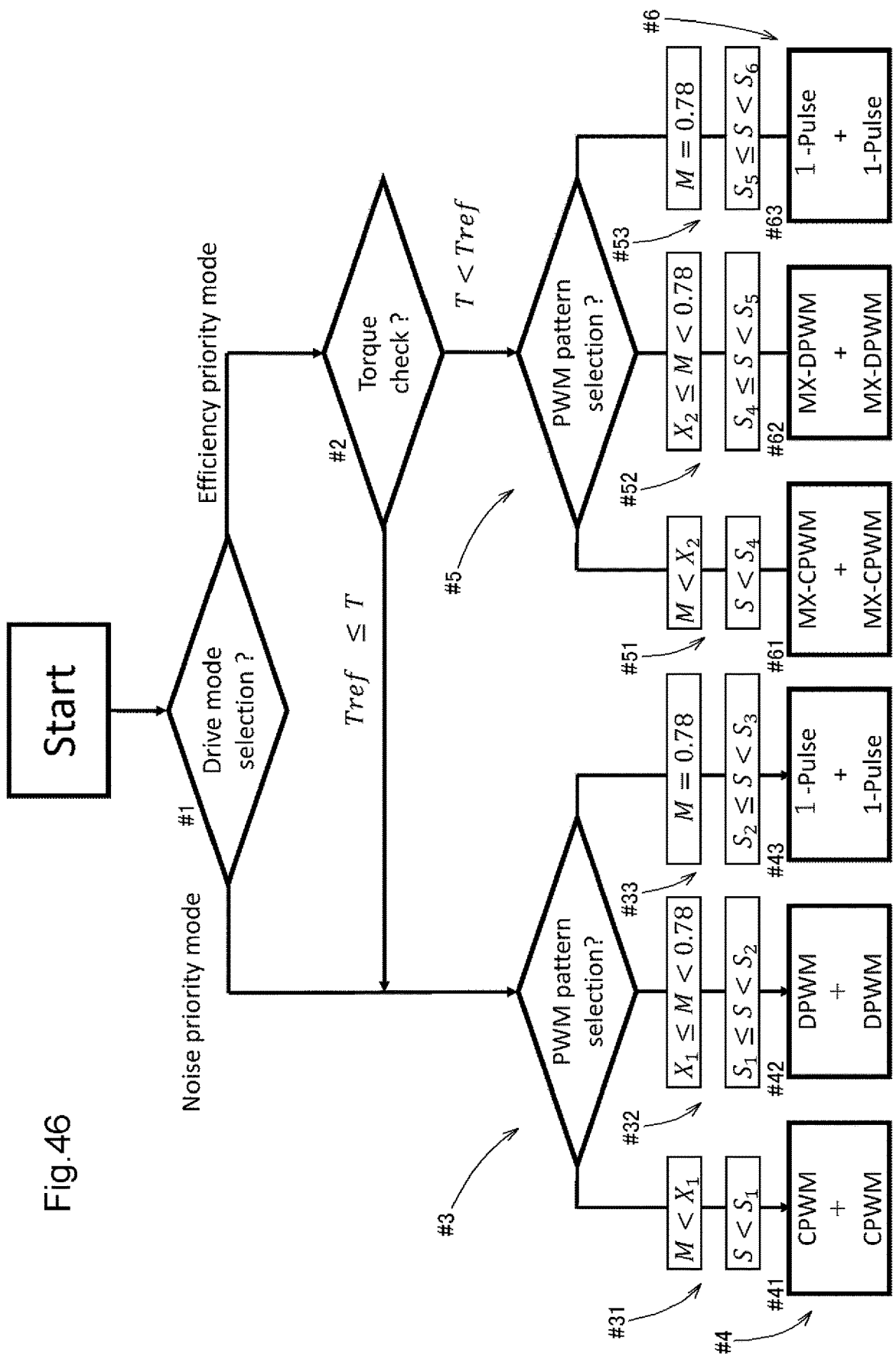
FIG. 46 is a flowchart showing an example of a procedure for selecting control schemes for a case in which ripples in direct current bus current flowing through the direct current link capacitors are taken into account.

Description will be made below with reference also to flowcharts of FIGS. 45 and 46. The flowchart of FIG. 45 is a flowchart showing exemplary selection of control schemes for a case in which ripples in direct current bus current flowing through the direct current link capacitors 4 are not taken into account. Specifically, FIG. 45 shows an example of a determination procedure for a case of selecting control schemes shown in the above-described tables 8 and 11. FIG. 46 is a flowchart showing exemplary selection of control schemes for a case in which direct current bus current flowing through the direct current link capacitors 4 is taken into account as described above with reference to FIGS. 34 to 44. Specifically, FIG. 46 shows an example of a determination procedure for a case of selecting control schemes shown in the above-described table 13. In FIGS. 45 and 46, "M", "$X_1$", and "$X_2$" represent modulation indices, "S" and "$S_1$ to $S_7$" represent the rotational speed of the rotating electrical machine 80, "T" represents the torque of the rotating electrical machine 80, and "Tref" represents predetermined torque.

As shown in FIG. 45, first, a drive mode is selected (#1). Here, if the noise reduction priority mode (noise priority mode) is selected, then control schemes are selected in accordance with conditions of table 11 (#3: PWM pattern selection), and each control scheme shown at step #4 is determined. Note that "$X_1$" at step #3 corresponds to "a" in table 11. As shown in FIG. 45 and table 11, when the modulation index "M" is less than "$X_1(a)$" and the rotational speed "S" is less than "$S_1$", continuous pulse width modulation control (CPWM) is selected as control schemes for both inverters 10 (#31→#41). When the modulation index "M" is greater than or equal to "$X_1(a)$" and less than "0.78" and the rotational speed "S" is greater than or equal to "$S_1$" and less than "$S_2$", discontinuous pulse width modulation control (DPWM) is selected as control schemes for both inverters 10 (#32→#42). When the modulation index "M" is "0.78" and the rotational speed "S" is greater than or equal to "$S_2$" and less than "$S_3$", rectangular-wave control (1-Pulse) is selected as control schemes for both inverters 10 (#33→#43).

If the loss reduction priority mode (efficiency priority mode) is selected at step #1, then control schemes are selected in accordance with conditions of table 8 (#5: PWM pattern selection), and each control scheme shown at step #6 is determined. Note that "$X_2$" at step #5 corresponds to "b" in table 8. As shown in FIG. 45 and table 8, when the modulation index "M" is less than "$X_2(b)$" and the rotational speed "S" is less than "$S_4$", mixed continuous pulse width modulation control (MX-CPWM) is selected as control schemes for both inverters 10 (#51→#61). When the modulation index "M" is greater than or equal to "$X_2(b)$" and less than "0.78" and the rotational speed "S" is greater than or equal to "$S_4$" and less than "$S_5$", mixed discontinuous pulse width modulation control (MX-DPWM) is selected as control schemes for both inverters 10 (#52→#62). When the modulation index "M" is "0.78" and the rotational speed "S" is greater than or equal to "$S_5$" and less than "$S_6$", rectangular-wave control (1-Pulse) is selected as control schemes for both inverters 10 (#53→#63).

In a case in which direct current bus current flowing through the direct current link capacitors 4 is taken into account, too, likewise, as shown in FIG. 46, first, a drive mode is selected (#1). Here, if the loss reduction priority mode (efficiency priority mode) is selected, then it is determined whether the torque of the rotating electrical machine 80 exceeds the predetermined torque Tref (#2: torque check). If the torque of the rotating electrical machine 80 is less than the predetermined torque Tref, then control schemes are selected in accordance with conditions on the upper side of table 13 (#5) and determined (#6). Steps #5 and #6 are the same as those of FIG. 45 and thus a detailed description thereof is omitted. Note that "$X_2$" at step #3 corresponds to "b" in table 13.

If the noise reduction priority mode (noise priority mode) is selected at step #1 or if the loss reduction priority mode (efficiency priority mode) is selected at step #1 and it is determined in the "torque check" at step #2 that the torque of the rotating electrical machine 80 is greater than or equal to the predetermined torque Tref, then control schemes are selected in accordance with conditions on the lower side of table 13 (#3) and determined (#4). Steps #3 and #4 are the same as those of FIG. 45 and thus a detailed description thereof is omitted. Note that "$X_1$" at step #3 corresponds to "X" in table 13.

Figure 47:
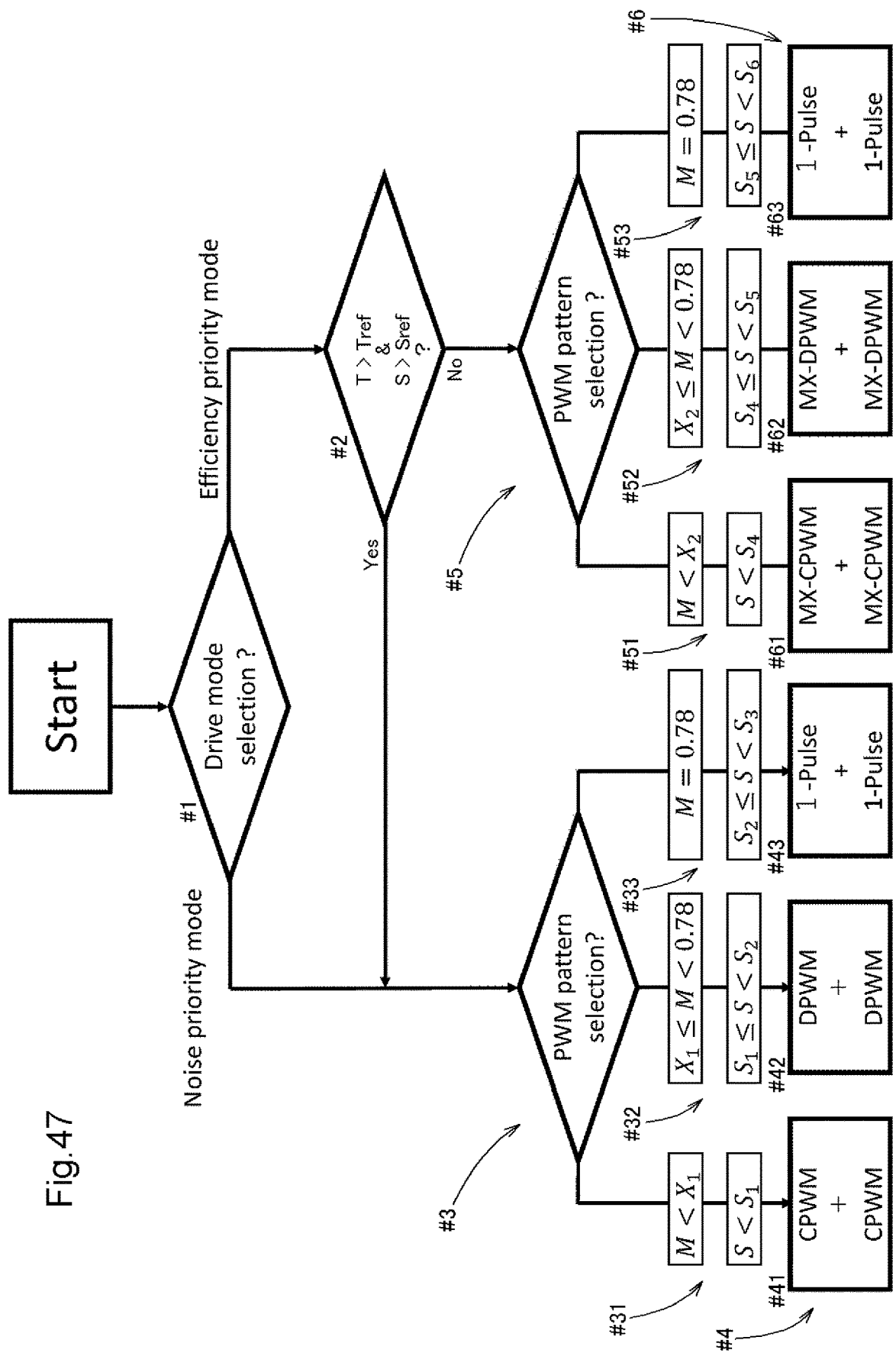
FIG. 47 is a flowchart showing another example of a procedure for selecting control schemes for a case in which ripples in direct current bus current flowing through the direct current link capacitors are taken into account.

A mode described above with reference to FIG. 46 exemplifies a mode in which "torque check" is performed at step #2. However, as shown in FIG. 47, at step #2, it may be determined as to whether torque and rotational speed both satisfy reference values. Specifically, first, a drive mode is selected (#1), and if the loss reduction priority mode (efficiency priority mode) is selected here, then it is determined whether the torque "T" of the rotating electrical machine 80 exceeds the predetermined torque Tref and exceeds a predetermined rotational speed Sref (#2). If the torque "T" of the rotating electrical machine 80 is less than or equal to the predetermined torque Tref, or if the rotational speed "S" of the rotating electrical machine 80 is less than or equal to the predetermined rotational speed Sref, or if the torque "T" of the rotating electrical machine 80 is less than or equal to the predetermined torque Tref and the rotational speed "S" of the rotating electrical machine 80 is less than or equal to the predetermined rotational speed Sref, then control schemes are selected in the same manner as the conditions on the upper side of table 13 (#5) and determined (#6). Steps #5 and #6 are the same as those of FIGS. 45 and 46 and thus a detailed description thereof is omitted.

If the noise reduction priority mode (noise priority mode) is selected at step #1 or if the loss reduction priority mode (efficiency priority mode) is selected at step #1 and it is determined at subsequent step #2 that the torque "T" of the rotating electrical machine 80 exceeds the predetermined torque Tref and the rotational speed "S" of the rotating electrical machine 80 exceeds the predetermined rotational speed Sref, then control schemes are selected in the same manner as the conditions on the lower side of table 13 (#3) and determined (#4). Steps #3 and #4 are the same as those of FIGS. 45 and 46 and thus a detailed description thereof is omitted.

Namely, FIG. 46 exemplifies a mode in which in a relatively high torque region, the rotating electrical machine 80 is driven in the loss reduction priority mode (efficiency priority mode) in which efficiency is prioritized, and in a relatively low torque region, the rotating electrical machine 80 is driven in the noise reduction priority mode (noise priority mode). FIG. 47 exemplifies a mode in which in a relatively high torque and high rotational speed region, the rotating electrical machine 80 is driven in the loss reduction priority mode (efficiency priority mode) in which efficiency is prioritized, and in a relatively low torque and low rotational speed region, the rotating electrical machine 80 is driven in the noise reduction priority mode (noise priority mode).

Second Embodiment

A second embodiment of the rotating electrical machine control device 1 having a control mode in which the first inverter 11 and the second inverter 12 are controlled using different control schemes, based on the operating conditions of the rotating electrical machine 80 will be described in detail below. The same matters as those in the above-described first embodiment will be described with reference to the drawings that are referred to in description of the first embodiment. In addition, in description of the second embodiment that refers to different drawings than those of the first embodiment, too, common matters to those of the first embodiment will be described using the same reference signs.

Figure 48:
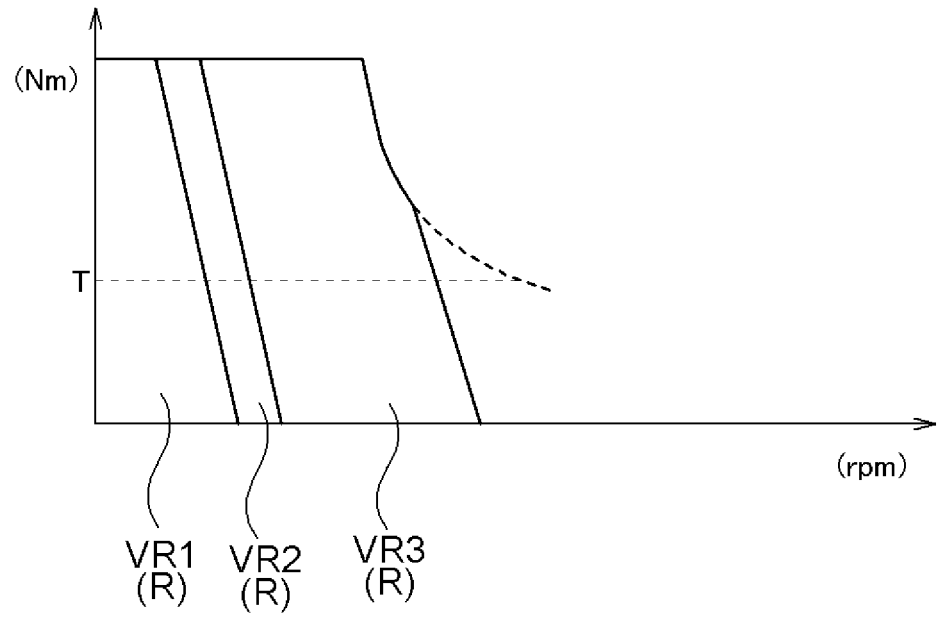
FIG. 48 is a diagram showing an example of control regions of a rotating electrical machine of a second embodiment.

In the present embodiment (second embodiment), a plurality of control regions R based on the operating conditions of the rotating electrical machine 80 (see FIG. 48, etc.) are set, and the rotating electrical machine control device 1 controls the inverters 10 using control schemes determined based on each control region R. FIG. 48 shows an example of a relationship between the rotational speed and torque of the rotating electrical machine 80. For example, as shown in FIG. 48, as the control regions R of the rotating electrical machine 80, there are set a first speed region VR1, a second speed region VR2 in which the rotational speed of the rotating electrical machine 80 is higher than in the first speed region VR1 for the same torque T, and a third speed region VR3 in which the rotational speed of the rotating electrical machine 80 is higher than in the second speed region VR2 for the same torque T.

For example, as shown in the following table 14, in the first speed region VR1, the rotating electrical machine control device 1 controls one of the inverters 10, the first inverter 11 or the second inverter 12, by active short-circuit control (ASC), and controls the other inverter 10 by continuous pulse width modulation control (CPWM). In addition, in the second speed region VR2, the rotating electrical machine control device 1 controls one of the inverters 10, the first inverter 11 or the second inverter 12, by active short-circuit control, and controls the other inverter 10 by discontinuous pulse width modulation control (DPWM). In addition, in the third speed region VR3, the rotating electrical machine control device 1 controls both inverters 10, the first inverter 11 and the second inverter 12, by discontinuous pulse width modulation control. Such control in the first speed region VR1, the second speed region VR2, and the third speed region VR3 is hereinafter referred to as target control.

TABLE 14

| R | INV1 | INV2 |
| --- | --- | --- |
| VR1 | ASC | CPWM |
| VR2 | ASC | DPWM |
| VR3 | DPWM | DPWM |

Note that although table 1 exemplifies a mode in which in the first speed region VR1 and the second speed region VR2, the first inverter 11 is controlled by active short-circuit control, as a matter of course, a mode in which the second inverter 12 is controlled by active short-circuit control may be adopted. In addition, an inverter 10 to be controlled by active short-circuit control may be different between the first speed region VR1 and the second speed region VR2 (also including a reverse combination), e.g., in the first speed region VR1, the first inverter 11 is controlled by active short-circuit control and in the second speed region VR2, the second inverter 12 is controlled by active short-circuit control.

Furthermore, in the first speed region VR1 and the second speed region VR2, a control scheme for controlling the first inverter 11 and a control scheme for controlling the second inverter 12 may be alternately switched in accordance with a condition determined in advance. By switching between the control schemes, consumption of only one of the first inverter 11 and the second inverter 12 or an increase in the amount of discharge of only one of the first direct current power supply 61 and the second direct current power supply 62 can be suppressed. Here, it is preferred that the determined condition be, for example, a set period of time or the amounts of discharge of the direct current power supplies 6.

In the first speed region VR1 and the second speed region VR2, one inverter 10 (e.g., the first inverter 11) out of the two inverters 10 is controlled by active short-circuit control. That is, the rotating electrical machine 80 is driven substantially by only one inverter 10 (e.g., the second inverter 12) out of the two inverters 10. Since one inverter 10 does not perform switching operation, switching loss can be reduced correspondingly, and as a result, the rotating electrical machine 80 can be driven while loss in the entire system is suppressed.

When two inverters 10 are provided like the present configuration, alternating current voltage with an amplitude larger than that of voltage on the direct current side of each inverter 10 can be generated. Note, however, that the rotating electrical machine control device 1 does not need to control the two inverters 10 such that the amplitude of alternating current is always large, and for example, when the rotational speed of the rotating electrical machine 80 is low, it may be sufficient to generate alternating current voltage that can be generated by one inverter 10. When one of the two inverters 10 is controlled by active short-circuit control, the stator coils 8 of three phases are short-circuited in the one inverter 10. In this case, the other inverter 10 controls drive of the rotating electrical machine 80 having the stator coils 8 that are connected to each other to have a neutral point.

In addition, as described above, a modulation index for continuous pulse width modulation is higher in space vector pulse width modulation than in sinusoidal pulse width modulation, and is even higher in discontinuous pulse width modulation than in space vector pulse width modulation. The second speed region VR2 is a control region in which the rotational speed of the rotating electrical machine 80 is higher than in the first speed region VR1, and the second speed region VR2 requires a higher modulation index than the first speed region VR1. By performing continuous pulse width modulation control in the first speed region VR1 and performing discontinuous pulse width modulation control in the second speed region VR2, the rotating electrical machine 80 can be driven by one inverter 10 in a control region in which the first speed region VR1 and the second speed region VR2 are combined together. Namely, in a wide control region in which the first speed region VR1 and the second speed region VR2 are combined together, one inverter 10 out of the two inverters 10 does not perform switching operation, and thus, the rotating electrical machine 80 can be driven while loss in the entire system is suppressed.

As such, it is preferred that boundaries between the control regions R (boundaries between the first speed region VR1, the second speed region VR2, and the third speed region VR3) be set according to at least one of the rotational speed of the rotating electrical machine 80 based on the torque of the rotating electrical machine 80 and a ratio of the root-mean-square value of line-to-line voltage of alternating current voltages of a plurality of phases to direct current voltage (which may be an instruction value or may be an equivalent from output voltage).

As exemplified in FIG. 48, the operating conditions of the rotating electrical machine 80 are often defined by a relationship between rotational speed and torque. The control regions R may be set based on rotational speed which is one parameter. Here, the rotational speed that defines a boundary between control regions R can be set to be constant regardless of torque, but it is further preferred that the rotational speed that defines a boundary between control regions R be set to different values depending on the torque. By doing so, drive of the rotating electrical machine 80 can be controlled with high efficiency, based on the operating conditions of the rotating electrical machine 80.

In addition, for example, when the rotating electrical machine 80 requires high output (high rotational speed or high torque), a voltage-type inverter implements the requirement by increasing direct current voltage or increasing a ratio at which direct current voltage is converted into alternating current voltage. When the direct current voltage is constant, the requirement can be implemented by increasing a ratio at which the direct current voltage is converted into alternating current voltage. This ratio can be represented as a ratio of the root-mean-square value of three-phase alternating current electric power to direct current electric power (in a case of a voltage-type inverter, it is equivalent to a ratio of the root-mean-square value of three-phase alternating current voltage to direct current voltage). As described above, control schemes for controlling the inverters 10 include various schemes from a scheme in which the ratio is low to a scheme in which the ratio is high.

When, as shown in the following table 15, the control regions R are set based on the ratio of the root-mean-square value of three-phase alternating current electric power to direct current electric power (modulation index) which is determined according to a requirement for the rotating electrical machine 80, drive of the rotating electrical machine 80 can be controlled with high efficiency, based on the operating conditions of the rotating electrical machine 80. Note that in the table, "Mi_inv1" represents the modulation index of the first inverter 11, "Mi_inv2" represents the modulation index of the second inverter 12, and "Mi_sys" represents the modulation index of the entire system.

TABLE 15

| R | Mi_sys | INV1 | Mi_inv1 | INV2 | Mi_inv2 |
|---|---|---|---|---|---|
| VR1 | M < a | ASC | M = 0 | CPWM | M < 2a |
| VR2 | a ≤ M < X | ASC | M = 0 | DPWM | 2a ≤ M < 2X |
| VR3 | X ≤ M < 0.78 | DPWM | X ≤ M < 0.78 | DPWM | X ≤ M < 0.78 |

Figure 49:
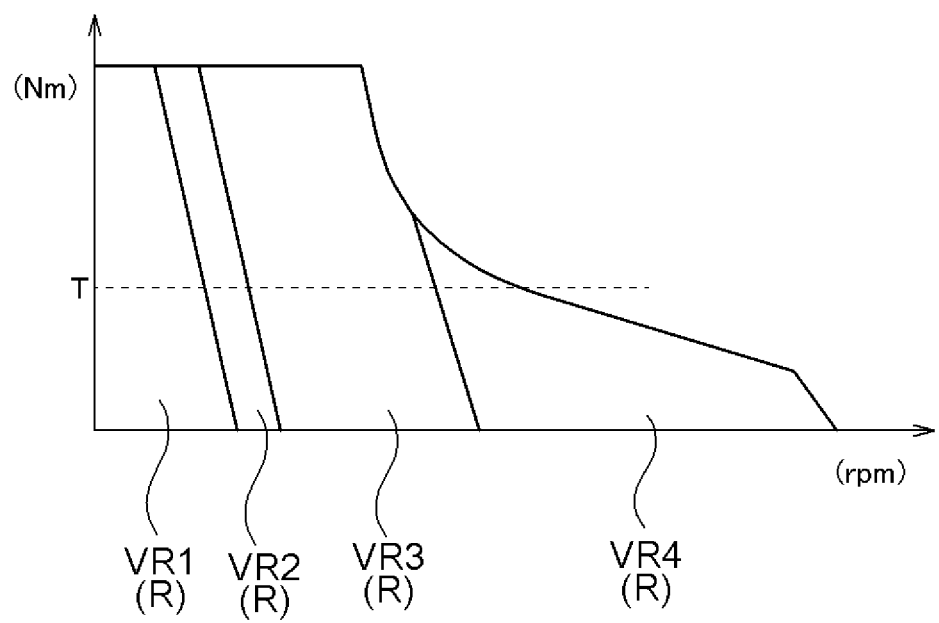
FIG. 49 is a diagram showing another example of control regions of the rotating electrical machine of the second embodiment.

In addition, as shown in FIG. 49 and the following table 16, there may be further set a fourth speed region VR4 in which the rotational speed of the rotating electrical machine 80 is higher than in the third speed region VR3 for the same torque. In this case, in the fourth speed region VR4, the rotating electrical machine control device 1 controls both inverters 10, the first inverter 11 and the second inverter 12, by rectangular-wave control (see FIG. 14). As described above, the modulation index for rectangular-wave control is 0.78.

TABLE 16

| R | Mi_sys | INV1 | Mi_inv1 | INV2 | Mi_inv2 |
|---|---|---|---|---|---|
| VR1 | M < a | ASC | M = 0 | CPWM | M < 2a |
| VR2 | a ≤ M < X | ASC | M = 0 | DPWM | 2a ≤ M < 2X |
| VR3 | X ≤ M < 0.78 | DPWM | X ≤ M < 0.78 | DPWM | X ≤ M < 0.78 |
| VR4 | M = 0.78 | 1-Pulse | M = 0.78 | 1-Pulse | M = 0.78 |

The above-described tables 15 and 16 exemplify modulation indices for each control region R. In the present embodiment, the terminal-to-terminal voltage "E1" of the first direct current power supply 61 and the terminal-to-terminal voltage "E2" of the second direct current power supply 62 are identical (both are voltage "E"). When the root-mean-square value on the alternating current side of the first inverter 11 is "Va_inv1" and the root-mean-square value on the alternating current side of the second inverter 12 is "Va_inv2", the modulation index "Mi_inv1" of the first inverter 11 and the modulation index "Mi_inv2" of the second inverter 12 are as shown in equations (1) and (2)

which are shown in description of the first embodiment (shown again below). In addition, the modulation index "Mi_sys" of the entire system is as shown in equation (3) (shown again below).

$$\text{Mi\_inv1} = \text{Va\_inv1}/E1 = \text{Va\_inv1}/E \quad (1)$$

$$\text{Mi\_inv2} = \text{Va\_inv2}/E2 = \text{Va\_inv2}/E \quad (2)$$

$$\text{Mi\_sys} = (\text{Va\_inv1} + \text{Va\_inv2})/(E1 + E2) \quad (3)$$

$$= (\text{Va\_inv1} + \text{Va\_inv2})/2E$$

For the instantaneous value of voltage, an instantaneous vector needs to be considered, but when only the modulation index is simply considered, the modulation index "Mi_sys" of the entire system is "(Mi_inv1+Mi_inv2)/2" from equations (1) to (3). Note that tables 15 and 16 show, as rated values, modulation indices for each control region R. Hence, upon actual control, taking into account hunting occurring when a control scheme changes between control regions R, etc., modulation indices for each control region R may include an overlapping range.

Note that the modulation index "X" is set based on a theoretical upper limit value (approximately 0.707) of a modulation index for continuous pulse width modulation (space vector pulse width modulation), and further taking into account dead time. As shown in tables 15 and 16, etc., in the first speed region VR1 and the second speed region VR2, modulation may be performed by only one inverter 10. Thus, in the first speed region VR1 and the second speed region VR2, the maximum modulation index "2X" of one inverter 10 (here, the second inverter 12) is set to, for example, about 0.5 to 0.6, based on a theoretical upper limit value of a modulation index for continuous pulse width modulation control (approximately 0.707 for space vector pulse width modulation), and further taking into account dead time. Thus, the modulation "X" is set to, for example, a value of about 0.25 to 0.3. The modulation index "a" is set as appropriate, based on experiments, simulations, etc.

Exemplary waveforms of U-phase voltage instructions (Vu1 and Vu2) and U-phase upper-stage-side switching control signals (Su1+ and Su2+) for control schemes for each control region R in a mode exemplified in tables 15 and 16 are as described with reference to FIGS. 12 to 16 in the first embodiment, and thus, a detailed description thereof is omitted.

As described above, in the first speed region VR1 and the second speed region VR2 which are relatively low electric power regions with a relatively small modulation index and a relatively low rotational speed, all electric power is supplied from one inverter 10. At this time, a voltage instruction (V) is provided to one inverter 10 so as to perform active short-circuit control, and a normal voltage instruction (V) is provided to the other inverter 10. In the third speed region VR3 and the fourth speed region VR4 which are relatively high electric power regions with a relatively large modulation index and a relatively high rotational speed, equal electric power is supplied from the two inverters 10. At this time, identical voltage instructions (V**) whose phases differ from each other by 180 degrees (π) are provided to both inverters 10.

Meanwhile, when switching control of the inverters 10 is performed, ripple components superimposed on an alternating current fundamental may generate noise in an audio frequency band. When the two inverters 10 are controlled using different control schemes, ripples based on each control scheme occur, which may increase noise in the audio frequency band. Particularly, when the rotational speed of the rotating electrical machine 80 is low, the possibility of inclusion of the frequency of ripple components (or sideband frequencies thereof) in the audio frequency band increases. It is desirable to appropriately set control schemes for the rotating electrical machine 80, i.e., control schemes for the inverters 10, based on operating conditions so that both of operation with high system efficiency and a reduction in audible noise can be achieved.

The rotating electrical machine control device 1 of the present embodiment has, as control modes of the rotating electrical machine 80, a loss reduction priority mode and a noise reduction priority mode in a switchable manner. In the loss reduction priority mode, as described above, the rotating electrical machine control device 1 performs target control, and in the noise reduction priority mode, the rotating electrical machine control device 1 performs alternative control instead of the target control. Specifically, in the noise reduction priority mode, the rotating electrical machine control device 1 performs, instead of the target control, alternative control in which as shown in the following table 17, in the first speed region VR1, both inverters 10, the first inverter 11 and the second inverter 12, are controlled by continuous pulse width modulation control, in the second speed region VR2, both inverters 10, the first inverter 11 and the second inverter 12, are controlled by discontinuous pulse width modulation control, and in the third speed region VR3, both inverters 10, the first inverter 11 and the second inverter 12, are controlled by discontinuous pulse width modulation control.

TABLE 17

| R | Mi_sys | INV1 | Mi_inv1 | INV2 | Mi_inv2 |
|---|---|---|---|---|---|
| VR1 | M < a | CPWM | M < a | CPWM | M < a |
| VR2 | a ≤ M < X | DPWM | a ≤ M < X | DPWM | a ≤ M < X |
| VR3 | X ≤ M < 0.78 | DPWM | X ≤ M < 0.78 | DPWM | X ≤ M < 0.78 |

The same also applies to a case in which the fourth speed region VR4 is set, and as shown in the following table 18, in the loss reduction priority mode, the rotating electrical machine control device 1 performs target control, and in the noise reduction priority mode, the rotating electrical machine control device 1 performs alternative control instead of the target control. Specifically, in the noise reduction priority mode, in the fourth speed region VR4, the rotating electrical machine control device 1 performs, instead of the target control, alternative control in which both inverters 10, the first inverter 11 and the second inverter 12, are controlled by rectangular-wave control.

TABLE 18

| R | Mi_sys | INV1 | Mi_inv1 | INV2 | Mi_inv2 |
|---|---|---|---|---|---|
| VR1 | M < a | CPWM | M < a | CPWM | M < a |
| VR2 | a ≤ M < X | DPWM | a ≤ M < X | DPWM | a ≤ M < X |
| VR3 | X ≤ M < 0.78 | DPWM | X ≤ M < 0.78 | DPWM | X ≤ M < 0.78 |
| VR4 | M = 0.78 | 1-Pulse | M = 0.78 | 1-Pulse | M = 0.78 |

When switching control of the inverters 10 is performed, ripple components superimposed on an alternating current fundamental may generate noise in an audio frequency band. Particularly, when the rotational speed of the rotating electrical machine 80 is low, the possibility of inclusion of the frequency of ripple components (or sideband frequencies thereof) in the audio frequency band increases. For example, when the two inverters 10 are controlled using different control schemes, ripples based on each control scheme occur, which may increase noise in the audio frequency band. In the loss reduction priority mode, only one inverter 10 is driven in the first speed region VR1 and the second speed region VR2 in which the rotational speed of the rotating electrical machine 80 is relatively low, and thus, there is no chance of the two inverters 10 outputting noise in different frequency bands. However, since output from the one inverter 10 to be driven is large, noise energy is high. In addition, in the first speed region VR1 and the second speed region VR2, sound accompanying traveling of the vehicle (traveling sound such as sound of tires contacting a road surface) is also small, and thus, when noise outputted from the one inverter 10 to be driven is noise in the audio frequency band, there is a possibility that the noise is likely to be audible to the user.

For example, it is preferred that upon the start of the vehicle or upon deceleration to make a stop, taking into account the fact that noise in the audio frequency band is likely to be audible to the user, the noise reduction priority mode be selected, and upon steady-state driving where the vehicle travels in a steady state, the loss reduction priority mode be selected. Note that these modes may be selected by a user's operation (a setting switch (also including input from a touch panel, etc.)).

In the noise reduction priority mode, in the first speed region VR1 and the second speed region VR2 in which the rotational speed of the rotating electrical machine 80 is relatively low, the first inverter 11 and the second inverter 12 are controlled using the same control scheme. In addition, in the two inverters 10 that allow currents to flow through the stator coils 8, the phases of the currents differ from each other by substantially 180 degrees. When the two inverters 10 are controlled using the same control scheme, the phases of currents including ripple components differ from each other by substantially 180 degrees. Thus, at least some of the ripple components can cancel each other out, enabling a reduction in noise in the audio frequency band.

As shown in table 17, in the noise reduction priority mode, in the first speed region VR1, the first inverter 11 and the second inverter 12 are both controlled by continuous pulse width modulation control (see FIG. 16). In addition, in the second speed region VR2, as with the third speed region VR3, the first inverter 11 and the second inverter 12 are both controlled by discontinuous pulse width modulation control (see FIG. 15).

Figure 50:
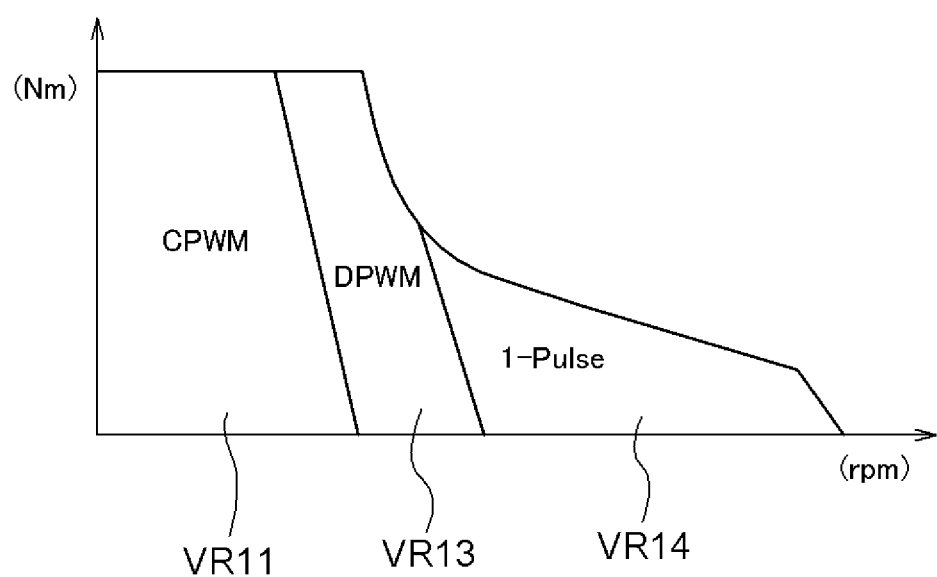
FIG. 50 is a diagram showing an example of control regions of a rotating electrical machine in a 1-inverter system for comparison with the second embodiment.

FIG. 50 shows, as a comparative example, an example of control regions of a rotating electrical machine in a 1-inverter system in which stator coils 8 of three phases are connected to each other at a neutral point. As shown in the following table 19, the inverter is, for example, controlled by continuous pulse width modulation control in a comparative first region VR11, controlled by discontinuous pulse width modulation control in a comparative second region VR13, and controlled by rectangular-wave control in a comparative third region VR14. Note that as is clear from description of the first embodiment that refers to FIG. 20, the comparative first region VR11 of the second embodiment roughly corresponds to the first region VR11 of the first embodiment, the comparative second region VR13 of the second embodiment to the second region VR12 of the first embodiment, and the comparative third region VR14 of the second embodiment to the third region VR13 of the first embodiment.

TABLE 19

| R | Mi_sys | INV1 | Mi_inv |
|---|---|---|---|
| VR11 | M < Y, where Y > X | CPWM | M < Y, where Y > X |
| VR13 | Y ≤ M < 0.78 | DPWM | Y ≤ M < 0.78 |
| VR14 | M = 0.78 | 1-Pulse | M = 0.78 |

Here, the modulation index "Y" has a value larger than the modulation index "X" exemplified in tables 15 to 18, and is set to, for example, about 0.5 to 0.6, based on a theoretical upper limit value (approximately, 0.707) of a modulation index for continuous pulse width modulation (space vector pulse width modulation), and further taking into account dead time. As described above, in the present embodiment, by setting the first speed region VR1 and the second speed region VR2 in a region corresponding to the comparative first region VR11, loss in the entire system can be reduced in the loss reduction priority mode, and a loss reduction and a noise reduction can be achieved in the noise reduction priority mode.

Note that as is clear from a comparison of FIGS. 49 and 50, a comparison of tables 19 and 15, a comparison of tables 19 and 16, etc., not only the first speed region VR1 and the second speed region VR2, but also a part of the third speed region VR3 can be set in the region corresponding to the comparative first region VR11. That is, a part of the third speed region VR3 can be set on a high speed side of the comparative first region VR11. By this, a region in which discontinuous pulse width modulation control is performed is extended over a control region on a low speed side, by which system loss can be reduced due to a reduction in current ripples and a reduction in switching loss. That is, by extending a control region with high system efficiency toward a low speed side, the efficiency of the entire system can be improved.

Description will be made below with reference to FIGS. 21 to 26, 28, 29, 31, and 32 (exemplary comparisons of the 1-inverter system and the 2-inverter system and exemplary comparisons of control schemes of the 2-inverter system) which are referred to in description of the first embodiment. FIGS. 21 to 26 show exemplary comparisons for relatively low speed regions (e.g., the comparative first region VR11 and the first speed region VR1). FIGS. 28, 29, 31, and 32 show exemplary comparisons for higher speed regions (e.g., the comparative second region VR13 and the third speed region VR3) than the relatively low speed regions. Note that although these drawings also show exemplary waveforms for mixed continuous pulse width modulation control (MX-CPWM) which is adopted in the first embodiment, in the second embodiment, mixed continuous pulse width modulation control (MX-CPWM) is not performed and thus description will be made ignoring the waveforms.

As shown in FIGS. 24 and 26, harmonic content of the U-phase current Iu and the UV line-to-line voltage Vuv at the sideband frequencies "2f±fm" of the frequency "2f" which is twice the frequency of the carrier CA is small in the "ASC/CPWM" schemes of the 2-inverter system compared with the "CPWM/CPWM" schemes of the 1-inverter system and the 2-inverter system. Hence, iron loss is suppressed, and in the "ASC/CPWM" schemes, switching loss decreases due to one inverter 10 not performing switching, and thus, the entire system loss appropriately decreases. Thus, as described above, it is preferred that when a reduction in system loss is prioritized (in a case of the loss reduction priority mode), the "ASC/CPWM" schemes be selected for the first speed region VR1.

On the other hand, as shown in FIGS. 23 and 25, harmonic content of the U-phase current Iu and the UV line-to-line voltage Vuv at the sideband frequencies "f±3fm" of the frequency "f" of the carrier CA is smallest in the "CPWM/CPWM" schemes of the 2-inverter system. Human audible frequencies are said to be on the order of approximately 20 [Hz] to 15 [kHz], and frequencies exceeding 10 [kHz] are generally less likely to be audible, and frequencies near 5 [kHz] are likely to be perceived as noise. That is, harmonic content at the sideband frequencies "f±3fm" of the frequency "f" of the carrier CA and around 5 [kHz] is likely to be audible noise compared with harmonic content around 10 [kHz] which is the sideband frequencies "2f±fm" of "2f". Thus, it is preferred that when, as in this example, the frequency "f" of the carrier CA is 5 [kHz] and priority is given to suppression of harmonic content at the sideband frequencies "f±3fm" becoming audible noise (in a case of the noise reduction priority mode), the "CPWM/CPWM" schemes be selected for the first speed region VR1.

In addition, as shown in FIGS. 24 and 26, harmonic content of the U-phase current Iu and the UV line-to-line voltage Vuv at the sideband frequencies "2f±fm" of the frequency "2f" which is twice the frequency of the carrier CA is substantially equal between "CPWM" of the 1-inverter system and the "CPWM/CPWM" schemes of the 2-inverter system. Thus, it is preferred that in a region in which the rotational speed is relatively low and audible noise is likely to be noticeable, the noise reduction priority mode be selected and control be performed using the "CPWM/CPWM" schemes.

FIG. 28 shows exemplary waveforms and exemplary FFT analysis results for a case in which as described above with reference to table 19 and FIG. 50, in the comparative second region VR13, the 1-inverter system performs discontinuous pulse width modulation control. Description of each waveform is as described in the first embodiment that refers to FIG. 28.

FIG. 29 shows exemplary waveforms and exemplary FFT analysis results for a case in which as described above with reference to tables 14 to 18, FIGS. 48 and 49, etc., the 2-inverter system performs discontinuous pulse width modulation control on both inverters 10 (a case of performing control using the "DPWM/DPWM" schemes). Description of each waveform is as described in the first embodiment that refers to FIG. 29.

FIG. 31 shows a relationship between the rotational speed of the rotating electrical machine 80 and audible noise in the 1-inverter system which is described above with reference to table 19, and FIG. 32 shows a relationship between the rotational speed of the rotating electrical machine 80 and audible noise in the 2-inverter system of the present embodiment (second embodiment) which is described above with reference to tables 17 and 18. Note that in the 1-inverter system of FIG. 31, as described above with reference to FIG. 50 and table 19, the control region changes from the comparative first region VR11 to the comparative second region VR13 according to the modulation index and the rotational speed of the rotating electrical machine 80, and the control scheme is switched from continuous pulse width modulation control (CPWM) to discontinuous pulse width modulation control (DPWM). In addition, in the 2-inverter system of FIG. 32, as described above with reference to FIGS. 48 and 49 and tables 17 and 18, the control region changes from the first speed region VR1 to the second speed region VR2 according to the modulation index and the rotational speed of the rotating electrical machine 80, and the control scheme is switched from the "CPWM/CPWM" schemes to the "DPWM/DPWM" schemes.

As is clear from a comparison of FIGS. 28 and 29, many ripples are superimposed on the three-phase currents in a case in which the 1-inverter system performs control using "DPWM", compared with a case in which the 2-inverter system performs control using the "DPWM/DPWM" schemes. Hence, as the FFT analysis results show, more harmonic content at the sideband frequencies "f±3fm" of the frequency "f" of the carrier CA occurs in the 1-inverter system compared with the 2-inverter system. The harmonic content at the sideband frequencies "f±3fm" may overlap low-order harmonic content (11th and 13th).

In addition, as is clear from a comparison of FIGS. 31 and 32, in the 1-inverter system, as shown in FIG. 31, noise of the rotating electrical machine 80 occurring according to the speed of the rotating electrical machine 80 (audible noise at "12fm", with the frequency of rotational speed being "fm") and audible noise at the sideband frequencies "f±3fm" overlap each other at a portion circled in broken line, by which audible noise becomes very large. On the other hand, in the 2-inverter system, as shown in FIG. 32, there is almost no audible noise at the sideband frequencies "f±3fm" of the frequency "f" of the carrier CA, and thus, there is no chance that the audible noise (12fm) of the rotating electrical machine 80 occurring according to the speed of the rotating electrical machine 80 overlaps the audible noise at the sideband frequencies "f±3fm". Hence, the 2-inverter system can construct a system with a high degree of quietness compared with the 1-inverter system.

SUMMARY OF THE EMBODIMENTS

A summary of the rotating electrical machine control devices (1) described above will be briefly described below.

In one aspect, in a rotating electrical machine control device (1) that controls, through a first inverter (11) and a second inverter (12), drive of a rotating electrical machine (80) having open-end windings (8) of a plurality of phases which are independent of each other, the first inverter (11) is connected to a one-end side of the open-end windings (8) of a plurality of phases to convert electric power between direct current and alternating currents of a plurality of phases, the second inverter (12) is connected to an other-end side of the open-end windings (8) of a plurality of phases to convert electric power between direct current and alternating currents of a plurality of phases, the first inverter (11) and the second inverter (12) can be controlled using a plurality of control schemes with different switching patterns and can be controlled using the control schemes that are independent of each other, as control regions (R) of the rotating electrical machine (80), a first speed region (VR1) and a second speed region (VR2) in which the rotational speed of the rotating electrical machine (80) is higher than in the first speed region (VR1) for the same torque (T) are set, the control schemes include pulse width modulation control in which a plurality of pulses with different patterns are outputted in one cycle of electrical angle; and mixed pulse width modulation control in which control is performed such that a plurality of pulses with different patterns are outputted during a first period (T1) which is a half cycle of electrical angle, and an inactive state continues during a second period (T2) which is the other half cycle, and both inverters (10), the first inverter (11) and the second inverter (12), are controlled by the mixed pulse width modulation control in the second speed region (VR2).

Mixed pulse width modulation control is a control scheme having, during one cycle of electrical angle, a combination of a period during which pulse width modulation is performed and a period with no modulation (fixed state), each period being about a half cycle. That is, since the inverters (10) do not perform switching operation for about a half period of their driving time, switching loss decreases and system loss decreases. The second speed region (VR2) in which mixed pulse width modulation control is performed is set on a higher speed side than the first speed region (VR1) for the same torque (T), and is a control region on a relatively medium and high speed side. According to the present configuration, by reducing system loss in the control region on the relatively medium and high speed side out of all operating regions of the rotating electrical machine (80), the entire system loss in all operating regions can be reduced. As such, according to the present configuration, the two inverters provided at respective both ends of the open-end windings can be appropriately controlled.

In addition, it is preferred that in the pulse width modulation control, a plurality of pulses be generated based on an instruction value and a carrier, in the mixed pulse width modulation control, a plurality of pulses be generated based on a half carrier which is the carrier whose wave height is half of a variable range of the instruction value, and the instruction value, and in the mixed pulse width modulation control, a plurality of pulses be generated using: a double half carrier and single reference scheme in which pulses for the first inverter (11) are generated based on a first half carrier (CA1) and the instruction value (Vu) common to the first inverter (11) and the second inverter (12), and pulses for the second inverter (12) are generated based on a second half carrier (CA2) and the instruction value (Vu), the first half carrier (CA1) being set, as the half carrier, on one of a higher voltage side and a lower voltage side than the center of an amplitude of the instruction value, and the second half carrier (CA2) having the same phase as the first half carrier (CA1) and being set on the other one of the higher voltage side and the lower voltage side than the center of the amplitude of the instruction value; or a double half carrier and double reference scheme in which pulses for the first inverter (11) are generated based on a first half carrier (CA1) and a first instruction value (Vu1) for the first inverter (11), and pulses for the second inverter (12) are generated based on a second half carrier (CA2) and a second instruction value (Vu2) for the second inverter (12), the first half carrier (CA1) being set, as the half carrier, on one of the higher voltage side and the lower voltage side than the center of the amplitude of the instruction value, the second half carrier (CA2) differing from the first half carrier (CA1) in phase by 180 degrees and being set on the same side as the first half carrier (CA1), and the second instruction value (Vu2) differing from the first instruction value (Vu1) in phase by 180 degrees.

For control schemes for mixed pulse width modulation control, a single half carrier and double reference scheme, etc., can also be adopted in addition to the above-described double half carrier and single reference scheme and double half carrier and double reference scheme. The single half carrier and double reference scheme is a scheme in which pulses are generated based on a common half carrier and two instruction values whose phases differ from each other by 180 degrees. According to simulations and experiments conducted by the inventors, it has been confirmed that harmonic noise, particularly, at the frequency of the carrier (CA) is suppressed in the double half carrier and single reference scheme and the double half carrier and double reference scheme, compared with the single half carrier and double reference scheme. Thus, it is preferred that mixed pulse width modulation control be performed using the double half carrier and single reference scheme or the double half carrier and double reference scheme.

In addition, it is preferred that in the first inverter (11) and the second inverter (12), each arm (3A) for one alternating current phase include a series circuit of an upper-stage-side switching element (3H) and a lower-stage-side switching element (3L), the control schemes further include active short-circuit control in which the upper-stage-side switching elements (3H) in the arms (3A) for all of a plurality of phases are brought into on state or the lower-stage-side switching elements (3L) in the arms (3A) for all of a plurality of phases are brought into on state, and in the first speed region (VR1), the rotating electrical machine control device (1) perform target first speed region control in which one of the inverters (10), the first inverter (11) or the second inverter (12), is controlled by the active short-circuit control and the other inverter (10) is controlled by the pulse width modulation control.

When two inverters (10) are provided like the present configuration, alternating current voltage with an amplitude larger than that of voltage on a direct current side of each inverter (10) can be generated. Note, however, that the rotating electrical machine control device (1) does not need to control the two inverters (10) such that the amplitude of alternating current is always large, and for example, when the rotational speed of the rotating electrical machine (80) is low, it may be sufficient to generate alternating current voltage that can be generated by one inverter (10). According to the present configuration, in the first speed region (VR1) on a low speed side than the second speed region (VR2) for the same torque, one inverter (10) out of the two inverters (10) is controlled by active short-circuit control. By this, the open-end windings (8) are short-circuited in the one inverter (10), resulting in the rotating electrical machine (80) being the same as a rotating electrical machine in which stator coils have an electrical neutral point. That is, the rotating electrical machine (80) is driven substantially by only one inverter (10) out of the two inverters (10). Since the inverter (10) controlled by active short-circuit control does not perform switching operation, the rotating electrical machine (80) can be driven while loss in the entire system is suppressed.

In addition, it is preferred that in the first speed region (VR1), the rotating electrical machine control device (1) alternately switch between the control scheme for controlling the first inverter (11) and the control scheme for controlling the second inverter (12), in accordance with a condition determined in advance.

By switching between the control schemes, consumption of only one of the first inverter (11) and the second inverter (12) is suppressed. In addition, when the first inverter (11) and the second inverter (12) are connected to direct current power supplies (6) which are independent of each other, an increase in the amount of power consumed by only one of a direct current power supply (61) connected to the first inverter (11) and a direct current power supply (62) connected to the second inverter (12) can be suppressed. Here, it is preferred that the determined condition be, for example, a set period of time or the amounts of power consumed by the direct current power supplies (6).

In addition, it is preferred that the pulse width modulation control include, as the control schemes, continuous pulse width modulation control in which pulse width modulation is continuously performed for all of the arms (3A) for a plurality of phases; and discontinuous pulse width modulation control in which pulse width modulation is performed including a period during which switching elements (3) in one of the arms (3A) for one of a plurality of phases are fixed to on state or off state, in a low-speed side first speed region (VR1-1) on a low speed side in the first speed region (VR1), the rotating electrical machine control device (1) control one of the inverters (10), the first inverter (11) or the second inverter (12), by the active short-circuit control, and control the other inverter (10) by the continuous pulse width modulation control, and in a high-speed side first speed region (VR2-2) on a high speed side in the first speed region (VR1), the rotating electrical machine control device (1) control one of the inverters (10), the first inverter (11) or the second inverter (12), by the active short-circuit control, and control the other inverter (10) by the discontinuous pulse width modulation control.

The maximum modulation index for discontinuous pulse width modulation control performed in the high-speed side first speed region (VR1-2) is larger than the maximum modulation index for continuous pulse width modulation control performed in the low-speed side first speed region (VR1-1). The high-speed side first speed region (VR1-2) is a control region (R) in which the rotational speed of the rotating electrical machine (80) is higher than in the low-speed side first speed region (VR1-1) for the same torque (T), and in terms of system efficiency, it is preferable that modulation be performed at a higher modulation index in the high-speed side first speed region (VR1-2) than in the low-speed side first speed region (VR1-1). By performing continuous pulse width modulation control in the low-speed side first speed region (VR1-1) and performing discontinuous pulse width modulation control in the high-speed side first speed region (VR1-2), the rotating electrical machine (80) can be appropriately driven by one inverter (10) in the entire first speed region (VR1).

In addition, it is preferred that in the first speed region (VR1), target first speed region control be performed in which both inverters (10), the first inverter (11) and the second inverter (12), are controlled by the mixed pulse width modulation control.

Even when two inverters (10) are provided, for example, when the rotational speed of the rotating electrical machine (80) is low, it may be sufficient to generate alternating current voltage that can be generated by one inverter (10). Mixed pulse width modulation control is a control scheme having, during one cycle of electrical angle, a combination of a period during which pulse width modulation is performed and a period with no modulation (fixed state), each period being about a half cycle. That is, the rotating electrical machine (80) is driven substantially by only one inverter (10) out of the two inverters (10) for each half cycle. Since the inverters (10) do not perform switching operation for about a half period of their driving time, switching loss decreases and system loss decreases.

It is preferred that the rotating electrical machine control device (1) have, as control modes of the rotating electrical machine (80), a loss reduction priority mode and a noise reduction priority mode in a switchable manner, in the loss reduction priority mode, in the first speed region (VR1), the target first speed region control be performed, and in the noise reduction priority mode, in the first speed region (VR1), alternative first speed region control in which both of the inverters (10), the first inverter (11) and the second inverter (12), are controlled by the pulse width modulation control be performed instead of the target first speed region control.

When switching control of the inverters 10 is performed, ripple components superimposed on an alternating current fundamental may generate noise in an audio frequency band. Particularly, when the rotational speed of the rotating electrical machine (80) is low, the possibility of inclusion of the frequency of ripple components (or sideband frequencies thereof) in the audio frequency band increases. When one inverter (10) is controlled by active short-circuit control in target control, output from an inverter (10) controlled by pulse width modulation control is large compared with a case of using the two inverters (10). That is, noise energy is also high. When the two inverters (10) are used, compared with a case of using one inverter (10), noise energy can be reduced and both inverters (10) can be controlled such that noise components cancel each other out. In the noise reduction priority mode, the first inverter (11) and the second inverter (12) are controlled using the same control scheme, and thus, control in which noise components cancel each other out is easily performed. According to the present configuration, by providing the loss reduction priority mode and the noise reduction priority mode in a switchable manner as the control modes of the rotating electrical machine (80), the two inverters (10) can be appropriately controlled based on operating conditions so that both of operation with high system efficiency and a noise reduction can be achieved.

In addition, it is preferred that in the first inverter (11) and the second inverter (12), each arm (3A) for one alternating current phase include a series circuit of an upper-stage-side switching element (3H) and a lower-stage-side switching element (3L), the mixed pulse width modulation control include mixed continuous pulse width modulation control in which during the second period (T2), control is performed such that an inactive state continues, and during the first period (T1), pulse width modulation is continuously performed for all of the arms (3A) for a plurality of phases; and mixed discontinuous pulse width modulation control in which during the second period (T2), control is performed such that an inactive state continues, and during the first period (T1), pulse width modulation is performed including a period during which switching elements in one of the arms (3A) for one of a plurality of phases are fixed to on state or off state, in a low-speed side second speed region (VR2-1) on a low speed side in the second speed region (VR2), the rotating electrical machine control device (1) control both of the inverters (10), the first inverter (11) and the second inverter (12), by the mixed continuous pulse width modulation control, and in a high-speed side second speed region (VR2-2) on a high speed side in the second speed region (VR2), the rotating electrical machine control device (1) control both of the inverters (10), the first inverter (11) and the second inverter (12), by the mixed discontinuous pulse width modulation control.

Mixed pulse width modulation control is a control scheme having, during one cycle of electrical angle, a combination of a period during which pulse width modulation is performed and a period with no modulation (fixed state), each period being about a half cycle. In mixed continuous pulse width modulation control, continuous pulse width modulation is performed as a scheme for pulse width modulation, and in mixed discontinuous pulse width modulation control, discontinuous pulse width modulation is performed as a scheme for pulse width modulation. The maximum modulation index for the discontinuous pulse width modulation control is larger than the maximum modulation index for the continuous pulse width modulation control. The high-speed side second speed region (VR2-2) is a control region (R) in which the rotational speed of the rotating electrical machine (80) is higher than in the low-speed side second speed region (VR2-1) for the same torque (T), and in terms of system efficiency, it is preferable that modulation be performed at a higher modulation index in the high-speed side second speed region (VR2-2) than in the low-speed side second speed region (VR2-1). By performing mixed continuous pulse width modulation control that is combined with continuous pulse width modulation control in the low-speed side second speed region (VR2-1) and performing mixed discontinuous pulse width modulation control that is combined with discontinuous pulse width modulation control in the high-speed side second speed region (VR2-2), the rotating electrical machine (80) can be appropriately driven in the entire second speed region (VR2).

In addition, the control schemes may include discontinuous pulse width modulation control in which pulse width modulation is performed including a period during which switching elements in one of the arms (3A) for one of a plurality of phases are fixed to on state or off state, and in the high-speed side second speed region (VR2-2), the rotating electrical machine control device (1) may control both of the inverters (10), the first inverter (11) and the second inverter (12), by the discontinuous pulse width modulation control instead of the mixed discontinuous pulse width modulation control.

The high-speed side second speed region (VR2-2) is set on a relatively high speed side in the control regions (R) of the rotating electrical machine (80), and it is highly likely that the high-speed side second speed region (VR2-2) requires a relatively high modulation index. Mixed pulse width modulation control is a control scheme having, during one cycle of electrical angle, a combination of a period during which pulse width modulation is performed and a period with no modulation (fixed state), each period being about a half cycle. That is, the mixed pulse width modulation control includes a period with no modulation, and thus, compared with a case of performing pulse width modulation in the entire cycle, the maximum modulation index decreases. Thus, when, for example, a higher modulation index is required, in the high-speed side second speed region (VR2-2), both inverters (10) are controlled by discontinuous pulse width modulation control instead of mixed discontinuous pulse width modulation, by which the rotating electrical machine (80) can be appropriately driven.

In addition, when the rotating electrical machine control device (1) performs, in the first speed region (VR1), target first speed region control in which both inverters (10), the first inverter (11) and the second inverter (12), are controlled by the mixed pulse width modulation control, it is preferred that in a high torque region (VRH) with torque greater than or equal to predetermined torque (Tref) which is torque determined in advance in the first speed region (VR1) and the second speed region (VR2), the rotating electrical machine control device (1) control both inverters (10), the first inverter (11) and the second inverter (12), by the pulse width modulation control, and in a low torque region (VRL) with torque less than the predetermined torque (Tref) in the first speed region (VR1) and the second speed region (VR2), the rotating electrical machine control device (1) control both inverters (10), the first inverter (11) and the second inverter (12), by the mixed pulse width modulation control.

When target first speed region control is performed, in the first speed region (VR1) and the second speed region (VR2), both inverters (10), the first inverter (11) and the second inverter (12), are controlled by mixed pulse width modulation control. According to experiments and simulations conducted by the inventors, it has been confirmed that in the high torque region (VRH) in the first speed region (VR1) and the second speed region (VR2), ripple components corresponding to harmonic content at the frequency of rotational speed of the rotating electrical machine (80) appear in direct current bus current (Idc). In general, on a direct current side of an inverter (10) there are provided a direct current power supply (6) and a direct current link capacitor (4) (smoothing capacitor) that smooths direct current bus voltage (direct current link voltage (Vdc)). The ripple components in the direct current bus current (Idc) may reduce the lifetimes of the direct current power supply (6) and the direct current link capacitor (4). By increasing the capacitance of the direct current link capacitor (4), ripples can be reduced, but the increase in the capacitance may lead to an increase in the physical size of the direct current link capacitor (4) or cost increase. Hence, it is preferable to reduce ripples in the direct current bus current (Idc). According to the present configuration, in the high torque region (VRH) in which such ripples increase, pulse width modulation control is performed instead of mixed pulse width modulation control. According to experiments and simulations conducted by the inventors, it has been confirmed that even in the high torque region (VRH), by controlling both inverters (10), the first inverter (11) and the second inverter (12), by pulse width modulation control, ripples in the direct current bus current (Idc) decrease. Namely, according to the present configuration, even when both inverters (10) are controlled by mixed pulse width modulation control in the first speed region (VR1) and the second speed region (VR2), ripples in the direct current bus current (Idc) can be appropriately reduced.

In addition, as described above, when the rotating electrical machine control device (1) controls both inverters (10), the first inverter (11) and the second inverter (12), by the pulse width modulation control in the high torque region (VRH), and controls both inverters (10), the first inverter (11) and the second inverter (12), by the mixed pulse width modulation control in the low torque region (VRL) with torque less than the predetermined torque (Tref), it is preferred that in the first inverter (11) and the second inverter (12), each arm (3A) for one alternating current phase include a series circuit of an upper-stage-side switching element (3H) and a lower-stage-side switching element (3L), the pulse width modulation control include, as the control schemes, continuous pulse width modulation control in which pulse width modulation is continuously performed for all of the arms (3A) for a plurality of phases; and discontinuous pulse width modulation control in which pulse width modulation is performed including a period during which switching elements (3) in one of the arms (3A) for one of a plurality of phases are fixed to on state or off state, the mixed pulse width modulation control include mixed continuous pulse width modulation control in which during the second period (T2), control is performed such that an inactive state continues, and during the first period (T1), pulse width modulation is continuously performed for all of the arms (3A) for a plurality of phases; and mixed discontinuous pulse width modulation control in which during the second period (T2), control is performed such that an inactive state continues, and during the first period (T1), pulse width modulation is performed including a period during which switching elements (3) in one of the arms (3A) for one of a plurality of phases are fixed to on state or off state, and with a region on a low speed side in the second speed region (VR2) being a low-speed side second speed region (VR2-1) and a region on a high speed side in the second speed region (VR2) being a high-speed side second speed region (VR2-2), in the low torque region (VRL) in the first speed region (VR1) and the low-speed side second speed region (VR2-1), the rotating electrical machine control device (1) control both of the inverters (10), the first inverter (11) and the second inverter (12), by the mixed continuous pulse width modulation control, in the low torque region (VRL) in the high-speed side second speed region (VR2-2), the rotating electrical machine control device (1) control both of the inverters (10), the first inverter (11) and the second inverter (12), by the mixed discontinuous pulse width modulation control, in the high torque region (VRH) in the first speed region (VR1), the rotating electrical machine control device (1) control both of the inverters (10), the first inverter (11) and the second inverter (12), by the continuous pulse width modulation control, and in the high torque region (VRH) in the second speed region (VR2), the rotating electrical machine control device (1) control both of the inverters (10), the first inverter (11) and the second inverter (12), by the discontinuous pulse width modulation control.

A control region (R) for which mixed continuous pulse width modulation control is suitable and a control region (R) for which continuous pulse width modulation control is suitable do not completely match each other, and a control region (R) for which mixed discontinuous pulse width modulation control is suitable and a control region (R) for which discontinuous pulse width modulation control is suitable do not completely match each other, either. Thus, for example, when mixed pulse width control is performed in the low torque region (VRL) and pulse width modulation control is performed in the high torque region (VRH), simply switching a control scheme between mixed continuous pulse width modulation control and continuous pulse width modulation control and switching a control scheme between mixed discontinuous pulse width modulation control and discontinuous pulse width modulation control may not be appropriate. According to experiments and simulations conducted by the inventors, it has been found that as described above, it is preferred to control both inverters (10), the first inverter (11) and the second inverter (12), by mixed continuous pulse width modulation control in the low torque region (VRL) in the first speed region (VR1) and the low-speed side second speed region (VR2-1), by mixed discontinuous pulse width modulation control in the low torque region (VRL) in the high-speed side second speed region (VR2-2), by continuous pulse width modulation control in the high torque region (VRH) in the first speed region (VR1), and by discontinuous pulse width modulation control in the high torque region (VRH) in the second speed region (VR2). According to this configuration, the rotating electrical machine (80) can be appropriately driven in all of the first speed region (VR1) and the second speed region (VR2).

In addition, it is preferred that a boundary between control regions (R) be set according to at least one of the rotational speed of the rotating electrical machine (80) based on torque of the rotating electrical machine (80), and a ratio of the root-mean-square value of line-to-line voltage of alternating current voltages of a plurality of phases to direct current bus voltage.

The operating conditions of the rotating electrical machine (80) are often defined by a relationship between rotational speed and torque. When the rotating electrical machine control device (1) changes control schemes for controlling the first inverter (11) and the second inverter (12), based on rotational speed which is one parameter, the rotating electrical machine control device (1) can control drive of the rotating electrical machine (80) with high efficiency, based on the operating conditions of the rotating electrical machine (80). In addition, for example, when the rotating electrical machine (80) requires high output (high rotational speed or high torque), a voltage-type inverter implements the requirement by increasing direct current bus voltage or increasing a ratio at which direct current bus voltage is converted into alternating current voltage. When the direct current bus voltage is constant, the requirement can be implemented by increasing a ratio at which the direct current bus voltage is converted into alternating current voltage. This ratio can be represented as a ratio of the root-mean-square value of three-phase alternating current electric power to direct current electric power (in a case of a voltage-type inverter, it is equivalent to a ratio of the root-mean-square value of three-phase alternating current line-to-line voltage to direct current bus voltage). Control schemes for controlling the inverters (10) include various schemes from a scheme in which the ratio is low to a scheme in which the ratio is high. By changing control schemes based on the root-mean-square value, drive of the rotating electrical machine (80) can be controlled with high efficiency, based on the operating conditions of the rotating electrical machine (80).

In addition, it is preferred that the control schemes further include rectangular-wave control in which one pulse is outputted in one cycle of electrical angle, a third speed region (VR3) in which the rotational speed of the rotating electrical machine (80) is higher than in the second speed region (VR2) for the same torque (T) be further set, and in the third speed region (VR3), the rotating electrical machine control device (1) control both of the inverters (10), the first inverter (11) and the second inverter (12), by the rectangular-wave control.

Though pulse width modulation control surpasses rectangular-wave control in rotation smoothness, the rectangular-wave control can drive the rotating electrical machine (80) at the physically (mathematically) highest value of modulation index. If, as a control scheme, rectangular-wave control can be performed in addition to pulse width modulation control, then flexibility in control increases and drive of the rotating electrical machine (80) can be controlled with high efficiency, based on the operating conditions of the rotating electrical machine (80).

In addition, in another aspect, in a rotating electrical machine control device (1) that controls, through a first inverter (11) and a second inverter (12), drive of a rotating electrical machine (80) having open-end windings (8) of a plurality of phases which are independent of each other, the first inverter (11) is connected to a one-end side of the open-end windings (8) of a plurality of phases to convert electric power between direct current and alternating currents of a plurality of phases, the second inverter (12) is connected to an other-end side of the open-end windings (8) of a plurality of phases to convert electric power between direct current and alternating currents of a plurality of phases, in the first inverter (11) and the second inverter (12), each arm (3A) for one alternating current phase includes a series circuit of an upper-stage-side switching element (3H) and a lower-stage-side switching element (3L), control schemes for the first inverter (11) and the second inverter (12) include at least pulse width modulation control in which a plurality of pulses with different patterns are outputted in one cycle of electrical angle; and active short-circuit control in which the upper-stage-side switching elements (3H) in the arms (3A) for all of a plurality of phases are brought into on state or the lower-stage-side switching elements (3L) in the arms (3A) for all of a plurality of phases are brought into on state, and the pulse width modulation control includes, as the control schemes, continuous pulse width modulation control in which pulse width modulation is continuously performed for all of the arms (3A) for a plurality of phases; and discontinuous pulse width modulation control in which pulse width modulation is performed including a period during which switching elements (3) in one of the arms (3A) for one of a plurality of phases are fixed to on state or off state, the first inverter (11) and the second inverter (12) can be controlled using the control schemes that are independent of each other, as control regions (R) of the rotating electrical machine (80), a first speed region (VR1), a second speed region (VR2) in which the rotational speed of the rotating electrical machine (80) is higher than in the first speed region (VR1) for the same torque, and a third speed region (VR3) in which the rotational speed of the rotating electrical machine (80) is higher than in the second speed region (VR2) for the same torque are set, and target control is performed in which in the first speed region (VR1), one of inverters (10), the first inverter (11) or the second inverter (12), is controlled by the active short-circuit control, and the other inverter (10) is controlled by the continuous pulse width modulation control, in the second speed region (VR2), one of the inverters (10), the first inverter (11) or the second inverter (12), is controlled by the active short-circuit control, and the other inverter (10) is controlled by the discontinuous pulse width modulation control, and in the third speed region (VR3), both of the inverters (10), the first inverter (11) and the second inverter (12), are controlled by the discontinuous pulse width modulation control.

When two inverters (10) are provided like the present configuration, alternating current voltage with an amplitude larger than that of voltage on a direct current side of each inverter (10) can be generated. Note, however, that the rotating electrical machine control device (1) does not need to control the two inverters (10) such that the amplitude of alternating current is always large, and for example, when the rotational speed of the rotating electrical machine (80) is low, it may be sufficient to generate alternating current voltage that can be generated by one inverter (10). According to the present configuration, in the first speed region (VR1) and the second speed region (VR2), one inverter (10) out of the two inverters (10) is controlled by active short-circuit control. By this, the open-end windings (8) are short-circuited in the one inverter (10), resulting in the rotating electrical machine (80) being the same as a rotating electrical machine in which stator coils have an electrical neutral point. That is, the rotating electrical machine (80) is driven substantially by only one inverter (10) out of the two inverters (10). Since the inverter (10) controlled by active short-circuit control does not perform switching operation, the rotating electrical machine (80) can be driven while loss in the entire system is suppressed. In addition, the maximum modulation index for discontinuous pulse width modulation control performed in the second speed region (VR2) is larger than the maximum modulation index for continuous pulse width modulation control performed in the first speed region (VR1). The second speed region (VR2) is a control region in which the rotational speed of the rotating electrical machine (80) is higher than in the first speed region (VR1) for the same torque (T), and in terms of system efficiency, it is preferable that modulation be performed at a higher modulation index in the second speed region (VR2) than in the first speed region (VR1). By performing continuous pulse width modulation control in the first speed region (VR1) and performing discontinuous pulse width modulation control in the second speed region (VR2), the rotating electrical machine (80) can be appropriately driven by one inverter (10) in a control region in which the first speed region (VR1) and the second speed region (VR2) are combined together. In addition, in the third speed region (VR3) in which the rotational speed of the rotating electrical machine (80) is higher than in the second speed region (VR2), both inverters (10) are controlled by discontinuous pulse width modulation control, and thus, the rotating electrical machine (80) can be driven such that the open-end windings (8) generate line-to-line voltage higher than voltage that can be generated using one direct current power supply (6). As such, according to the present configuration, the two inverters provided at respective both ends of the open-end windings can be appropriately controlled.

REFERENCE SIGNS LIST

1: Rotating electrical machine control device, 3: Switching element, 3A: Arm, 3H: Upper-stage-side switching element, 3L: Lower-stage-side switching element, 8: Stator coil (open-end winding), 10: Inverter, 11: First inverter, 12: Second inverter, 80: Rotating electrical machine, R: Control region, T: Torque, T1: First period, T2: Second period, VR1: First speed region, VR1-1: Low-speed side first speed region, VR1-2: High-speed side first speed region, VR2: Second speed region, VR2-1: Low-speed side second speed region, VR2-2: High-speed side second speed region, VR3: Third speed region, VR4: Fourth speed region, VRH: High torque region, and VRL: Low torque region

The invention claimed is:

1. A rotating electrical machine control device that controls, through a first inverter and a second inverter, drive of a rotating electrical machine having open-end windings of a plurality of phases, the open-end windings being independent of each other,
wherein
the first inverter is connected to a one-end side of the open-end windings of a plurality of phases to convert electric power between direct current and alternating currents of a plurality of phases,
the second inverter is connected to an other-end side of the open-end windings of a plurality of phases to convert electric power between direct current and alternating currents of a plurality of phases,
the first inverter and the second inverter can be controlled using a plurality of control schemes with different switching patterns and can be controlled using the control schemes that are independent of each other,
as control regions of the rotating electrical machine, a first speed region and a second speed region in which rotational speed of the rotating electrical machine is higher than in the first speed region for same torque are set,
the control schemes include pulse width modulation control in which a plurality of pulses with different patterns are outputted in one cycle of electrical angle; and mixed pulse width modulation control in which control is performed such that a plurality of pulses with different patterns are outputted during a first period and an inactive state continues during a second period, the first period being a half cycle of electrical angle and the second period being an other half cycle, and
both inverters, the first inverter and the second inverter, are controlled by the mixed pulse width modulation control in the second speed region.

2. The rotating electrical machine control device according to claim 1, wherein
in the pulse width modulation control, a plurality of pulses are generated based on an instruction value and a carrier,
in the mixed pulse width modulation control, a plurality of pulses are generated based on a half carrier and the instruction value, the half carrier being the carrier whose wave height is half of a variable range of the instruction value, and
in the mixed pulse width modulation control, a plurality of pulses are generated using:
a double half carrier and single reference scheme in which pulses for the first inverter are generated based on a first half carrier and the instruction value common to the first inverter and the second inverter, and pulses for the second inverter are generated based on a second half carrier and the instruction value, the first half carrier being set, as the half carrier, on one of a higher voltage side and a lower voltage side than a center of an amplitude of the instruction value, and the second half carrier having a same phase as the first half carrier and being set on an other one of the higher voltage side and the lower voltage side than the center of the amplitude of the instruction value; or
a double half carrier and double reference scheme in which pulses for the first inverter are generated based on a first half carrier and a first instruction value for the first inverter, and pulses for the second inverter are generated based on a second half carrier and a second instruction value for the second inverter, the first half carrier being set, as the half carrier, on one of the higher voltage side and the lower voltage side than the center of the amplitude of the instruction value, the second half carrier differing from the first half carrier in phase by 180 degrees and being set on a same side as the first half carrier, and the second instruction value differing from the first instruction value in phase by 180 degrees.

3. The rotating electrical machine control device according to claim 1, wherein
in the first inverter and the second inverter, each arm for one alternating current phase includes a series circuit of an upper-stage-side switching element and a lower-stage-side switching element,
the control schemes further include active short-circuit control in which the upper-stage-side switching elements in the arms for all of a plurality of phases are brought into on state or the lower-stage-side switching elements in the arms for all of a plurality of phases are brought into on state, and
in the first speed region, target first speed region control is performed in which one of the inverters, the first inverter or the second inverter, is controlled by the active short-circuit control, and an other one of the inverters is controlled by the pulse width modulation control.

4. The rotating electrical machine control device according to claim 3, wherein in the first speed region, the control scheme for controlling the first inverter and the control scheme for controlling the second inverter are alternately switched in accordance with a condition determined in advance.

5. The rotating electrical machine control device according to claim 3, or wherein
the pulse width modulation control includes, as the control schemes, continuous pulse width modulation control in which pulse width modulation is continuously performed for all of the arms for a plurality of phases; and discontinuous pulse width modulation control in which pulse width modulation is performed including a period during which switching elements in one of the arms for one of a plurality of phases are fixed to on state or off state,
in a low-speed side first speed region on a low speed side in the first speed region, one of the inverters, the first inverter or the second inverter, is controlled by the active short-circuit control, and an other one of the inverters is controlled by the continuous pulse width modulation control, and
in a high-speed side first speed region on a high speed side in the first speed region, one of the inverters, the first inverter or the second inverter, is controlled by the active short-circuit control, and an other one of the inverters is controlled by the discontinuous pulse width modulation control.

6. The rotating electrical machine control device according to claim 3, wherein
as control modes of the rotating electrical machine, a loss reduction priority mode and a noise reduction priority mode are provided in a switchable manner,
in the loss reduction priority mode, in the first speed region, the target first speed region control is performed, and
in the noise reduction priority mode, in the first speed region, alternative first speed region control in which both of the inverters, the first inverter and the second inverter, are controlled by the pulse width modulation control is performed instead of the target first speed region control.

7. The rotating electrical machine control device according to claim 1, wherein in the first speed region, target first speed region control is performed in which both inverters, the first inverter and the second inverter, are controlled by the mixed pulse width modulation control.

8. The rotating electrical machine control device according to claim 7, wherein in a high torque region with torque greater than or equal to predetermined torque in the first speed region and the second speed region, both inverters, the first inverter and the second inverter, are controlled by the pulse width modulation control, and in a low torque region with torque less than the predetermined torque in the first speed region and the second speed region, both inverters, the first inverter and the second inverter, are controlled by the mixed pulse width modulation control, the predetermined torque being torque determined in advance.

9. The rotating electrical machine control device according to claim 8, wherein
in the first inverter and the second inverter, each arm for one alternating current phase includes a series circuit of an upper-stage-side switching element and a lower-stage-side switching element,
the pulse width modulation control includes, as the control schemes, continuous pulse width modulation control in which pulse width modulation is continuously performed for all of the arms for a plurality of phases; and discontinuous pulse width modulation control in which pulse width modulation is performed including a period during which switching elements in one of the arms for one of a plurality of phases are fixed to on state or off state,
the mixed pulse width modulation control includes mixed continuous pulse width modulation control in which during the second period, control is performed such that an inactive state continues, and during the first period, pulse width modulation is continuously performed for all of the arms for a plurality of phases; and mixed discontinuous pulse width modulation control in which during the second period, control is performed such that an inactive state continues, and during the first period, pulse width modulation is performed including a period during which switching elements in one of the arms for one of a plurality of phases are fixed to on state or off state, and
with a region on a low speed side in the second speed region being a low-speed side second speed region, and a region on a high speed side in the second speed region being a high-speed side second speed region,
in the low torque region in the first speed region and the low-speed side second speed region, both of the inverters, the first inverter and the second inverter, are controlled by the mixed continuous pulse width modulation control,
in the low torque region in the high-speed side second speed region, both of the inverters, the first inverter and the second inverter, are controlled by the mixed discontinuous pulse width modulation control,
in the high torque region in the first speed region, both of the inverters, the first inverter and the second inverter, are controlled by the continuous pulse width modulation control, and in the high torque region in the second speed region, both of the inverters, the first inverter and the second inverter, are controlled by the discontinuous pulse width modulation control.

10. The rotating electrical machine control device according to claim 1, wherein in the first inverter and the second inverter, each arm for one alternating current phase includes a series circuit of an upper-stage-side switching element and a lower-stage-side switching element, the mixed pulse width modulation control includes mixed continuous pulse width modulation control in which during the second period, control is performed such that an inactive state continues, and during the first period, pulse width modulation is continuously performed for all of the arms for a plurality of phases; and mixed discontinuous pulse width modulation control in which during the second period, control is performed such that an inactive state continues, and during the first period, pulse width modulation is performed including a period during which switching elements in one of the arms for one of a plurality of phases are fixed to on state or off state, in a low-speed side second speed region on a low speed side in the second speed region, both of the inverters, the first inverter and the second inverter, are controlled by the mixed continuous pulse width modulation control, and in a high-speed side second speed region on a high speed side in the second speed region, both of the inverters, the first inverter and the second inverter, are controlled by the mixed discontinuous pulse width modulation control.

11. The rotating electrical machine control device according to claim 10, wherein the control schemes include discontinuous pulse width modulation control in which pulse width modulation is performed including a period during which switching elements in one of the arms for one of a plurality of phases are fixed to on state or off state, and in the high-speed side second speed region, both of the inverters, the first inverter and the second inverter, are controlled by the discontinuous pulse width modulation control instead of the mixed discontinuous pulse width modulation control.

12. The rotating electrical machine control device according to claim 1, wherein a boundary between control regions is set according to at least one of rotational speed of the rotating electrical machine based on torque of the rotating electrical machine, and a ratio of a root-mean-square value of line-to-line voltage of alternating current voltages of a plurality of phases to direct current bus voltage.

13. The rotating electrical machine control device according to claim 1, wherein the control schemes further include rectangular-wave control in which one pulse is outputted in one cycle of electrical angle, a third speed region in which rotational speed of the rotating electrical machine is higher than in the second speed region for same torque is further set, and in the third speed region, both of the inverters, the first inverter and the second inverter, are controlled by the rectangular-wave control.

14. A rotating electrical machine control device that controls, through a first inverter and a second inverter, drive of a rotating electrical machine having open-end windings of a plurality of phases, the open-end windings being independent of each other, wherein the first inverter is connected to a one-end side of the open-end windings of a plurality of phases to convert electric power between direct current and alternating currents of a plurality of phases, the second inverter is connected to an other-end side of the open-end windings of a plurality of phases to convert electric power between direct current and alternating currents of a plurality of phases, in the first inverter and the second inverter, each arm for one alternating current phase includes a series circuit of an upper-stage-side switching element and a lower-stage-side switching element, control schemes for the first inverter and the second inverter include at least pulse width modulation control in which a plurality of pulses with different patterns are outputted in one cycle of electrical angle; and active short-circuit control in which the upper-stage-side switching elements in the arms for all of a plurality of phases are brought into on state or the lower-stage-side switching elements in the arms for all of a plurality of phases are brought into on state, and the pulse width modulation control includes, as the control schemes, continuous pulse width modulation control in which pulse width modulation is continuously performed for all of the arms for a plurality of phases; and discontinuous pulse width modulation control in which pulse width modulation is performed including a period during which switching elements in one of the arms for one of a plurality of phases are fixed to on state or off state, the first inverter and the second inverter can be controlled using the control schemes that are independent of each other, as control regions of the rotating electrical machine, a first speed region, a second speed region in which rotational speed of the rotating electrical machine is higher than in the first speed region for same torque, and a third speed region in which rotational speed of the rotating electrical machine is higher than in the second speed region for same torque are set, and target control is performed in which in the first speed region, one of inverters, the first inverter or the second inverter, is controlled by the active short-circuit control, and an other one of the inverters is controlled by the continuous pulse width modulation control, in the second speed region, one of the inverters, the first inverter or the second inverter, is controlled by the active short-circuit control, and an other one of the inverters is controlled by the discontinuous pulse width modulation control, and in the third speed region, both of the inverters, the first inverter and the second inverter, are controlled by the discontinuous pulse width modulation control.

* * * * *